(12) United States Patent
Nakazono et al.

(10) Patent No.: US 7,993,476 B2
(45) Date of Patent: Aug. 9, 2011

(54) METHOD AND SYSTEM FOR CONTINUOUSLY MANUFACTURING LIQUID-CRYSTAL DISPLAY ELEMENT

(75) Inventors: Takuya Nakazono, Osaka (JP); Kazuo Kitada, Osaka (JP); Tomokazu Yura, Osaka (JP); Satoru Koshio, Osaka (JP); Shouji Shibata, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/903,121

(22) Filed: Oct. 12, 2010

(65) Prior Publication Data

US 2011/0083789 A1    Apr. 14, 2011

(30) Foreign Application Priority Data

Oct. 13, 2009  (JP) .................... 2009-236090

(51) Int. Cl.
*B32B 41/00* (2006.01)
(52) U.S. Cl. .......... 156/64; 156/252; 156/253; 156/360; 156/361; 156/378; 156/379
(58) Field of Classification Search .............. 156/64, 156/252, 253, 269, 270, 353, 360, 361, 378, 156/379
See application file for complete search history.

(56) References Cited

U.S. PATENT DOCUMENTS

| | | |
|---|---|---|
| 7,202,923 B2 | 4/2007 | Yamabuchi et al. |
| 7,388,628 B2 | 6/2008 | Yamabuchi et al. |
| 2004/0095526 A1 | 5/2004 | Yamabuchi et al. |
| 2005/0199337 A1 | 9/2005 | Nishikubo et al. |
| 2009/0159175 A1 | 6/2009 | Nakahira et al. |
| 2009/0199950 A1* | 8/2009 | Kitada et al. .................... 156/64 |

FOREIGN PATENT DOCUMENTS

| | | |
|---|---|---|
| EP | 2093041 | 8/2009 |
| JP | 55-120005 | 9/1980 |
| JP | 57-052017 | 3/1982 |
| JP | 11-095028 | 4/1999 |
| JP | 2002-023151 | 1/2002 |
| JP | 2003-161935 | 6/2003 |
| JP | 2003-202298 | 7/2003 |

(Continued)

OTHER PUBLICATIONS

Translation of JP 2009-175653. Aug. 2009. Nitto Denko Corp. Kitada Kazuo et al.*

(Continued)

*Primary Examiner* — George Koch
(74) *Attorney, Agent, or Firm* — Lowe Hauptman Ham & Berner LLP

(57) ABSTRACT

A method and a system for continuously manufacturing liquid-crystal display elements, using a continuous optical film laminate which comprises at least an optically functional film having an adhesive layer provided thereon and a carrier film releasably laminated on said adhesive layer, the optically functional film including at least one defect-free region and at least one defect-containing region, the defect-free region having a predefined length corresponding to a dimension of a liquid-crystal panel, the defect-containing region including at least one defect and defined as a region having a predefined length which is different from the length of the defect-free region, slit lines being sequentially formed to extend in a transverse direction of the optical film laminate to form defect-free, normal optically functional film sheets and defect-containing optically functional film sheets.

14 Claims, 20 Drawing Sheets

FOREIGN PATENT DOCUMENTS

| | | |
|---|---|---|
| JP | 2003-344302 | 12/2003 |
| JP | 2004-144913 | 5/2004 |
| JP | 2004-361741 | 12/2004 |
| JP | 2005-062165 | 3/2005 |
| JP | 2005-114624 | 4/2005 |
| JP | 2005-298208 | 10/2005 |
| JP | 2006-058411 | 3/2006 |
| JP | 2007-064989 | 3/2007 |
| JP | 2007-140046 | 6/2007 |
| KR | 20030042760 | 6/2003 |
| TW | 200725002 | 7/2007 |
| TW | 200827793 | 7/2008 |
| TW | 200933236 | 8/2009 |

OTHER PUBLICATIONS

European Search Report for EP10176101, citing the above reference(s).

Taiwanese Office Action for application No. 099129093, citing the above reference(s).

Korean Notice of Allowance for application No. 10-2010-0052198, citing the above reference(s).

\* cited by examiner

FIG.20

| inspection unit | type of defect | | | | |
|---|---|---|---|---|---|
| | internal foreign substances | internal pores | bright spots | surface irregularities | flaw/undulation |
| reflection | △ | △ | × | ○ | ○ |
| transmission | ○ | ○ | △ | △ | × |
| detect defects by cross-Nichol condition | ○ | ○ | ○ | × | ○ |

METHOD AND SYSTEM FOR CONTINUOUSLY MANUFACTURING LIQUID-CRYSTAL DISPLAY ELEMENT

CROSS-REFERENCE TO RELATED APPLICATIONS

The present application claims priority to Japanese patent application number 2009-236090, filed on Oct. 13, 2009, which is incorporated by reference in its entirety.

TECHNICAL FIELD

The present invention relates to a method and system for continuously manufacturing liquid-crystal display elements, and more particularly to a method and system for continuously manufacturing liquid crystal display elements using a continuous web of optical film laminate.

BACKGROUND ART

Taking a widescreen television having a diagonal screen size of 42 inches as an example, a liquid-crystal panel therefor comprises a layered liquid-crystal panel which includes a pair of rectangular-shaped glass substrates each having a size of about 540 to 560 mm in length×about 950 to 970 mm in width×about 0.7 mm (700 μm) in thickness, and a liquid-crystal layer having a thickness of about 5 μm having a transparent electrode, a color filter etc., and sandwiched between the glass substrates, as shown in FIG. 1. Therefore, the thickness of the liquid-crystal panel itself is about 1.4 mm (1400 μm). The liquid-crystal display element is typically produced from a liquid crystal panel by adhesively applying a polarizing composite sheet which is an optically functional film, commonly referred as "a polarizing plate", to each of front (viewing side) and back (backlight side) sides thereof.

By the way, for a liquid-crystal display element to function, the direction of orientation of liquid-crystal molecules between two substrates and the direction of polarization of the polarizers laminated to the substrates must be set in a particular relation to each other. In liquid-crystal display element technologies, LCDs (Liquid-crystal Display) using a TN (Twisted Nematic) type liquid-crystal were the first to be put into practical use, and then LCDs using a VA (vertical Alignment) type liquid-crystal, an IPS (Inplane Switching) type liquid-crystal etc., were put into practical use. Although a technical explanation is omitted, in an LCD using such TN-type liquid-crystal panel, liquid-crystal molecules are provided between two upper and lower orientation films having respective rubbing directions on the inner surfaces of glass substrates of the liquid-crystal panel whereby the liquid-crystal molecules are twisted by 90 degrees along the optical axis, s that when a voltage is applied, the liquid-crystal molecules are aligned in a direction perpendicular to the orientation films. However, in case where the LCD is designed to allow images as seen from right side of a display screen as those view as seen from left side, the direction of rubbing on the orientation film at the viewing-side must be 45 degrees (the rubbing direction of the other orientation film is 135 degrees). It is therefore necessary that the polarizing sheets made from a continuous polarizing composite film to be laminated respectively on the front and back sides of the liquid-crystal panel must have polarizers respectively oriented in directions inclined by 45 degrees with respect to a lengthwise or transverse direction of the display screen so as to conform to the rubbing directions.

Generally, in manufacturing a liquid-crystal display element, there is provided a continuous optical film laminate comprising a polarizing composite film including a polarizer which has been subjected to an orientation treatment wherein a polarizer base film is stretched in the lengthwise or transverse direction, a protective film laminated on one side of the polarizer, and an adhesive layer provided on the other side of the polarizer which is the side to be attached to the liquid-crystal panel, and a releasable film releasably attached to the adhesive layer. Therefore, in a polarizing sheet for use in producing a liquid-crystal display element of a TN-type liquid-crystal panel, it is required that the optical film laminate is punched or cut into a rectangular-shaped sheet having a long side or a short side determined in accordance with the size of the TN liquid-crystal panel, in such a manner that the long or short side inclined by 45 degrees with respect to the orientation direction of the polarizer produced by the stretching process. This procedure is described in Japanese Laid-Open Patent Publication JP 2003-161935A (Patent Document 1) or Japanese Patent 3616866 B (Patent Document 2), for example. It is needless to mention that the polarizing composite film sheet of such rectangular shape has a width or a short side dimension which is smaller than that of the polarizing composite film.

The punching or cutting the continuous optical film laminate into the rectangular-shaped sheet may be collectively referred as "a method and system for manufacturing individualized sheets" for liquid-crystal display elements and the sheets thus produced as "individualized sheets". The punching or cutting is made not only through the surface protection film but also through the carrier film which is provided for protecting the exposed surface of the adhesive layer in the polarizing composite film provided in the continuous optical film laminate The sheet of the carrier film thus punched-out or cut together with the other parts of the laminate may be referred as a "separator", rather than a "carrier film sheet" in the sense that it no longer serves as a transport medium. Thus, the manufacturing process of the liquid-crystal display elements includes the first step of peeling the separator from each of the optical film laminate sheet to have the adhesive layer in the polarizing sheet exposed. Subsequently, the polarizing sheets each having the adhesive layer exposed are conveyed one-by-one by, for example, being transported under a vacuum suction irrespective of whether or not the surface protection films are laminated on the polarizing sheets, to be laminated to respective ones of a plurality of liquid-crystal panels. According to the aforementioned manufacturing process of the liquid-crystal display elements, it has been required that the sheet punched-out or cut from the continuous optical film laminate as described above is in the form of an individualized sheet having four trimmed sides and possesses a certain level of stiffness having a certain resistance to deflection or bend so that it can be transported and laminated without difficulty. In an initial period in the history of manufacturing process of the liquid-crystal display elements, the optical film sheet or a polarizing sheet contained in such optical film sheet has generally been called as "polarizing plate" which is still used as a common name.

In the manufacturing process of TN-type liquid-crystal display elements, a continuous optical film laminate in the form of a roll of continuous web of such laminate which is then unrolled to be punched-out or cut along cutting lines extending in a direction transverse to the feed direction, to thereby form a plurality of optical film laminate sheets. Such optical film laminate sheet also includes a polarizing sheet which is simultaneously formed during the punching process. However, in this case, it is impossible to produce finished liquid-crystal display elements simply by laminating the sheets thus formed in the punching or cutting process to respective ones of a plurality of liquid-crystal panels in a subsequent process. This is because the sheet of the optical film laminate is cut from the web in such a manner that the sheet has a long or short side extending in a direction 45 degrees with respect to the orientation direction of the polarizer which is the longitudinal or stretching direction of the polarizer base film (i.e., with respect to the feed direction of the optical film laminate prior to the punching or cutting process) so that the sheet cannot be laminated to respective ones of the liquid-crystal panels with the orientation as it has been cut from the web. Therefore, in an effort to provide a finished liquid-crystal display element by transporting a polarizing sheet to a position for lamination with a liquid-crystal panel, and then laminating the polarizing sheet to the liquid-crystal panel, a continuous optical film laminate having a width greater than the long side of the liquid-crystal panel is provided in the form of a roll which is then unrolled in the lengthwise direction. The length of the unrolled optical film laminate is then cut into sheets with their sides oriented in the direction of 45 degrees with respect to the lengthwise direction, using, for example, a die to form a plurality of individual polarizing sheets, which are then appropriately fed to the lamination station where the polarizing sheets are laminated with the liquid-crystal panels, as illustrated and described in the Patent Document 1 or 2. Alternatively, liquid-crystal display elements have been produced with a manufacturing method wherein an elongated optical film laminate is provided from a continuous optical film laminate having a substantially large width by cutting or slitting the continuous optical film laminate in a direction 45 degrees with respect to the lengthwise direction, the elongated optical film laminate having a length corresponding to the widths for a plurality of liquid-crystal display elements. According to another proposal, a plurality of individual sheets are connected into a continuous film configuration to provide an elongated optical film laminate having the orientation direction in 45 degrees with respect to the lengthwise direction of the elongated optical film laminate. Such methods are illustrated and described in Japanese Patent Publication No. 62-14810B (Patent Document 3) and Japanese Patent Publication No. 55-120005A (Patent Document 4). According to the methods, the elongated optical film laminate generally has a width corresponding to that of the liquid-crystal panel and is used by being wound into a roll. The elongated optical film laminate is then taken out from the roll, and cut into a plurality of sheets having required length by slitting the film in the transverse direction with respect to its feed direction. The sheets thus formed are then laminated on the respective ones of liquid-crystal panels sequentially transferred to the laminating station. At any rate, the above methods do not provide any noticeable improvement over the method of using individualized separate sheets of polarizers in manufacturing TN-type liquid-crystal display elements.

The Patent Document 3 is a Japanese Patent Publication No. 62-14810B which discloses an apparatus to produce a liquid-crystal panel by sequentially laminating a plurality of sheets each having a required length to respective ones of a plurality of liquid-crystal panels while continuously feeding a continuous optical film laminate containing a polarizing composite film, before the VA-type liquid-crystal and the IPS-type liquid-crystal are brought into practical use. According to the method disclosed by the Patent Document 3, a continuous optical film laminate is provided. The continuous optical film laminate comprises a polarizing composite film of a substantial length (in the Patent Document 3, termed as an "elongated polarizing plate") and a separator for protecting an adhesive layer provided on one side of the polarizing composite film and supplied in the form of a roll. The continuous optical film laminate is then unrolled from the roll of the film laminate and subjected to a process of "slitting only the polarizing plate 4 and the adhesive layer 5 while leaving the separator 6 uncut (hereinafter referred as "half-cut")" to thereby form polarizing sheets of desired dimensions. If it is found that anyone of the polarizing sheets contain a defect or defects, such defective polarizing sheet is removed from the process line in the course of the unrolling process. The polarizing film having no defect or defects are then peeled off the separator and sequentially laminated the liquid-crystal panels (in the Patent Document 3, termed as "liquid-crystal cells"). It is interpreted that the method is proposed specifically for manufacturing small-size display screens for use with electronic calculators or the like. The method can produce "products each having the polarizing composite film and the liquid-crystal cell laminated together". The apparatus is considered to be a type of labeler unit which produces an LCD using the TN-type liquid-crystal. There is taught to produce the optical film laminate in the form of an elongated sheet, and for the purpose, an optical film laminate having a substantially large width is provided and slit in a direction 45 degrees oblique to the longitudinal direction of the optical film laminate with a width corresponding to the width of the liquid-crystal panel. Alternatively, a film-like elongated optical film laminate sheet may be formed by longitudinally connecting a plurality of optical film laminate sheets. Therefore, this apparatus is based on the use of an elongated polarizing sheet which is cut in a direction 45 degrees oblique to the stretching direction of the polarizing composite film with a width corresponding to the width of the liquid-crystal panel. Therefore, the method taught by the Patent Document 3 cannot be applied directly to a manufacturing process adapted to perform steps of continuously providing a plurality of polarizing sheets from a continuous optical film laminate and then laminating the respective polarizing sheets to respective ones of the liquid-crystal panels comprising VA-type or IPS-type liquid-crystal to produce liquid-crystal display elements.

The Patent Document 4 is a Japanese Patent Publication No. 55-120005A which discloses an apparatus based on the technology developed before the VA-type liquid-crystal and the IPS-type liquid-crystal are brought into practical use as in the case of the Patent Document 3. According to the teachings in the Patent Document 4, a liquid-crystal display element is produced by sequentially laminating a plurality of sheets of optical film laminate comprising a polarizing composite film each having a required length to respective ones of a plurality of liquid-crystal panels. A length of the optical film laminate is supplied in the form of a roll, and continuously unrolled for use in the process. The optical film laminate is produced from a polarizing composite film having a substantial width by applying an adhesive layer on one side of the composite film. A plurality of elongated polarizing composite film sheets having a required width are then provided by cutting the polarizing composite film. These sheets are then applied to a separately prepared conveyance medium (i.e., a carrier film) which has preliminarily been subjected to a releasing treatment to produce an optical film laminate. Then, the optical film laminate is subjected to a half-cut process in a transverse direction by means of two knives which are spaced apart by a required distance in the longitudinal direction, leaving the conveyance medium uncut. Thus, the optical film laminate is sequentially cut into a plurality of sheets on the conveyance medium, and the plurality of formed sheets are sequentially laminated to respective ones of the liquid-crystal panels being conveyed to manufacture the liquid-crystal display element. This apparatus is also based on the use of an elongated polarizing sheet which is cut in a direction 45 degrees oblique to the stretching direction of the polarizing composite film with a width corresponding to the width of the liquid-crystal panel. Therefore, the technology disclosed by the Patent Document 4 cannot be applied directly to a manufacturing apparatus adapted to perform steps of continuously forming a plurality of polarizing sheets from a continuous optical film laminate and laminating respective sheets to respective ones of the liquid-crystal panels comprising VA-type or IPS-type liquid-crystal to produce liquid-crystal display elements.

With respect to automation of manufacturing process for liquid-crystal display elements using individualized polarizing sheets will generally be described below. First, a plurality of rectangular individualized sheets are formed from a continuous optical film laminate containing a polarizing composite film and preliminarily subjected to inspection for the presence or absence of any defect in an optical film laminate manufacturing line. The formed individualized sheets inspected for the presence of defects are transported to a liquid-crystal display element manufacturing line in a batch. Generally, the carried-in individualized sheets are manually stored in a polarizing-sheet magazine. Each of the stored individualized sheets has a polarizing sheet comprising at least an adhesive layer and a separator laminated thereto to protect the exposed part of the adhesive layer. The magazine storing the individualized sheets is introduced into the liquid-crystal display element manufacturing line. There is provided a liquid-crystal panel magazine which is incorporated in the same manufacturing line and stores a plurality of liquid-crystal panels. A plurality of liquid-crystal panels are taken out one-by-one from the liquid-crystal panel magazine and conveyed through a cleaning/polishing station. In synchronization with the conveyance of the liquid-crystal panels, the individualized polarizing sheets are taken out one-by-one from the individualized-sheet magazine by means of a suction conveying unit. The separator is then peeled from each of the taken-out individualized sheets to expose the adhesive layer of the sheet. When producing a liquid-crystal display element using the individualized sheet in this manner, the separator must be removed from respective ones of the individualized sheets one-by-one. Then, the individualized sheets with the adhesive layer exposed are carried under suction to the lamination station to be laminated to the liquid-crystal panel. Each of the transported individualized sheets is laminated to one side of the liquid-crystal panel to sequentially produce the liquid-crystal display elements. This method is disclosed, for example, in Japanese Laid-Open Patent Publication No. 2002-23151A (Patent Document 5). Flexible individualized sheets tend to be bowed or warped due to curves or distortion of its edge, and thus it is a serious technical impediment to accuracy and speed in registration and lamination with liquid-crystal panels. Thus, it will be understood that the individualized sheet is required to have a certain level of thickness and stiffness to facilitate registration and lamination with liquid-crystal panels typically in transportation under suction. For example, the disclosures in the Japanese Laid-Open Patent Publication No. 2004-144913A (Patent Document 6), Japanese Laid-Open Patent Publication No. 2005-298208A (Patent Document 7) or Japanese Laid-Open Patent Publication No. 2006-58411A (Patent Document 8) can be considered as measures addressing such technical problems.

On the other hand, the VA-type and IPS-type liquid-crystal panels are not designed to arrange liquid-crystal molecules in twisted orientations. Thus, when producing liquid-crystal display element using these types of liquid-crystal panels, there is no need to have the polarization axis of the polarizing sheet oriented 45 degrees with respect to the direction of the long or short side of the liquid-crystal display element in view of viewing angle characteristics inherent to the orientation of the liquid-crystal, as having been required when using the TN-type liquid-crystal panel. Each of these liquid-crystal display elements using these liquid-crystal panels is formed by applying sheets to the opposite sides of the liquid-crystal display panel oriented with their polarization axes crossed at 90 degrees crossing angle. In the case of the VA-type and IPS-type liquid-crystal panels, with respect to the viewing angle characteristics, maximum contrast can be obtained along the direction of the polarizing axis of the polarizing sheet, so that it is preferable that the sheets have polarizing axes oriented in parallel with the longitudinal or transverse direction of the liquid-crystal panel from the technical view point of symmetry of the viewing angle characteristics and visibility. Thus, it will be understood that these sheets to be applied to the liquid-crystal panel has a feature that the continuous optical film laminate including a polarizing composite film which has been subjected to a longitudinal or transverse stretching can be continuously fed out from a roll and cut along transverse lines with respect to the feed direction of the optical film laminate to sequentially produce rectangular polarizing sheets including the polarizing sheets having the same width as the optical film laminate width.

It should further be pointed out that, from the view point of improving the viewing angle characteristics, there is a trend that, for liquid-crystal used in a display element for widescreen televisions, the VA-type liquid-crystal or the IPS-type liquid-crystal are more widely adopted than the TN type. As described, the conventional display element using the TN-type liquid-crystal had to be manufactured using the individualized sheets. Due to limitations in both product accuracy and manufacturing speed, it is difficult to enhance the manufacturing efficiency in this method anymore. In view of such trend in environments of technical developments, there has been made a proposal such as the one described in Japanese Laid-Open Patent Publication No. 2004-361741A (Patent Document 9) which is based on use of the VA-type or IPS-type liquid-crystal panels and comprises steps of continuously feeding an optical film laminate comprising a polarizing composite film, slitting the optical film laminate in conformity to the size of a liquid-crystal panel and sequentially laminating a plurality of sheets which have been produced by the slitting step to respective ones of a plurality of the liquid-crystal panels.

The subjects and the concepts of the present invention are close to and inseparably linked with the manufacture of a liquid-crystal display element using a liquid-crystal such as the VA-type and IPS-type liquid-crystals which are different in principle from the TN-type liquid-crystal, as described later.

However, the mainstream of manufacture of liquid-crystal display elements is still based on the manufacturing technology utilizing individualized sheets, due to the following technical problems. In manufacturing liquid-crystal display elements, a critical technical challenge is to detect any defect which may otherwise be retained in the display elements to be formed, and to prevent any defective product from being produced. This makes it possible to significantly improve manufacturing yield. Most of the product defects primarily arise from defects in the polarizing composite film contained in the optical film laminate. However, it is not actually a practical way to provide a continuous optical film laminate after completely removing all defects contained in individual films which are to be laminated together to form the optical film laminate. An observation for defects in the polarizing composite film on all of the polarizer and the protective film laminated on the polarizer to provide a polarizing composite film having no adhesive layer formed thereon, and an adhesive layer formed on the polarizing composite film has revealed that there are various kinds of defects, including defects inherent in the PVA film of the polarizer itself, defects arose in connection with the lamination of the protective film to the polarizer and defects generated in the adhesive layer of the formed polarizing composite film, distributed in 20 to 200 positions over a unit length of the polarizing composite film of 1000 m. Thus, it is extremely difficult to produce a defect-free optical film laminate under existing circumstances. Nonetheless, in view of maintaining quality of a display element itself, it is not permitted to use a polarizing composite film sheet having visible flaws or defects as a sheet for television display element even if such a flaw or defect is small. Given that the long side dimension of a polarizing sheet formed from the polarizing composite film is about 1 m, if a defective region cannot be preliminarily removed, 20 to 200 defective liquid-crystal display elements out of 1,000 products will be produced according to a simple calculation.

Thus, under the existing circumstances, it has only been possible to define defect-free regions and defect-containing regions in the polarizing composite film as rectangular regions of the same shape and size, and defect-free polarizing sheets (hereinafter referred as "normal polarizing sheets") are then cut from the polarizing composite film, appropriately avoiding defect-containing regions to have the normal polarizing sheets laminated to the respective ones of the liquid-crystal panels as a rectangular-shaped normal polarizing sheet in the later process. The defect-containing regions are also cut from the polarizing composite film, as defective polarizing sheets (hereinafter referred as "defective polarizing sheets"), and the rectangular shaped defective polarizing sheets can only be removed selectively in the later process.

Proposals relating to a preliminary inspection apparatus for a polarizing composite film have previously been made, as disclosed, for example, in Japanese Patent No. 3974400B (Patent Document 10), Japanese Laid-Open Patent Publications 2005-62165A (Patent Document 11) and 2007-64989A (Patent Document 12). These proposals relate to method based on the use of individualized sheets, and primarily includes the steps of inspecting defects in a web of a polarizing composite film being continuously fed to determine positions or coordinates of detected defects, if any, through image processing, encoding information obtained by the image processing, directly printing the encoded information on marginal or edge portion of the polarizing composite film which will be left in the web after cutting the polarizing composite film during the production of the individualized sheets, and taking up the resulting polarizing composite film to form a roll. The method further comprises the steps of reading the encoded information printed on the polarizing composite film fed out of the roll, providing marks at the positions of the defects based on the results of determination on the presence of defects, cutting the polarizing composite film for producing individualized sheets, and based on the marks provided beforehand, sorting the individualized sheets into normal and defect-containing products. The above steps have been believed as being essential to improving yield in the manufacture of such individualized sheets.

Just for reference, in the Patent Document 10 or 12, the polarizing composite film is termed as "sheet-shaped member", and there is described that the sheet-shaped member may include "for example, a polarizing composite film, a phase difference film, an plastic sheet for organic electroluminescent (EL) elements, a plastic sheet for liquid-crystal cells, and a plastic sheet for solar battery boards". In an example illustrated in FIGS. 1 (a) and 1 (b) of the Patent Document 10 or 12, the sheet-shaped member includes a polarizing composite film, which has a polarizer and two protective films laminated to respective ones of the opposite surfaces of the polarizer, and there is described that the polarizing composite is punched out or cut into sheets and the resultant sheet is termed as "product". In the Patent Document 11, the polarizing composite film is termed as a "polarizing plate stock", and a cut piece is termed as a "sheet-shaped product". The Patent Documents 10 or 12 first describes a method wherein an inspection unit is used to detect defects present in the polarizing composite film in terms of positions or coordinates locations of the defects. Then the detected information is encoded. The encoded information is printed by a recording device to print onto a polarizing composite film. The encoded information is printed onto appropriated positions of the polarizing composite film in such a manner as to be readable by a reading unit when a sheet is cut from the polarizing composite film. The polarizing composite film having the encoded information printed thereon is wound into a roll. The Patent Documents 10 to 12 also disclose a further manufacturing step wherein the roll produced in the first process is transformed into separate sheets of polarizing film by unrolling the polarizing composite film from the roll and forming sheets from the polarizing composite film. The manufacturing process further comprises a first sub-step of making a mark directly to a position or coordinate location of a defect of the polarizing composite film, based on the encoded information on the polarizing composite film and read by the reading unit, and a second sub-step of punching or slitting the polarizing composite film being fed out from the roll, and allowing the polarizing sheet punched out or cut from the polarizing composite film fed out from the roll to be sorted into a normal product and a defective product in the next process according to the presence or absence of marks.

It should be noted that there is a significant difference in the surrounding circumstances between the conventional technique where a plurality of individualized sheets are preliminarily formed from a continuous optical film laminate, and then transported in a batch into the manufacturing process of the liquid-crystal display element for lamination on respective ones of a plurality of liquid-crystal panels one-by-one, and a continuous manufacturing of liquid-crystal display elements that the present invention is aiming at, where only the sheets that are determined to be normal sheets are supplied to a lamination station to be laminated to the liquid-crystal panels, while unrolling a continuous optical film laminate with predefined slit lines, without interrupting the feed of the optical film laminate with slit lines, by providing a measure to keep the polarizing sheets, which are determined to be the defective polarizing sheet out of the normal polarizing sheets and the defective polarizing sheets that are sequentially formed separated from each other on the carrier film, from being laminated to the liquid-crystal panel, as described later.

For preventing the defective polarizing sheet of the polarizing composite film from being transported to the lamination station for lamination with liquid-crystal panels, it is generally a preferable way that in unrolling the continuous optical film laminate comprising the polarizing composite film, defective regions of the polarizing composite film are cut from the continuous optical film laminate as the defective polarizing sheet and removed from the manufacturing line. With this process, the feed of the continuous optical film laminate may be interrupted. If the defective regions of the polarizing composite film are left as they are in order to avoid interruption of the feed of the continuous optical film laminate, it becomes difficult to avoid defective liquid-crystal display elements being formed. Even though a manufacturing speed can be maintained, it is compelled to sacrifice product yield. This is one of the technical problems to be solved by the present invention. Specifically, the problem is how to remove the defective region or defective polarizing sheets of the polarizing composite film included in the continuous optical film laminate in the process of the feed of the continuous optical film laminate without interrupting the feed.

The applicant has already proposed a manufacturing method by the Japanese Laid-Open Patent Publication 2007-140046A (Patent Document 13) wherein the method comprises the steps of peeling a carrier film from a continuous optical film laminate unrolled continuously from a roll of the continuous optical film laminate to expose a polarizing composite film having an adhesive layer, inspecting a defect or defects present in the polarizing composite film, punching or cutting only normal regions of a polarizing composite film into a rectangular shape, while leaving the defective region or regions of the polarizing composite film in the place, and transporting the resulting normal polarizing sheet to a lamination position using another conveyance medium. It should however be noted that this process is not the one which makes it possible to feed only the normal polarizing sheets produced from the continuous optical film laminate to the lamination station with the liquid-crystal panel by means of the carrier film. This technique is a method where the plurality of cut and individualized sheets are releasably laminated to another conveyance medium and transported to the lamination station with the liquid-crystal panel, which is similar to the method where the polarizing composite film is cut on separately provided conveyance medium, and the sheet is transported to the lamination station with the liquid-crystal panel, disclosed in Patent Document 4. It should be referred that this technique is not beyond the individualized sheet manufacturing system of the liquid-crystal display elements.

The applicant has further disclosed by the Japanese Patent Application No. 2007-266200 an invention relating to a method and a system for laminating a polarizing sheet to a liquid-crystal panel, as shown in FIG. 2. This is a method and system for manufacturing liquid-crystal display elements comprising the steps of peeling a first carrier film which is provided for protecting the adhesive layer of a polarizing composite film contained in the continuous optical film laminate preliminarily inspecting a defect or defects present in the continuous polarizing composite film having the adhesive layer exposed by peeling the first carrier film, feeding a second carrier film and releasably laminating the second carrier film to the exposed adhesive layer of the polarizing composite film to provide again a protection for the adhesive layer. Therefore, it is possible to inspect a defect or defects present in the polarizing composite film during the feeding operation of the continuous optical film laminate without interrupting the feed. Then, this method further comprises a step of forming a plurality of slit lines in the continuous optical film laminate along a direction transverse to the feed direction of the optical film laminate, the slit lines being formed to a depth reaching the inner surface of the second carrier film to thereby define defect-containing polarizing sheets and defect-free, normal non-defective polarizing sheets between respective longitudinally adjacent two slit lines formed sequentially on the optical film laminate along the feed direction, while the defective polarizing sheet and the defect-free, normal polarizing sheet respectively corresponds to a defective region including defects and normal region including no defect of the polarizing composite film segmented into a plurality of rectangular shape as determined by the result of the inspection for the existence of defects in the polarizing composite film. This method also comprises a step of automatically removing only the defective polarizing sheets from the second carrier film and feeding only the normal polarizing sheets left on the second carrier film to a lamination station. Finally, the method comprises the step of peeling the normal polarizing sheets from the second carrier film, and laminating each of the normal polarizing sheets to one of opposite surfaces of each of the liquid-crystal panels. This method contains an innovative proposal allowing for shifting from a conventional liquid-crystal display element manufacturing system which is designed to carry a plurality of preliminarily formed individualized sheets in a batch in the manufacturing process of the liquid-crystal display element, and laminate the individualized sheets one by one to respective ones of a plurality of liquid-crystal panels, to a continuous manufacturing system for liquid-crystal display element designed to continuously form a plurality of polarizing sheets from a continuous optical film laminate fed out from a roll, and directly laminate the formed sheets to respective ones of a plurality of liquid-crystal panels. The roll of the continuous optical film laminate used in the above method is a roll of the continuous optical film laminate that comprises a polarizing composite film having an adhesive layer which at least is not preliminarily inspected and a carrier film that is releasably laminated on the adhesive layer.

The technical challenge of the aforementioned method and apparatus shown in FIG. 2 of the Patent Application No. 2007-266200 has been how to realize the technical measures for forming a plurality of slit lines in the continuous optical film laminate in a direction transverse to the feed direction of the continuous optical film laminate at a side opposite to the second carrier film to a depth reaching the adhesive surface of the second carrier film, during the feed of the continuous optical film laminate, to form defective polarizing sheets and normal polarizing sheets, between respective two of the slit lines formed sequentially along the feed direction, the defective polarizing sheets and the normal polarizing sheets respectively corresponding to the preliminarily defined defective and defect-free regions in the polarizing composite film as determined by the result of the inspection for the existence of a defect or defects in the polarizing composite film, while preventing only the defective polarizing sheets from being transported to the lamination position for lamination with the liquid-crystal panel. As a result, the technical challenge has been solved by providing steps of, for the inspection for defining the defective and defect-free regions, separating the continuous optical film laminate from the carrier film and/or the surface-protection film, and after the inspection, laminating a substitute carrier film and/or a surface protection film again on the continuous optical film laminate, these steps being and incorporated as a series in the manufacturing process of the liquid-crystal display element. These steps have made it possible to inspect defects in the polarizing composite film during the manufacturing process of the liquid-crystal display elements by separating the carrier film and/or the surface protection film from the continuous optical film laminate comprising the polarizing composite film and exposing the polarizing composite film having the adhesive layer. It should be noted that these steps are essential to protect the surface opposite to the adhesive layer of the polarizing composite film and the exposed surface of the adhesive layer of the polarizing composite film. However, although these steps are essential, the steps cause not only substantial complexity in the entire system for laminating the normal polarizing sheets of the formed polarizing composite film to corresponding ones of the liquid-crystal panels but also an increase in the number of steps and difficulty in control for each step, and as a matter of course, cause corresponding reduction in the manufacturing speed.

The present invention has been made based on the aforementioned prior proposals and through intensive researches and considerations for significantly enhancing product accuracy and manufacturing speed, and drastically improving manufacturing yield, in the manufacture of liquid-crystal display elements.

The prior art documents referred to in the above descriptions are listed below.

Patent Document 1: Japanese Laid-Open Patent Publication 2003-161935A
Patent Document 2: Japanese Patent No. 3616866B
Patent Document 3: Japanese Patent Publication 62-14810B
Patent Document 4: Japanese Laid-Open Patent Publication 55-120005A
Patent Document 5: Japanese Laid-Open Patent Publication 2002-23151A
Patent Document 6: Japanese Laid-Open Patent Publication 2004-144913A
Patent Document 7: Japanese Laid-Open Patent Publication 2005-298208A
Patent Document 8: Japanese Laid-Open Patent Publication 2006-58411A
Patent Document 9: Japanese Laid-Open Patent Publication 2004-361741A
Patent Document 10: Japanese Patent No. 3974400B
Patent Document 11: Japanese Laid-Open Patent Publication 2005-62165A
Patent Document 12: Japanese Laid-Open Patent Publication 2007-64989A
Patent Document 13: Japanese Laid-Open Patent Publication 2007-140046A

DISCLOSURE OF THE INVENTION

Problem to be Solved by the Invention

As previously described, the VA-type and IPS-type liquid-crystal panels are advantageous over TN-type liquid-crystal panels from the viewpoint of manufacture in that there is no restriction in the VA and IPS-types that two polarizing sheets are required to be laminated to respective ones of front and rear surfaces of the liquid-crystal panel in 45 degrees oblique with respect to the polarization axis of the polarizing sheet on the respective sides of the liquid-crystal display element, due to the viewing angle characteristics inherent to the orientation of the liquid-crystal, as experienced in the manufacture of TN-type liquid-crystal panels. Therefore, in a process for continuously manufacturing liquid-crystal display elements using the VA-type and IPS-type liquid-crystal panels, it becomes possible to carry out the process through steps of sequentially peeling an optically functional film sheet from a carrier film and laminating the sheet to respective ones of a plurality of liquid-crystal panels, while feeding the continuous optical film laminate comprising a carrier film on which an optically functional film sheet is releasably laminated. In addition, when the continuous optical film laminate is being fed, if only the sheets determined to be the defect-free, normal polarizing sheets, among the polarizing sheets being formed, are laminated to respective ones of a plurality of liquid-crystal panels to make liquid-crystal display elements, without interrupting the feed of the continuous optical film laminate, it becomes possible to obtain enhanced product accuracy and manufacturing speed as well as significantly improved production yield in the manufacture of liquid-crystal display elements.

It is therefore an object of the present invention to provide a method and system for continuously laminating only normal polarizing sheets without interrupting feeding operation of a continuous optical film laminate while removing defect-containing polarizing sheets from the manufacturing line so that the defect-containing polarizing sheets are not laminated to liquid-crystal panels.

Another object of the present invention is to provide a method and system wherein the continuous optical film laminate comprises at least an optically functional film having an adhesive layer provided thereon and a carrier film releasably laminated on said adhesive layer, the optically functional film including at least one defect-free region and at least one defect-containing region, the defect-free and defect-containing regions being defined along the longitudinal direction in accordance with position or positions of a defect or defects existing in the optically functional film and detected through a preliminary inspection, the defect-free region having a predefined length corresponding to the dimension of the liquid-crystal panel, the defect-containing region including at least one defect and defined as a region having a predefined length which is different from the length of the defect-free region, the length of the defect-containing region being defined across the position or positions of the defect or defects, wherein slit lines are sequentially formed to extend in a transverse direction of the optical film laminate at a side opposite to the carrier film to a depth reaching the surface of the carrier film adjacent to the adhesive layer, the slit lines forming at least one defect-free, normal polarizing sheet having no defect and at least one defect-containing polarizing sheet having at least one defect and separated from the normal polarizing sheets on the carrier film.

Means for Solving the Problem

According to one aspect of the present invention, there is provided a method for continuously manufacturing liquid-crystal display elements, which uses a continuous optical film laminate comprising at least an optically functional film having an adhesive layer applied thereto and a carrier film releasably laminated on said adhesive layer, the optically functional film including at least one defect-free region and at least one defect-containing region, the defect-free and defect-containing regions being defined along a longitudinal direction of the laminate in accordance with position of a defect existing in the optically functional film and detected through a preliminary inspection, said defect-free region having a predefined length corresponding to a length of a liquid-crystal panel to which the laminate is to be applied, said defect-containing region including at least one defect and defined as a region having a predefined length which is different from the length of said defect-free region, the length of the defective region being defined across said position of the defect, slit lines being sequentially formed in a transverse direction of said optical film laminate at a side opposite to said carrier film to a depth reaching the surface of said carrier film adjacent to said adhesive layer, said slit lines forming at least one defect-free, normal polarizing sheet having no defect and at least one defect-containing polarizing sheet having at least one defect and separated from said normal polarizing sheets on said carrier film, said normal polarizing sheet and said defective polarizing sheet corresponding to respective ones of the regions in the optically functional film is wound with the carrier film into a roll of the continuous optical film laminate with predefined slit lines.

The method comprises steps of continuously feeding the continuous optical film laminate with the predefined slit lines from the roll of the continuous optical film laminate to a lamination station, measuring a feed length of the continuous optical film laminate having the predefined slit lines to determine the length of the sheet of the optically functional film defined between two longitudinally adjacent ones of the slit lines on the continuous optical film laminate, based on the feed length, comparing the determined length of the sheet of the optically functional film with a predefined length and thereby determining whether the sheet is a normal polarizing sheet or a defect-containing polarizing sheet, peeling the sheet from the continuous optical film laminate if the sheet of the optically functional film is determined to be a normal polarizing sheet, transporting a liquid-crystal panel in synchronization with the transportation of the normal polarizing sheet to the lamination station and laminating the normal polarizing sheet to the liquid-crystal panel.

According to one embodiment of the present invention, the method further comprises a step of removing a sheet determined to be a defect-containing polarizing sheet so as to prevent the sheet from being laminated to the liquid-crystal panel.

According to one embodiment of the present invention, the method uses a pair of laminating rollers disposed at the lamination station and movable vertically toward and away from each other, the step of laminating the normal polarizing sheet to the liquid-crystal panel at the lamination station further comprising steps of detecting position of the normal polarizing sheet transported to the lamination station in synchronization with the liquid-crystal panel, and adjusting the positions of the normal polarizing sheet and the liquid-crystal panel at the lamination station, such that the leading edge of the normal polarizing sheet transported between the lamination rollers while the rollers are in spaced-apart relation is adjusted with respect to the leading edge of the liquid-crystal panel to thereby register the normal polarizing sheet with the liquid-crystal panel, and then moving the lamination rollers toward each other to thereby press the normal polarizing sheet against the liquid-crystal panel to laminate the normal polarizing sheet on the liquid-crystal panel.

According to another embodiment of the present invention, there are provided a dummy file feed path for transporting a dummy film and a movable roller which is capable of being moved to an operative position to define a part of the dummy film feed path, the removing step being carried out by moving the movable roller to said operative position when a defect-containing sheet reaches a removing station for shifting the continuous optical film laminate carrying the defect-containing sheet which is defined by two adjacent slit lines, the defective polarizing sheet being peeled off the carrier film of the laminate and laminated to the dummy film being transported along the dummy film feed path.

According to a further embodiment of the present invention, there are provided a dummy file feed path for transporting a dummy film and a movable roller which is capable of being moved to an operative position to define a part of the dummy film feed path, the removing step including moving the movable roller to said operative position, when a defect-containing polarizing sheet defined by two adjacent slit lines reaches a position between the pair of lamination rollers while they are in spaced-apart relation at the lamination station, such that the movable roller cooperates with one of the lamination rollers by replacing the other of the lamination rollers whereby the movable roller and said one lamination roller cooperate to peel the defect-containing polarizing sheet from the continuous optical film laminate at the predefined slit lines and laminate it to the dummy film in the dummy film feed path.

According to one embodiment of the present invention, the method further comprises steps of pre-storing a plurality of liquid-crystal panels in a magazine, taking out the liquid-crystal panels one-by-one from the magazine, and, controlling a posture of liquid-crystal panel delivered to the lamination station in synchronization with the normal polarizing sheet as the polarizing sheet is transported to the lamination station.

According to one embodiment of the present invention, the step of controlling the posture of liquid-crystal panel performs the control, based on position information of leading edges of the normal polarizing sheet and the liquid-crystal panel obtained by detecting the leading edge of a normal polarizing sheet extending in transverse direction with respect to the feed direction of the continuous optical film laminate and the leading edge of the liquid-crystal panel extending in transverse direction with respect to the feed direction of the liquid-crystal panel.

According to a second aspect of the present invention, there is provided a system for continuously manufacturing liquid-crystal display elements, which uses a continuous optical film laminate comprising at least an optically functional film having an adhesive layer provided thereon and a carrier film releasably laminated on said adhesive layer, the optically functional film including at least one defect-free region and at least one defect-containing region, the defect-free and defect-containing regions being defined along the longitudinal direction in accordance with position or positions of a defect or defects existing in the optically functional film and detected through a preliminary inspection, said defect-free region having a predefined length corresponding to a dimension of the liquid-crystal display element to be manufactured, said defect-containing region including at least one defect and defined as a region having a predefined length which is different from the length of said defect-free region, the length of the defect-containing region being defined across said position of the defect, wherein slit lines are sequentially formed in a transverse direction of said optical film laminate at a side opposite to said carrier film to a depth reaching the surface of said carrier film adjacent to said adhesive layer, said slit lines forming at least one defect-free normal polarizing sheet having no defect and at least one defect-containing polarizing sheet having at least one defect and separated from said normal polarizing sheets on said carrier film, said continuous optical film laminate having said normal polarizing sheet and said defect-containing polarizing sheet on the carrier film being provided in the form of a roll.

The system comprises a support rack for rotatably mounting a roll of the continuous optical film laminate, a feed unit for continuously feeding the continuous optical film laminate from the roll to a lamination station for lamination with a liquid-crystal panel, a measuring unit for measuring a feed length of the continuous optical film laminate and calculating the length of each sheet of the optically functional film separated by respective ones of sequentially formed slit lines on the continuous optical film laminate based on the feed length, a control unit for comparing the length of the sheet of the optically functional film to a predefined length to thereby determine whether the sheet is a normal polarizing sheet or a defect-containing polarizing sheet, a peeling unit for peeling the normal polarizing sheet from the continuous optical film laminate when the sheet of the optically functional film is determined to be a normal polarizing sheet, and a lamination unit for transporting the liquid-crystal panel in synchronization with the normal polarizing sheet transported to the lamination station and laminating the normal polarizing sheet to the liquid-crystal panel.

According to one embodiment of the present invention, the system further comprises a defect-containing polarizing sheet removal unit for removing a sheet determined to be a defect-containing polarizing sheet for preventing the defect-containing polarizing sheet from being laminated to the liquid-crystal panel.

According to a further embodiment of the present invention, the lamination unit for laminating the normal polarizing sheet to the liquid-crystal panel at the lamination station further comprises a pair of laminating rollers disposed at the lamination station and vertically movable toward and away from each other, and an adjusting unit for adjusting the position of the normal polarizing sheet with respect to the liquid-crystal panel at the lamination station by detecting the position of the normal polarizing sheet transported to the lamination station in synchronization with the liquid-crystal panel transported to the lamination station, wherein the adjusting unit adjusts the position of the leading edge of the normal polarizing sheet with respect to the leading edge of the liquid-crystal panel to register as they are transported to a position between the lamination rollers while the rollers are in spaced-apart relation, and then the lamination rollers are moved toward each other to have the normal polarizing sheet laminated to the liquid-crystal panel.

According to one embodiment of the present invention, the defective polarizing sheet removal unit comprises a dummy film drive mechanism including a dummy film feed path for a dummy film which is adapted for transporting a defect-containing polarizing sheet in laminated-state therewith, and a moving unit for moving the continuous optical film laminate toward the dummy film feed path, wherein, when a defect-containing polarizing sheet reaches the removal station, the moving unit operates to move the continuous optical film laminate toward the dummy film feed path to bring the defect-containing polarizing sheet into contact with the dummy film to have the defect-containing polarizing sheet peeled off the continuous optical film laminate.

According to one embodiment of the present invention, the defective polarizing sheet removal unit comprises a dummy film drive mechanism having a dummy film feed path for a dummy film which is adapted for transporting a defect-containing polarizing sheet in laminated-state therewith, and a movable roller constituting a part of the dummy film feed path, wherein, when a defect-containing polarizing sheet reaches to a position between the lamination rollers while they are in spaced-apart relation at the lamination station, the movable roller is moved to a position where it functions to replace one of the lamination rollers so that the movable roller and the other of the lamination rollers cooperate to peel the defect-containing polarizing sheet from the continuous optical film laminate.

According to one embodiment of the present invention, the system further comprises a liquid-crystal panel conveyance apparatus including a magazine for storing a plurality of liquid-crystal panels, a conveyance unit for taking out the liquid-crystal panels one-by-one from the magazine, and, a liquid-crystal panel posture control device for controlling a posture of liquid-crystal panel delivered to the lamination station in synchronization with the normal polarizing sheet transported to the lamination station.

According to one embodiment of the present invention, the liquid-crystal panel posture control device comprises a normal polarizing sheet leading edge detection unit for detecting the leading edge of a normal polarizing sheet extending in transverse direction with respect to the feed direction of the continuous optical film laminate, a liquid-crystal panel leading edge detection unit for detecting the leading edge of a liquid-crystal panel extending in transverse direction with respect to the feed direction of the liquid-crystal panel, and a posture control device for controlling the posture of the liquid-crystal panel, based on position information of the leading edges of the normal polarizing sheet and the liquid-crystal panel obtained by the respective detection units.

BRIEF DESCRIPTION OF THE DRAWINGS

FIG. 20 is a table showing a defect inspection unit, types of defect and a defect detection method according to one embodiment of the present invention.

BEST MODE FOR CARRYING OUT THE INVENTION

The present invention will now be described with reference to specific embodiments illustrated in the accompanying drawings.

Figure 3:
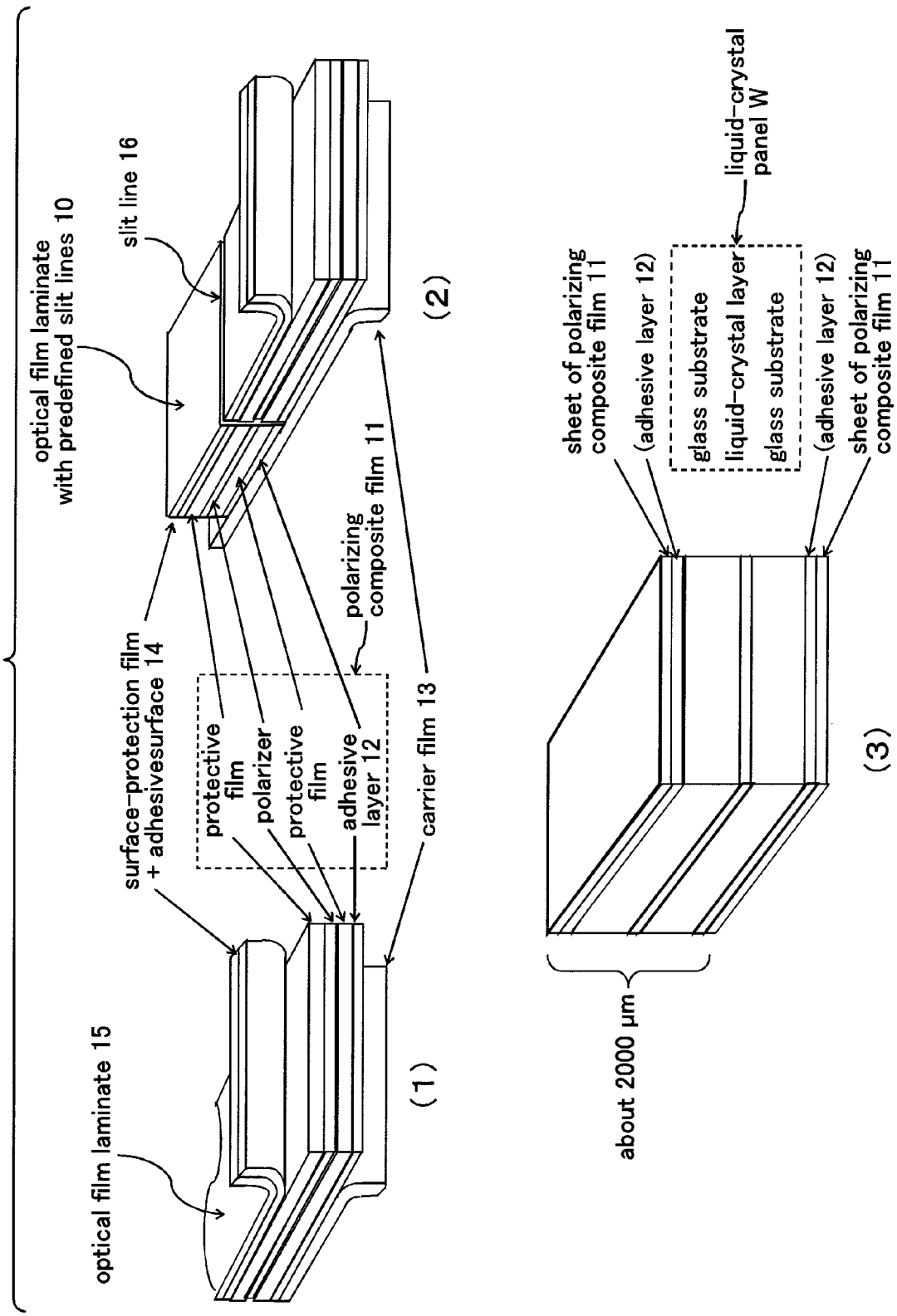
FIG. 3 is a schematic diagram showing the structure of a continuous optical film laminate with predefined slit lines for use in continuously manufacturing liquid-crystal display element according to the present invention.

1. General Description of Continuous Optical Film Laminate with Predefined Slit Lines FIG. 3(1) shows in fragmentary perspective view a continuous optical film laminate 15 which can be used in the method and apparatus in accordance with one embodiment of the present invention and comprised of an optically functional film 11 and a carrier film 13 to which the optically functional film 11 is attached. FIG. 3(2) is a schematic diagram specifically showing a predefined slit line 16 produced in the laminate to divide the optically functional film 11 on the laminate into a plurality of sheets. The slit line 16 is formed to extend in a transverse direction of the continuous web of the optical film laminate. A plurality of slit lines are formed along the length of the laminate 15 with spacings between two adjacent slit lines 16. FIG. 3 (3) is a schematic diagram showing a liquid-crystal display element manufactured by laminating the above mentioned optically functional film sheet 11 to a liquid-crystal panel.

The continuous optical film laminate 15 having predefined slit lines 16 is hereinafter referred as a slitted optical film laminate 10 and includes sheets 11 of the optically functional film which are to be laminated to a liquid-crystal panels W, According to the illustrated embodiment, the optical film laminate 15 comprises the aforementioned optically functional film 11 and the carrier film 13, the optically functional film 11 being embodied as a polarizer having transparent protective films attached to the opposite sides, an adhesive layer 12 being attached to the surface of one of the transparent protective films. A surface-protection film 14 is attached through an adhesive layer to the surface of the other of the transparent protective films. The polarizer is designed to be attached to a liquid-crystal panel W with the adhesive layer 12. The carrier film 13 is releasably laminated on the adhesive layer 12, wherein the optically functional film 11 and the surface-protection film 14 are cut simultaneously on the carrier film 13 along slit lines formed in the transverse direction of the continuous optical film laminate 15.

The optically functional film 11 generally comprises a continuous web of polarizer, a pair of protective films respectively laminated on the opposite surfaces of the polarizer, and an acrylic adhesive layer 12 on the protective film on the side of the polarizer which is to be applied to the liquid-crystal panel W. The carrier film 13 is releasably laminated to the adhesive layer 12 for protecting the exposed side of the exposed adhesive layer 12 of the polarizing composite film 11. The optically functional film 11 is formed through the following process, for example. First, a continuous polarizer having a thickness of 20 to 30 μm is formed by subjecting a PVA (polyvinyl alcohol)-based film having a thickness of about 50 to 80 μm to a dyeing treatment using iodine and a cross-linking treatment, the resultant PVA-based film being then subjected to an orientation treatment which is carried out by stretching the film in a lengthwise or widthwise direction thereof. As a result, the iodine complex is oriented in the direction parallel to the stretching direction of the PVA-based film to acquire a property of absorbing a polarized light having a plane of oscillation matching with the orientation of the iodine complex to thereby provide a polarizer having absorption axes in the direction parallel to the stretching direction. Thus, in order to produce a continuous polarizer having an excellent optical property in addition to excellent uniformity and accuracy, it is desirable that the stretching direction of the PVA-based film corresponds to the lengthwise or widthwise directions of the film. Generally, the absorption axis of the polarizer or the optically functional film including such polarizer is parallel to the lengthwise direction of the optically functional film, and the polarizing axis is in the widthwise direction perpendicular to the absorption axis. Then, the protective film is laminated to one or each of the opposite surfaces of thus formed continuous polarizer with an adhesive. Finally, on one side of the continuous polarizer having the protective film laminated thereon, the acrylic adhesive layer 12 is applied for attachment of the polarizer to the liquid-crystal panel W. Generally, a transparent TAC (triacetylcellulose)-based film having a thickness of about 40 to 80 μm is often used as the protective film for protecting the continuous polarizer. In the following description, the continuous web of the polarizer may be simply referred as "polarizer." In addition, unless it is necessary to differentiate, the optically functional film may be simply referred as "polarizing composite film."

According to the definition of terms in "SEMI (Semiconductor Equipment and Materials International) Draft Document" on polarizing films for flat-panel display elements including liquid-crystal display elements (FPD Polarizing Films), the term corresponding to the "polarizing composite film and layer" constituting a polarizing composite film for use in a liquid-crystal display element is referred as "films and layer composing polarizing films". Thus, the polarizing composite film 11 in the perspective view at FIG. 3(1) is interpreted as corresponding to the "film composing polarizing films", so-called a polarizing composite film. Thus, the sheet in the perspective view at FIG. 3(3) which is formed in a rectangular shape from the polarizing composite film 11, corresponds to "polarizing films", so that it may be preferable to apply the term "polarizing sheet" to the latter, rather than the commonly called name "polarizing plate". In the following description, a film including a polarizer, a protective film laminated on one or both of opposite surfaces of the polarizer, and an adhesive layer formed on one side of the polarizer to be laminated to a liquid-crystal panel W, will be referred as "polarizing composite film", or "polarizing film", and a sheet commonly called by the name "polarizing plate", which is formed in a rectangular shape from the polarizing composite film or polarizing film, will be referred to as "polarizing sheet" or simply "sheet". In addition, when a sheet is formed from an optical film laminate including a polarizing composite film having a surface-protection film and a carrier film attached thereto, and when this sheet has to be distinguished from "a polarizing sheet", the former is referred as "an optical film laminate sheet", and a sheet formed from the surface-protection film or the carrier film included in the composite film is respectively referred as "a surface-protection film sheet" or "a carrier film sheet" respectively.

The polarizing composite film 11 generally has a thickness of about 110 to 220 μm. The polarizing composite film 11 is generally comprised of a polarizer having a thickness of about 20 to 30 μm, a protective film of which thickness may be about 80 to 160 μm when two protective films are laminated on respective ones of opposite surfaces of the polarizer, and an adhesive layer 12 of which thickness formed on one side of the polarizer to be laminated to a liquid-crystal panel W is about 10 to 30 μm. The polarizing composite films 11 are laminated to respective ones of the front and back sides of the liquid-crystal panel W with the adhesive layer 12 in such a manner that polarizing axes intersect each other at an angle of 90 degrees. Thus, in manufacturing a liquid-crystal display element for a widescreen television having a diagonal screen size of 42 inch, on an assumption that a thickness of a liquid-crystal panel W itself is about 1400 μm, and since the thickness of each of the polarizing composite films 11 is in the range of 110 to 220 μm, the liquid-crystal display element itself has an overall thickness of about 1620 to 1840 μm. The thickness of the liquid-crystal display element is still within 2.0 mm or less. In this case, the ratio of the thickness of the liquid-crystal display element to the overall thickness of the liquid-crystal panel W, and the polarizing composite film 11 is about 10:1.5 to 10:3. If use is made of a polarizing composite film 11 having a protective film laminated to only one surface of the polarizer, and an adhesive layer 12 formed on the other surface of the polarizer, from the viewpoint of reducing the thickness of the liquid-crystal display element, the thickness of the polarizing composite film 11 itself can be reduced to 70 to 140 μm, so that an overall thickness of the resultant liquid-crystal display element is reduced to a range of about 1540 to 1680 μm. The ratio of the thickness of the liquid-crystal element to that of the liquid-crystal panel W and the polarizing composite film 11 will be in the range of about 10:1 to 10:2.

A continuous optical film laminate with predefined slit lines 10, according to the embodiment, for use in a liquid-crystal display element has a structure as shown in FIG. 3 (2). The structure of the optical film laminate with predefined slit lines 10 will be briefly described below, in connection with a manufacturing process thereof. A surface-protection film 14 with an adhesive surface having a thickness of about 60 to 70 μm is releasably laminated to the surface of a polarizing composite film 11 devoid of an adhesive layer, and a carrier film 13 is releasably laminated to an adhesive layer 12 provided on the surface of a polarizing composite film 11 which is to be laminated to the liquid-crystal panel W for providing a function of protecting the adhesive layer 12. Typically, a PET (polyethylene terephthalate)-based film is used for each of the carrier film 13 and the surface-protection film 14. During the manufacturing process of the liquid-crystal display element, the carrier film 13 generally serves as a carrying medium (carrier) for the polarizing composite film, as well as the means to protect the adhesive layer 12, and thus it will hereinafter be referred as a "carrier film". Both of the carrier film 13 and the surface-protection film 14 are so-called "manufacturing-process materials" which are to be peeled and removed prior to the final stage of the manufacturing process of the liquid-crystal display element. Both of the films are to be used for protecting the non-adhesive surface from being soiled or damaged, and also protecting the exposed surface of the adhesive layer, of the polarizing composite film 11, during the manufacturing process of the liquid-crystal display elements.

In the polarizing composite film 11, one of the protective films for protecting the polarizer may be replaced with a phase difference film made of a cycloolefin-based polymer, a TAC-based polymer or the like and having an optical compensation function. It may further be provided as a layer of a transparent substrate, such as a TAC-based substrate, having a polymer material, such as a polyester-based polymer or a polyimide-based polymer applied thereto and then cured. Further, in the case of a polarizing composite film to be laminated to the backlight side of the liquid-crystal display element, it may be possible to provide an additional function by laminating a brightness enhancement film to the backlight side protective film of the polarizer. In addition, regarding the structure of the polarizing composite film 11, there have been proposed various other variations, such as a technique of laminating a TAC-based film to one of opposite surfaces of the polarizer and laminating a PET film to the other surface of the polarizer.

One of methods for providing a polarizing composite film 11' including a polarizer and a protective film laminated on one or both of opposite surfaces of the polarizer devoid of an adhesive layer 12 for attaching to a liquid-crystal panel W comprises a step of laminating a carrier film 13 having a transferable adhesive layer formed thereon, to the surface of the polarizing composite film 11' to be laminated to the liquid-crystal panel W. A specific transfer technique is as follows. In a manufacturing process of the carrier film 13, the carrier film is subjected to a releasing treatment at the surface which is to be laminated to the polarizing composite film 11', the surface of the polarizing composite film 11' being the surface which is to be laminated to the liquid-crystal panel W, and then a solvent containing adhesive is applied to the treated surface and dried to form an adhesive layer on the carrier film 13. Then, the carrier film 13 having the formed adhesive layer is laminated to the polarizing composite film 11', for example, while unrolling the carrier film 13 and feeding out the polarizing composite film 11' in the same manner, so that the adhesive layer formed on the carrier film 13 can be transferred to the polarizing composite film 11' to thereby form the adhesive layer. Thus, instead of the adhesive layer formed in this manner, of course, the adhesive layer 12 may be formed by directly applying a solvent containing adhesive to the surface of the polarizing composite film 11' to be laminated to the liquid-crystal panel, and drying the same.

The surface-protection film 14 typically has an adhesive surface. Unlike the adhesive layer 12 on the polarizing composite film 11, the adhesive surface must be peeled from a polarizing sheet 11 of the polarizing composite film together with a surface-protection film sheet 14 (not shown) when the surface-protection film sheet 14 is peeled and removed from the polarizing sheet 11 during the manufacturing process of the liquid-crystal display elements. The reason is that the surface-protection film sheet 14 which is formed together with the polarizing sheet 11 is adapted for protecting the surface of the polarizing sheet 11 devoid of an adhesive layer 12 from the risk of being soiled or damaged, but not an adhesive surface to be transferred to the surface of the polarizing sheet 11. The perspective view of FIG. 3(3) shows the state after the surface-protection film 14 sheet is peeled and removed. It should further be noted that, irrespective of whether the polarizing composite film 11 has a surface-protection film laminated thereon, it may be possible to provide the polarizing composite film 11 at the surface of the protective film on the front side of the polarizing composite film with a hard coat treatment for protecting the outermost surface of the liquid-crystal display element, and/or a surface treatment for obtaining an anti-glare effect or the like, such as an anti-glare treatment.

2. A Continuous Manufacturing System and Method for Liquid-Crystal Display Element (General Description of a Continuous Manufacturing System for Liquid-Crystal Display Elements)

Figure 4:
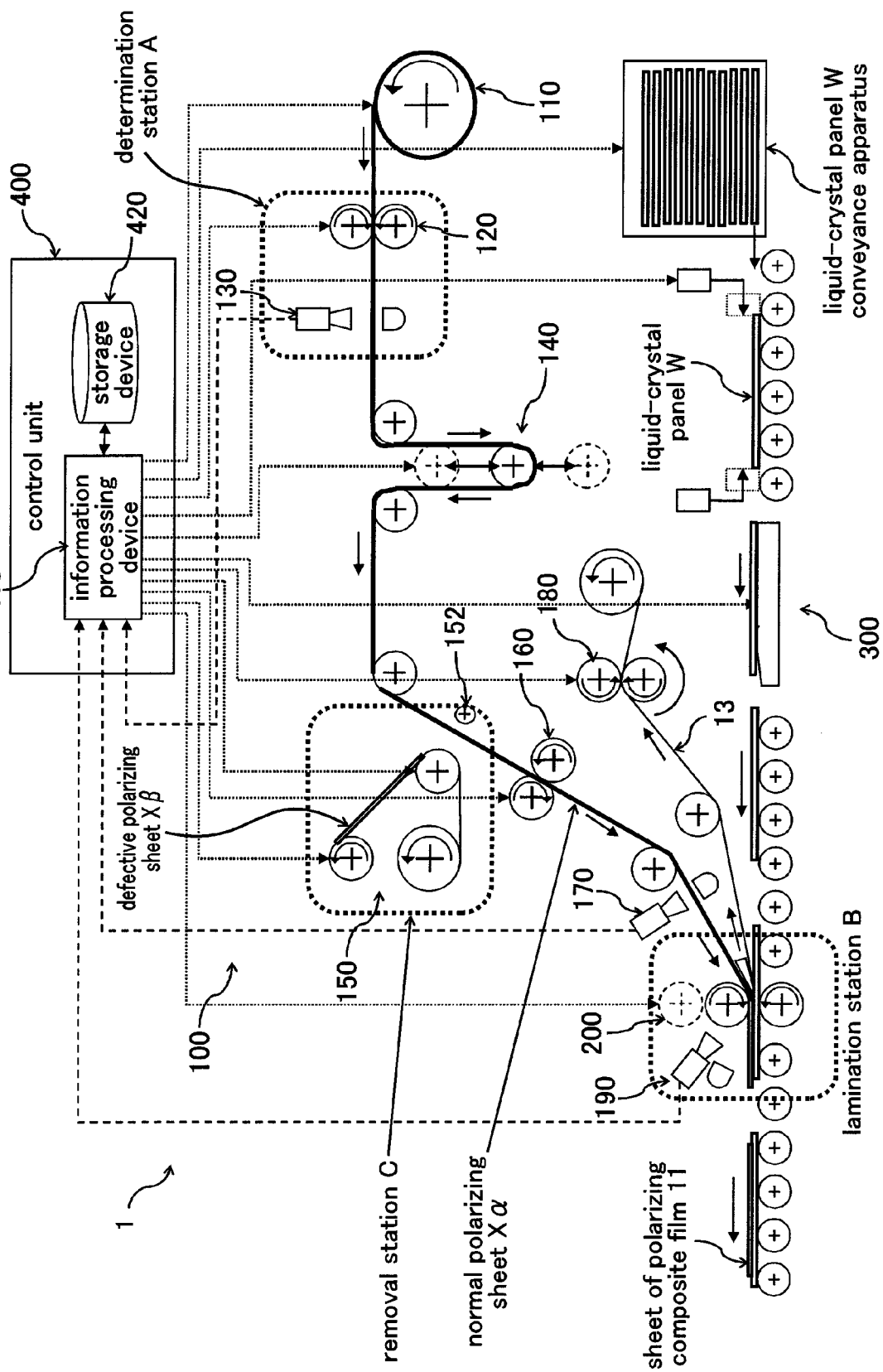
FIG. 4 is a conceptual diagram showing a liquid-crystal display element continuous manufacturing system according to one embodiment of the present invention, wherein the system comprises a feed apparatus for feeding a continuous optical film laminate with predefined slit lines, and a liquid-crystal-panel conveyance apparatus for feeding a plurality of liquid-crystal panels to be laminated with a normal polarizing sheet having an adhesive layer constituting the continuous optical film laminate with predefined slit lines.

FIG. 4 is a schematic diagram showing a continuous manufacturing system 1 for manufacturing liquid-crystal display elements. The system comprises a feed apparatus 100 for feeding a continuous optical film laminate with predefined slit lines 10. It also comprises a Liquid-crystal panel conveyance apparatus 300 for conveying each of a plurality of liquid-crystal panels W, wherein a continuous web of an optical film laminate with predefined slit lines 10 comprising normal polarizing sheets Xα and defective or defect-containing polarizing sheets Xβ separated from the normal polarizing sheet of the polarizing film 11 formed by slitting the web along slit lines 16 which are sequentially formed in a transverse direction of the optical film laminate, and a carrier film 13 releasably laminated to an adhesive layer 12 of the polarizing composite film 11 is fed to a lamination station B, and each of the plurality of liquid-crystal panels W to be sequentially laminated with only the normal polarizing sheet Xα which has the carrier film 13 removed is fed in synchronization with the feed of normal polarizing sheets Xα.

Figure 5:
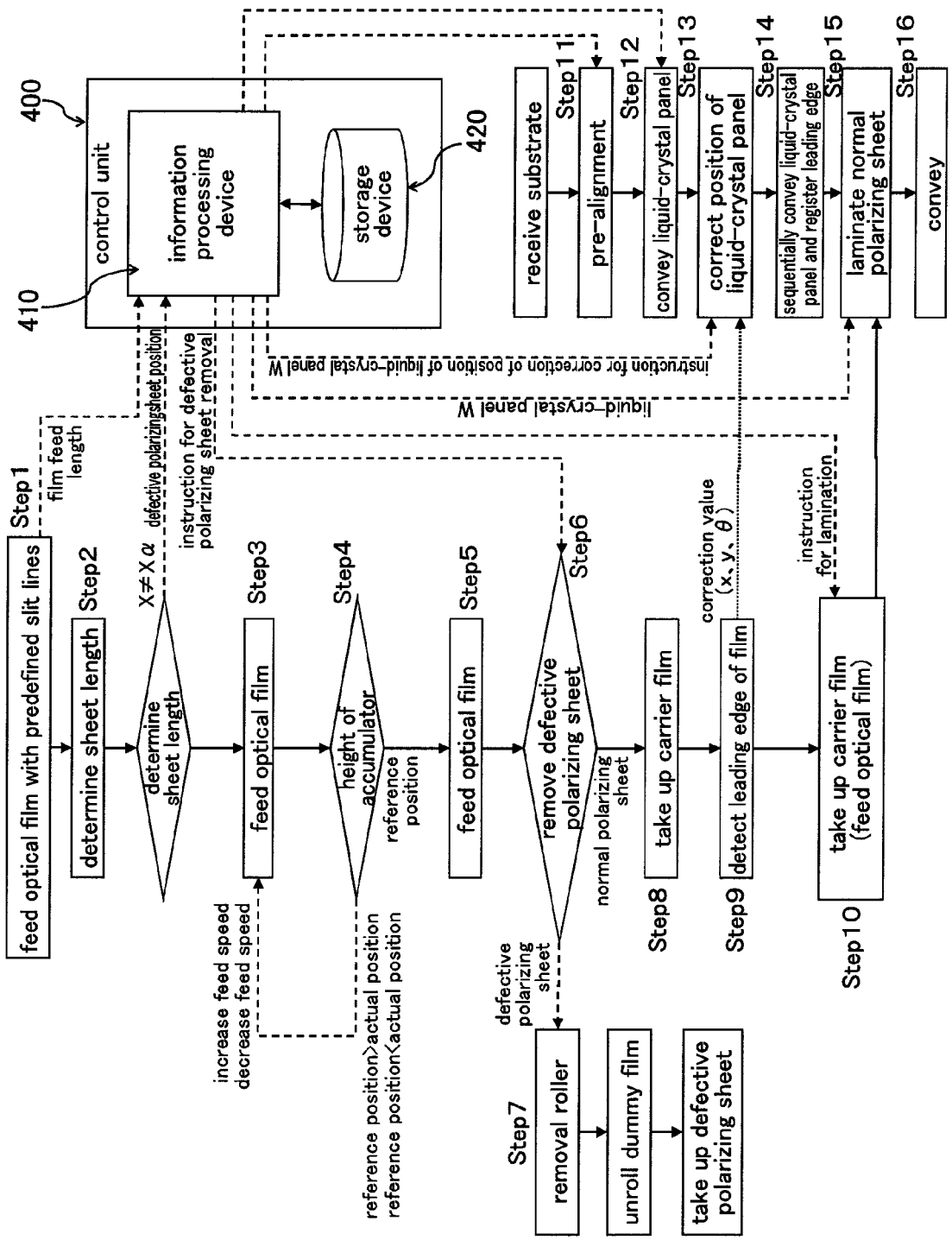
FIG. 5 is a flowchart showing manufacturing each of manufacturing processes or process steps in the system for continuously manufacturing liquid-crystal display elements in FIG. 4.

FIG. 5 is a flowchart showing a manufacturing process or process steps in the continuous manufacturing system for liquid-crystal display element in FIG. 4.

Figure 6:
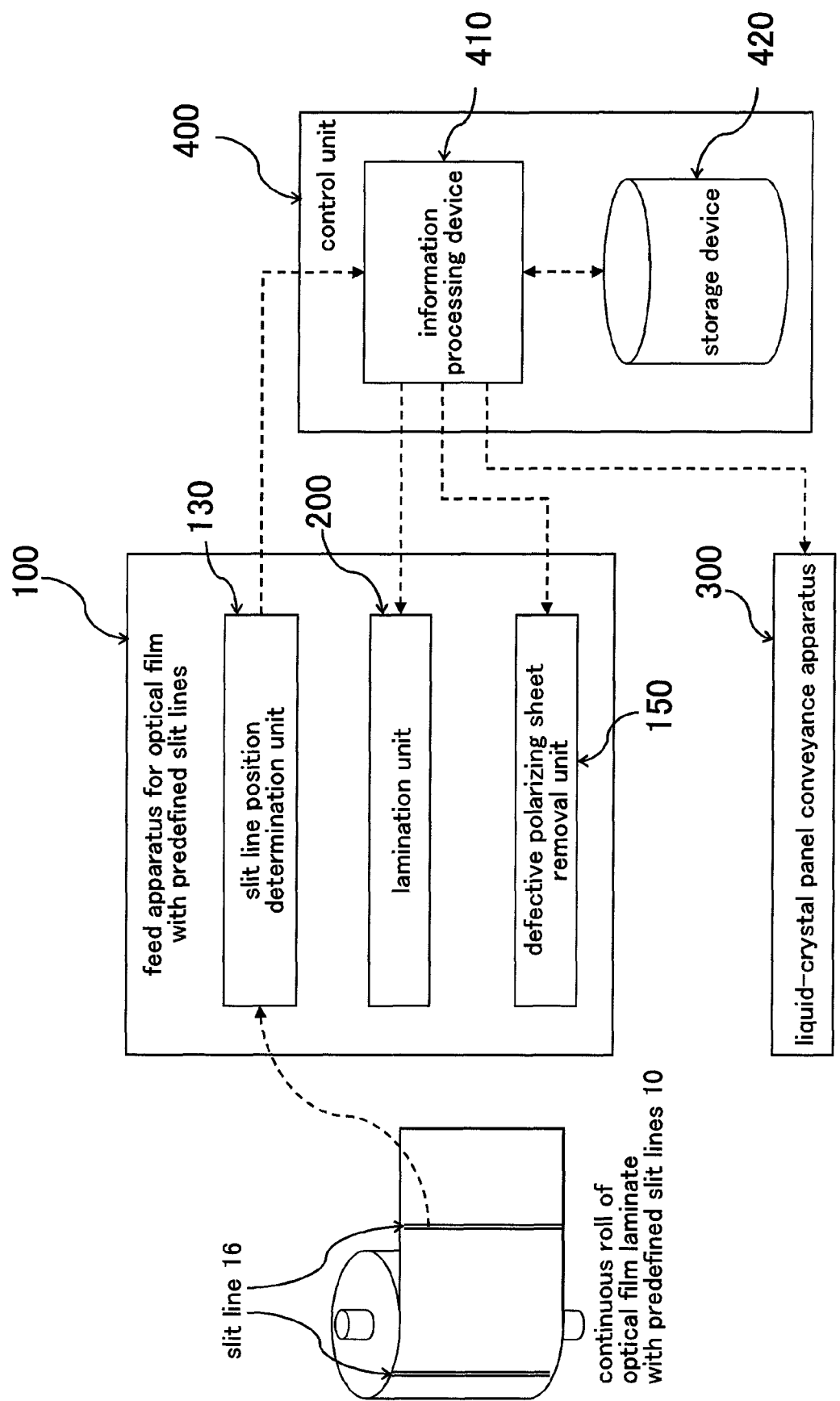
FIG. 6 is a schematic diagram showing the relationship between a control unit for controlling device of the feed apparatus of the continuous optical film laminate with pre-defined slit lines and the Liquid-crystal panel conveyance apparatus illustrated in FIG. 4, and information read by a determination unit in the continuous manufacturing system of the liquid-crystal display element according to one embodiment of the present invention.

FIG. 6 is a schematic diagram showing the relationship between information formed by reading and imaging the slit lines 16 sequentially formed on the continuous optical film laminate by a determination unit 130, and a control unit 400 for controlling each of the feed apparatus 100 for the continuous optical film laminate 10, a liquid-crystal-panel lamination unit 200 for laminating only the normal polarizing sheet Xα to the liquid-crystal panel, and a liquid-crystal panel conveyance apparatus 300, in the continuous manufacturing system of the liquid-crystal display element according to the embodiment.

The feed apparatus 100 for feeding a continuous optical film laminate comprises a support rack 110 for rotatably mounting a roll of a continuous web of an optical film laminate 10 according to one embodiment of the present invention, as shown in the FIG. 4, a film feed apparatus 120 including a feed roller, and the aforementioned determination unit 130 for determining whether each of the polarizing composite film sheets 11 formed on the carrier film 13 by slitting the web along slit lines 16 is a normal polarizing sheet Xα or a defect-containing polarizing sheet Xβ, in cooperation with the control unit 400 at a determination station A. The apparatus further comprises a speed adjustment unit 140 including a dancing roller which functions to adjust the film path length for providing a constant film feed speed, and a defective-polarizing-sheet removal unit 150 provided at a removal station C, for peeling and removing a defective or defect-containing polarizing sheet Xβ from the carrier film 13. For the purpose, the removal unit 150 includes a movable roller 152 which is adapted to be moved between an operative position and a retracted inoperative position under the control of the control unit 400. There are further provided a film feed mechanism 160 which includes a feed roller, and a lamination unit 200 provided at a lamination station B, for peeling the normal polarizing sheets Xα from the carrier film 13 and laminating each of the normal polarizing sheets Xα to respective ones of the liquid-crystal panels W. The lamination unit 200 includes a pair of lamination rollers which are movable toward and away from each other under the control of the control unit 400. Still further, the apparatus 100 includes a carrier-film take-up drive mechanism 180 for taking up the carrier film 13, an optical film laminate edge detection unit 190 provided at the lamination station B for detecting a leading edge of the normal polarizing sheet Xα and a sheet orientation detection unit 170 for measuring deviations of the normal polarizing sheet Xα with respect to the feed direction and the transverse direction formed on the carrier film 13, for example, by taking images of the sheet using a CCD camera and subjecting the taken images to an image processing, whereby the measured deviations are calculated in terms of x, y and θ coordinates.

(Composition of the Continuous Optical Film Laminate with Predefined Slit Lines)

It is preferable that the continuous optical film laminate 10 according to this embodiment introduced into the feed apparatus 100 has a width corresponding to the dimension of a long or short side of a liquid-crystal panel to which it is applied. As shown in the FIG. 3 (1), a film preferably having a transparent protective film laminated on one or the opposite surfaces of the polarizer is used for the polarizing composite film 11 that comprises the continuous optical film laminate 15 before forming slit lines. As shown in FIG. 3 (2), the continuous optical film laminate 10 with predefined slit lines comprises a continuous optical film laminate 15 comprised of a polarizing composite film 11 including a polarizer having an adhesive layer 12 provided on the surface of the polarizer which has a transparent protective film laminated thereon and which is to be attached to a liquid-crystal panel W, and a carrier film 13 releasably laminated on the adhesive layer 12. The polarizing sheets 11 are formed separately on the carrier film 13 by slitting the web along slit lines 16 which are sequentially formed to extend in a transverse direction of the optical film laminate 15. FIG. 3 (3) is a schematic diagram showing a liquid-crystal display element in which two polarizing sheets 11 are applied to the opposite sides of the liquid-crystal panel W with their polarization axes crossed at an angle of 90 degrees. In FIG. 3 (3), the polarizing sheets 11 are shown in positions partly peeled apart from the carrier film 13. As shown in FIGS. 3(1) and 3(2), it may be possible if desired to provide a continuous optical film laminate 15 with an additional surface-protection film 14 having an adhesive layer releasably laminated on the surface of the polarizing composite film opposite to the surface on which the carrier film 13 is laminated. In that case, slit lines may be formed through the polarizing composite film 11 and the surface-protection film 14 to thereby form sheets of the polarizing composite film 11 and those of the surface-protection film 14 simultaneously on the carrier film 13.

The carrier film 13 primarily is a releasable film adapted to protect the adhesive layer 12 of the polarizing sheets 11 during the process wherein slit lines are formed in the continuous optical film laminate and when the polarizing sheets 11 are used to produce the liquid-crystal display elements. Therefore, when the polarizing sheets 11 are peeled off the carrier film at the adhesive layer 12 for lamination to the liquid-crystal panel W, the carrier film is taken up by a take-up roll. The carrier film 13 is a releasable film, however, in this embodiment, it functions as a carrying medium (that is, a carrier film) to carry polarizing sheets 11 which are formed on the carrier film 13 by slitting the web along slit lines 16, to the lamination station B. Thus, the term "carrier film" is used in this embodiment instead of using "releasable film."

Figure 10:
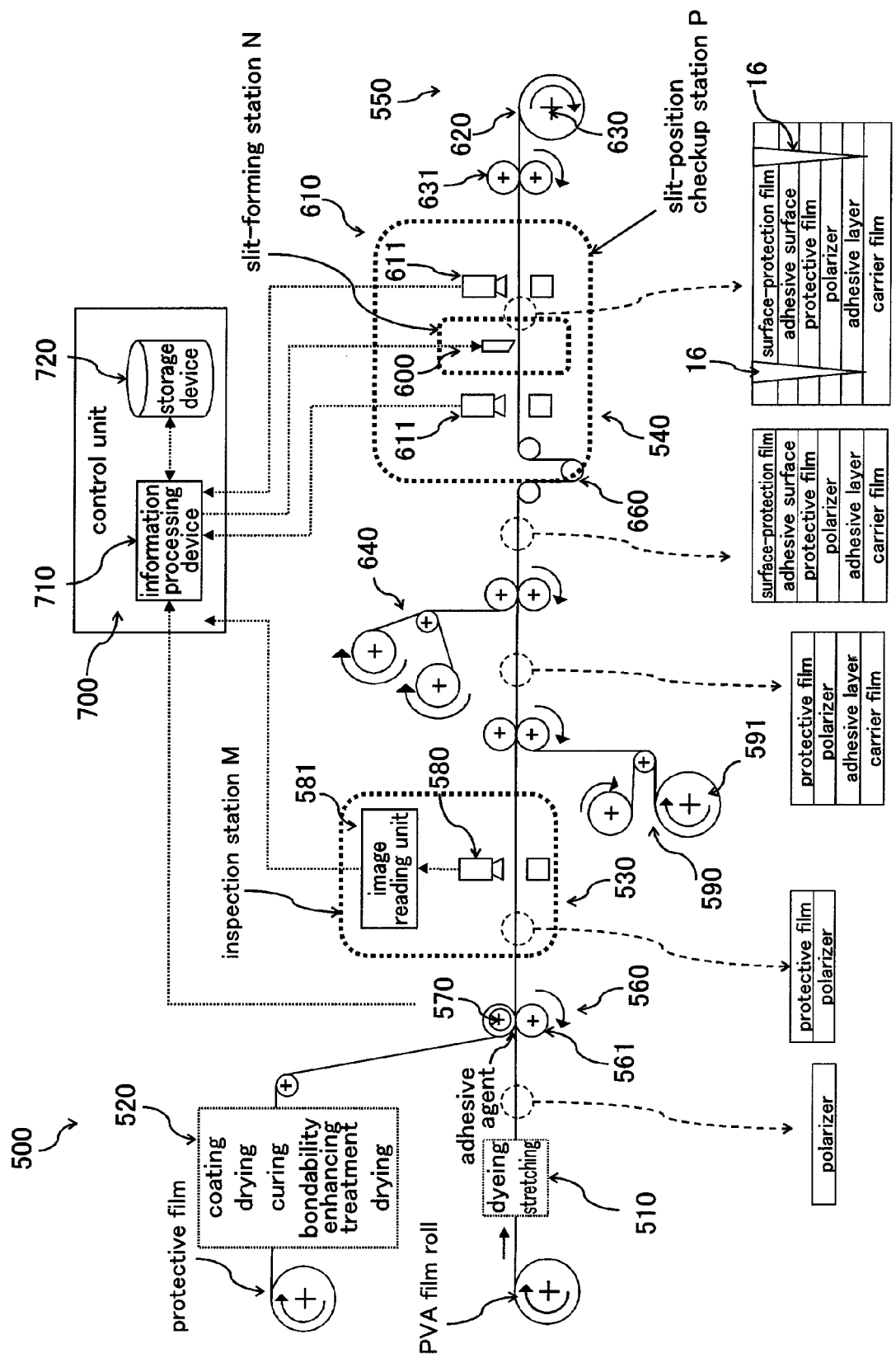
FIG. 10 is a schematic diagram showing a manufacturing method and system for a continuous optical film laminate with predefined slit lines, according to a first embodiment of the present invention.

The continuous optical film laminate with predefined slit lines 10 is manufactured by either of the following two methods. According to a first one of the methods, slit lines 16 are formed while the polarizing composite film 11' having a surface-protection film laminated at least one of the surfaces of a polarizer is being produced (FIG. 10). In this method, the polarizing composite film 11' is manufactured with a surface-protection film laminated to at least one of the surfaces of the polarizer and is immediately transported to an inspection station M. At the inspection station M, defects in the polarizing composite film 11' are detected by inspecting the surface and the inside of the transported continuous web of the polarizing composite film 11'. Then, based on the detected positions of defects, information processing is carried out on the polarizing composite film 11'. Thus, on the continuous web of the polarizing composite film 11', defect-free regions (Xα) and one or more defective regions (Xβ) are defined along the length of the polarizing composite film 11'. The defect-free region (Xα) has a predefined length corresponding to the dimension of the liquid-crystal panel W in the longitudinal direction and extends throughout the width of the polarizing composite film 11'. The defective region (Xβ) is a region including at least one defect having a predefined length which is different from the length of the defect-free region. The defective region (Xβ) is defined across the position of the defect and extends throughout the width of the polarizing composite film 11'.

The data relating to the regions (Xα) and (Xβ) is used in a later process to operate a slitting unit provided at a slit-forming station N to form slits in the transverse direction. The slitting unit functions to produce slits 16 at positions corresponding to the regions (Xα) and (Xβ) which extend throughout the width of the continuous optical film laminate 15. For preparing such data, information processing is carried out at the inspection station M, the carrier film 13 is then releasably laminated with the adhesive layer 12 to the polarizing composite film 11', to provide the continuous optical film laminate 15. When necessary, it is possible to provide the continuous optical film laminate 15 with a surface-protection film 14 having an adhesive layer releasably laminated on the polarizing composite film opposite to the surface on which the carrier film 13 is laminated.

The manufactured continuous optical film laminate 15 is then transferred to the slit-forming station N. The slitting unit provided at the slit-forming station N forms slit lines 16 in positions respectively corresponding to the defect-free regions (Xα) and the defect-containing regions (Xβ) on the optical film laminate 15, the slit lines being formed sequentially in the transverse direction on the optical film laminate 15 at the side opposite to the carrier film to a depth reaching the surface of the carrier film 13 adjacent to the adhesive layer. Thus, between the two slit lines 16 formed in sequence on the carrier film 13, one on the upstream side and one on the downstream side with respect to the feeding direction, the defect-free or normal sheet or the defective or defect-containing polarizing sheet is formed on the polarizing composite film 11'. The sheet thud formed may contain the surface-protection film. The continuous optical film laminate with predefined slit lines 10 is produced finally in this manner.

Figure 12:
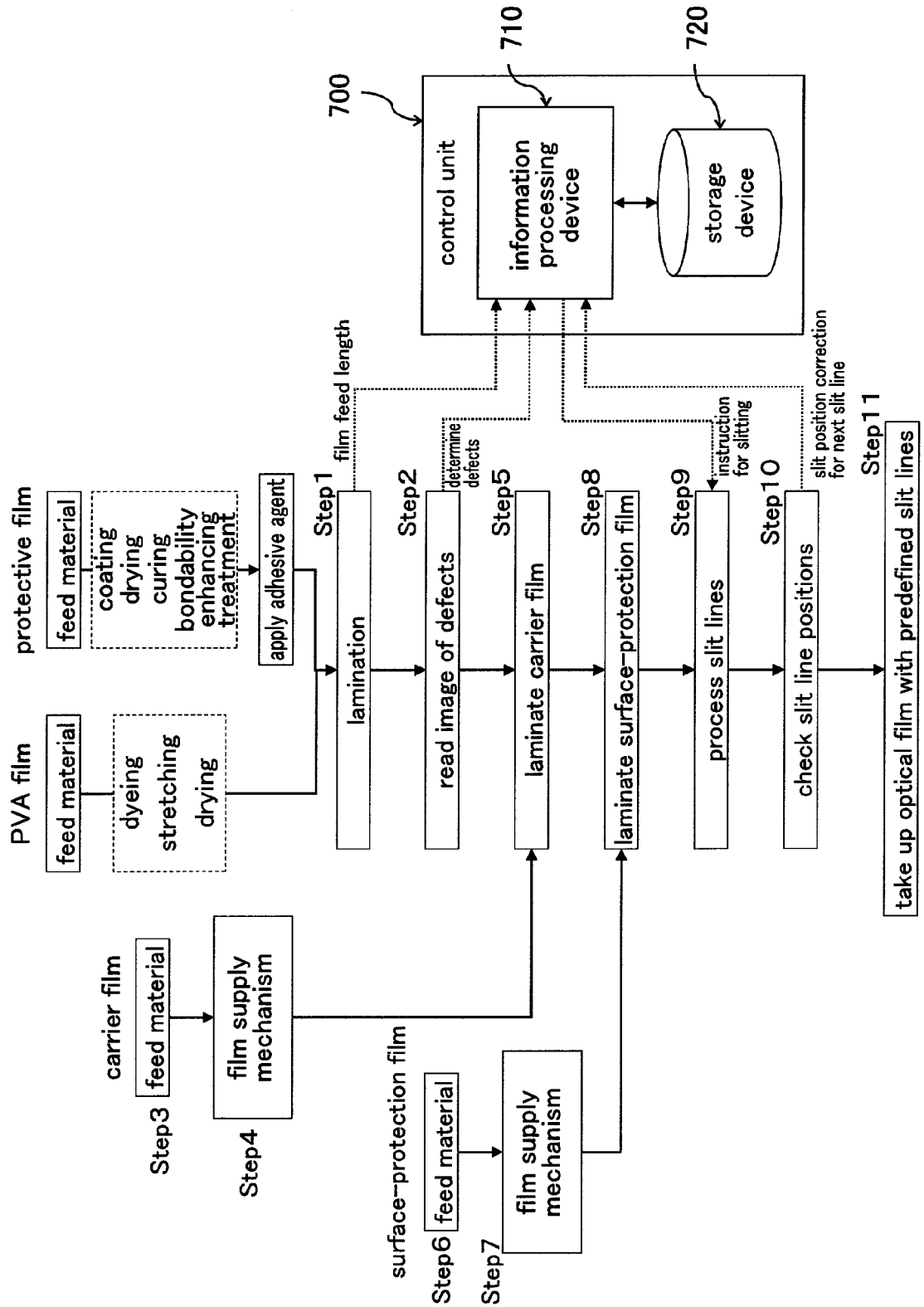
FIG. 12 is a flowchart showing manufacturing steps according to the first embodiment of the present invention.

The second manufacturing method is one that uses a continuous provisional optical film laminate 15' that comprises a polarizing composite film 11 at least including an adhesive layer 12 preliminarily provided, and a provisional carrier film 13' that is releasably laminated to the adhesive layer 12 (FIG. 12). First, the continuous provisional optical film laminate 15' is provided, for example, in the form of a roll and is supplied to the manufacturing process. Then, the continuous provisional optical film laminate 15' is fed out from the roll and transported to a peeling station L. At the peeling station L, the provisional carrier film 13' in the continuous provisional optical film laminate 15' is peeled at the adhesive layer 12 of the polarizing composite film 11, and thus the polarizing composite film 11 is exposed at the surface having the adhesive layer 12.

The polarizing composite film 11 having the exposed adhesive layer 12 is transported in the form of the continuous web to the inspection station M. At the inspection station M, defects in the continuous polarizing composite film 11 are detected by inspecting the surface and the inside of the transported polarizing composite film 11. Then, based on the detected positions of defects, information processing is carried out. Thus, on the continuous web of the polarizing composite film 11 having the adhesive layer 12, there are defined a defect-free region (Xα) having a predefined length corresponding to the dimension of the liquid-crystal panel W and a defective region (Xβ) including at least one defect. The defect-free regions (Xα) and defect-containing regions (Xβ) are defined in the polarizing composite film 11 along the length of the polarizing composite film 11. The defect-containing region (Xβ) is defined as a region having a predefined length which is different from the length of the defect-free region and defined across the position of the defect. The defect-free and defect-containing regions extend throughout the width of the polarizing composite film 11. In the first manufacturing method, the defect inspection is carried out on the polarizing composite film 11' before the adhesive layer 12 is formed, but in the second manufacturing method, the defect inspection is carried out on the polarizing composite film 11 having the adhesive layer 12.

The data processed at the inspection station M is used to operate the slitting unit provided at the slit-forming station N to form slits in the transverse direction each corresponding to the regions defined along the transverse direction, and sequentially form slit lines 16 on the continuous optical film laminate 15. After the aforementioned information processing at the inspection station M, the carrier film 13 is attached to the polarizing composite film 11 in the place of the peeled provisional carrier film 13'. The carrier film 13 is releasably laminated to the adhesive layer 12 to thereby provide a continuous optical film laminate 15. When desired, the continuous optical film laminate 15 may have a surface-protection film 14 releasably laminated on the polarizing composite film at a surface opposite to the surface on which the carrier film 13 is laminated.

Thereafter, irrespective of the manufacturing method, the manufactured optical film laminate 15 is fed to the slit-forming station N to finally complete the continuous optical film laminate with predefined slit lines 10. Thus, between the respective two longitudinally adjacent slit lines 16 formed in sequence on the carrier film 13, one on the upstream side and one on the downstream side with respect to the feeding direction, the defect-free normal polarizing sheets Xα and the defective polarizing sheets Xβ are formed in the continuous optical film laminate. The sheet may have a surface protection film 14 which may be provided when desired. The continuous optical film laminate with predefined slit lines 10 is then wound into a roll when desired.

(General Description of Manufacture of Liquid-Crystal Display Elements)

The manufacturing method for liquid-crystal display elements using the continuous optical film laminate with predefined slit lines 10 is outlined in the followings referring to FIGS. 4 and 5. As shown in the FIG. 4, a continuous optical film laminate with predefined slit lines 10 is loaded to a support rack 110 in a form, for example, of a roll. As shown by the step 1 in FIG. 5, the continuous optical film laminate with predefined slit lines 10 fed out from the roll is transported to the determination station A where a determination unit 130 having a CCD in connection with the control unit 400 is provided.

At the determination station A, the determination unit 130 determines, in cooperation with the control unit 400, whether the polarizing sheets 11 being formed on the carrier film 13 by slitting along the slit lines 16 which are formed in the transverse direction with respect to the feed direction of the continuous optical film laminate with predefined slit lines 10 are the normal polarizing sheet Xα or the defective polarizing sheet Xβ. The determination unit 130, for example, takes images of the sequentially formed slit lines on the continuous optical film laminate with predefined slit lines 10 and produce picturized images by an optical sensor including a CCD camera. Then, for example, a measurement device including an encoder measures a length in the longitudinal direction of a sheet (x) between the two slit lines, one on upstream side and one on downstream side. As shown by step 2 in FIG. 5, for example, it is possible to determine whether a measured sheet is a normal polarizing sheet Xα or a defective polarizing sheet Xβ in the following procedures.

Specifically, the information processing, including calculating a length in the longitudinal direction of a sheet (x), is sequentially carried out in an information processing device 410 and a storage device 420 provided in the control unit 400 as follows:

(1) the first slit line 16 on the continuous optical film laminate with predefined slit lines 10 that is fed out from the roll is determined in terms of differences in contrasts in the image taken by the determination unit 130;

(2) simultaneously, the encoder provided in the feed roller of the film feed apparatus 120 measures a feed-out length of the continuous optical film laminate with predefined slit lines 10;

(3) the next slit line is determined as in the above (1) and the fed length between the two slit lines 16, i.e., a length of a sheet (x) is calculated and stored;

(4) then, when, for example, a length of a sheet (x) is determined to be different from the predefined length (Xα) of the preliminarily stored normal polarizing sheet Xα, i.e., when the length of a sheet (x) is determined to be shorter or longer than the predefined length (Xα) of the preliminarily stored normal polarizing sheet Xα, then the sheet is determined to be a defective polarizing sheet Xβ. When the length of a sheet (x) is determined to be equal to the predefined length (Xα) of a preliminarily stored normal polarizing sheet Xα, the sheet is determined to be a normal polarizing sheet Xα;

(5) the control unit 400 stores each of the determined positions of normal polarizing sheets Xα and defective polarizing sheets Xβ in the storage device 420 in terms of, for example, a feed-out length from the reference point (e.g., position of the first slit line) recorded on the continuous optical film laminate 10 with predefined slit lines.

When a defective polarizing sheet Xβ on the carrier film 13 is transported to the removal station C, as shown by steps 3 to 6 in FIG. 5, the control unit 400 sends an instruction to remove the defective polarizing sheet Xβ based on the stored position information of the defective polarizing sheet Xβ and operates the defective-polarizing sheet removal unit 150 including a movable roller, by controlling the operations of the speed adjustment unit 140 for providing a constant speed of film feeding and the feed apparatus 160 including a feed roller 160 in an inter-related manner. The defective-polarizing-sheet removal unit 150, as shown by step 7 in FIG. 5, peels and removes only the sheets determined to be the defective polarizing sheets Xβ from the carrier film 13 among the polarizing composite film sheets 11 being formed separately in sequence on the carrier film 13.

As shown by steps 8 to 10 in FIG. 5, at the removal station C, after the removal of the defective polarizing sheet Xβ, the continuous optical film laminate with predefined slit lines 10 includes only the normal polarizing sheets Xα which are separated from each other on the carrier film 13, and is transported to the lamination station B by the film feed apparatus 160 including the feed roller and a carrier-film take up drive mechanism 180 for taking up the carrier film in cooperation with the control unit 400. At that moment, the orientation detection unit 170 determines whether the feeding direction and transverse direction of the normal polarizing sheets Xα on the carrier film 13 matches with the reference line.

Figure 9:
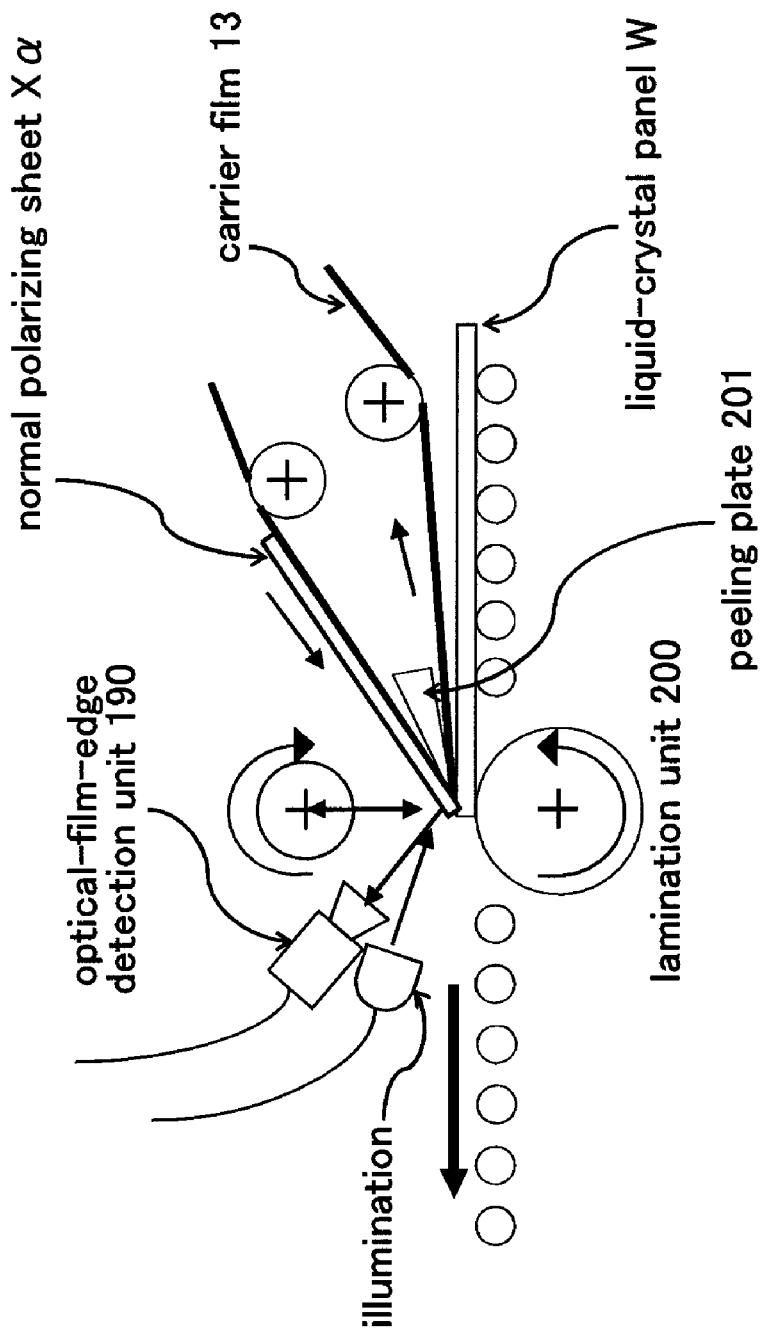
FIG. 9 is a schematic diagram showing a lamination unit with liquid-crystal panels comprising an optical film-edge detection unit for detecting a leading edge of a normal polarizing sheet of a polarizing composite film constituting the continuous optical film laminates with predefined slit lines.

As shown in FIG. 9, the carrier film 13 is peeled off the polarizing sheet by being bent at an acute angle, via the peeling plate 201, by the carrier-film take-up drive mechanism 180. By having the carrier film 13 peeled in this manner, the adhesive layer of the normal polarizing sheets Xα may be gradually exposed. The leading edge of the normal polarizing sheet Xα, as being gradually peeled from the carrier film 13, is detected by the optical film laminate edge detection unit 190. Preferably, the normal polarizing sheets Xα, while being gradually peeled, is transported to the lamination unit 200 at the lamination station B after the feed speed of the sheets is adjusted to the speed of the lamination with the liquid-crystal panel W. This makes it possible to slightly expose the leading edge of the normal polarizing sheet Xα to allow the leading edge of the liquid-crystal panel W sequentially conveyed to this edge position to be aligned with the leading edge of the normal polarizing sheet Xα. The details of the Liquid-crystal panel conveyance apparatus 300, shown by steps 11 to 16 in FIG. 5, will be described later.

(Operation of the System for Manufacturing Liquid-Crystal Display Elements)

In operation of the entire continuous manufacturing system 1 for liquid-crystal panels, a roll of a dummy film is first mounted on the continuous manufacturing system 1. The continuous dummy film is unrolled from the roll under tension by means of the control unit 400 including first and second film feed apparatus 120, 160 each including feed rollers and the speed adjustment unit 140 including a dancing roller. The continuous dummy film is advanced until its leading edge reaches a position where, under a normal operation, the carrier film 13 is peeled from the normal polarizing sheet Xα, the carrier film 13 from which the normal polarizing sheet is peeled is passed through the peeling plate 201 and taken up by the carrier-film take up drive mechanism 180. Then, the trailing end of the continuous dummy film is connected to the leading end of the continuous optical film laminate with predefined slit lines 10, and a supply of the continuous optical film laminate with predefined slit lines 10 is initiated.

(Removal of Defective Polarizing Sheet Xβ)

Figure 7:
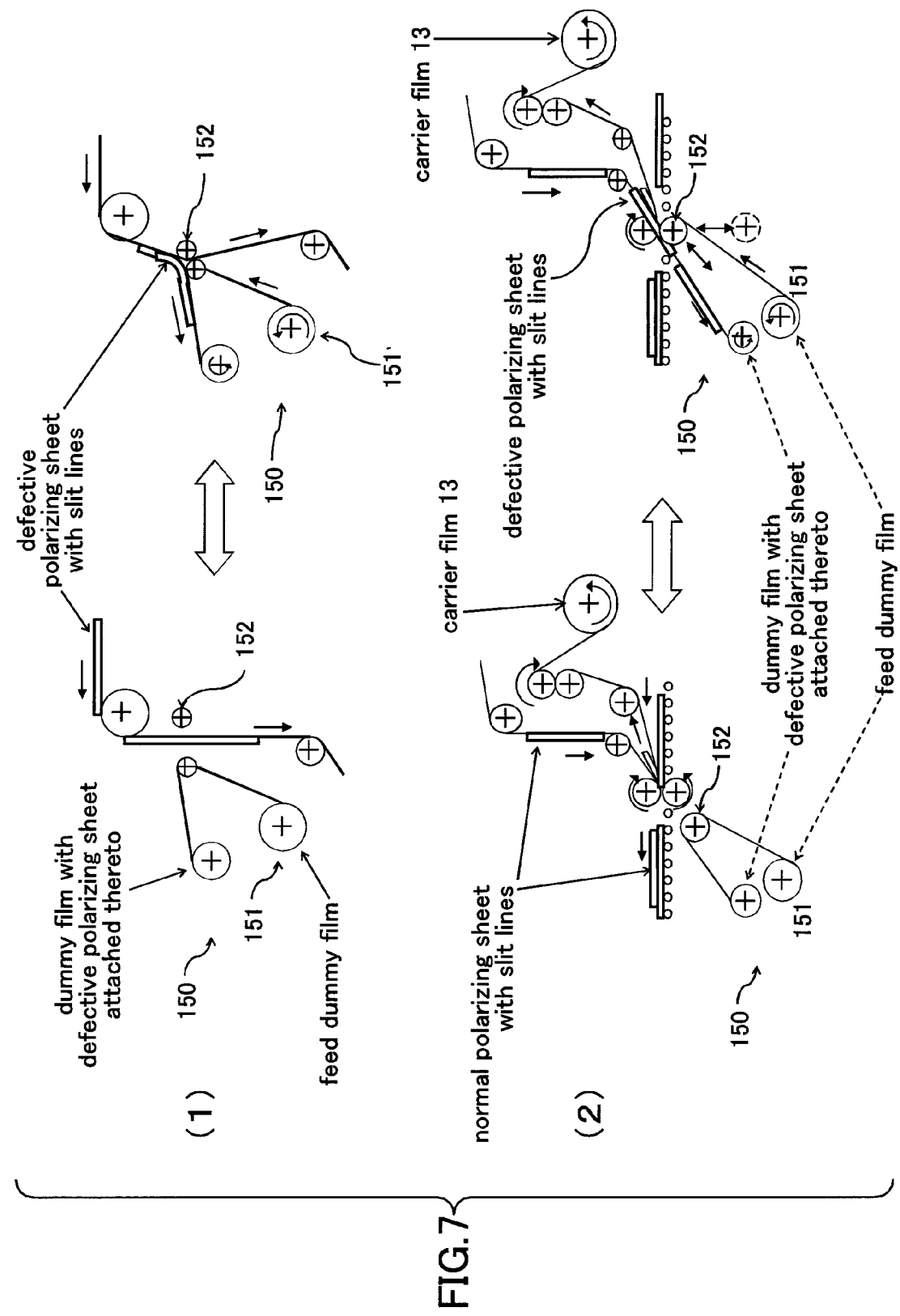
FIG. 7 is a schematic diagram showing a defective-polarizing-sheet removal unit for removing a defective polarizing sheet of an optically functional film configuring a continuous optical film laminate with predefined slit lines, comprising (1) a dummy-film drive mechanism including a movable roller disposed in a feed passage for a continuous optical film laminate with predefined slit lines or (2) a dummy-film drive mechanism including a movable roller adapted to be replaced with one of the lamination rollers from a pair of the lamination rollers disposed at lamination station B, according to one embodiment of the present invention.

The operation of the defective-polarizing-sheet removal unit 150 in connection with the control unit 400 in the manufacturing process of the liquid-crystal panels is described below. The defective-polarizing-sheet removal unit 150 is operated under the control of the control unit 400. FIGS. 7 (1) and 7 (2) show such defective-sheet removal unit 150 that peels and removes defective polarizing sheets Xβ from the carrier film 13, which are sheets determined as defective polarizing sheets β by the determination unit 130 among normal polarizing sheets Xα and defective polarizing sheets Xβ being formed separately on the carrier film 13 included in the continuous optical film laminate with predefined slit lines 10. The defective-polarizing-sheet removal unit 150 comprises both of the dummy film drive mechanism 151 and the movable roller 152.

The defective-polarizing-sheet removal unit 150 in FIG. 7 (1) comprises a dummy-film drive mechanism 151 having a function of attaching to thereon and peeling the defective polarizing sheet Xβ releasably laminated to the carrier film 13 and a movable roller 152 adapted to be activated based on the removal instruction from the control unit 400 when the defective polarizing sheet Xβ reaches a position in a feed path of the continuous optical film laminate with slit lines 10 where removal of the defective polarizing sheet is to be initiated, and thus the feed path of the continuous optical film laminate with slit lines 10 is moved so that the feed path contacts the dummy-film feed path of the dummy-film drive mechanism 151. Then, the defective polarizing sheet Xβ on the carrier film 13 is peeled from the carrier film 13 as being attached to the feed path of the dummy film feed path and removed from the feed path of the continuous optical film laminate with predefined slit lines 10. After the defective polarizing sheet Xβ is removed, the movable roller 152 returns to the original position, and the feed path of the continuous optical film laminate with predefined slit lines 10 and that of the dummy film driven by the dummy film drive mechanism 151 are detached.

The defective-polarizing-sheet removal unit 150 illustrated in FIG. 7(2) is configured, under control of the control unit 400, to be moved in an inter-related manner with the lamination unit 200 including a pair of lamination rollers provided at the lamination station B. It comprises a dummy-film drive mechanism 151 having a function of releasably attaching and peeling the defective polarizing sheet xβ, and a movable roller 152 defining a dummy-film feed path of the dummy-film drive mechanism 151. The removal unit illustrated in FIG. 7 (2) is different from the removal unit illustrated in FIG. 7 (1) in that, in the removal unit illustrated in FIG. 7 (2), the movable roller 152 defining the dummy-film feed path disposed adjacent to the pair of lamination rollers of the lamination unit 200 at the lamination station B is arranged in a replaceable manner with one of the pair of the lamination rollers in the lamination unit 200.

More specifically, when the defective polarizing sheet Xβ reaches an end position (i.e., the removal initiation position) of the feed path of the continuous optical film laminate with predefined slit lines 10, the pair of lamination rollers are moved apart from each other, and the movable roller 152 defining the dummy film feed path is moved to a nip between the lamination rollers in spaced-apart relation to replace the roller with one of the rollers of the pair of the lamination roller. Thus, the movable roller 152 and the other laminating roller are operated in an inter-related manner. In this instance, the carrier film 13 is taken up by the carrier-film take up drive mechanism 180, and the defective polarizing sheet Xβ is peeled from the carrier film 13 and the peeled defective polarizing sheet Xβ is attached to the dummy-film feed path by means of the movable roller 152 operated in an inter-related manner with the other roller of the pair of the lamination roller and removed without being laminated to the liquid-crystal panel W. After the defective polarizing sheet Xβ is removed, the movable roller 152 returns to the original position, and the laminating roller that was replaced by the movable roller returns to the position to be operated in an inter-related manner with the other laminating roller, i.e., the inter-related operation of the defective-polarizing-sheet removal unit 150 and the laminating unit 200 is released. When a normal polarizing sheet Xα on the carrier film 13 reaches to the lamination position, the lamination unit 200 makes the replaced lamination roller operate in an inter-related manner with the other lamination roller to laminate the normal polarizing sheet Xα to the liquid-crystal panel.

(Conveyance of Liquid-Crystal Panel W)

A brief description of the liquid-crystal panel conveyance apparatus 300 for conveying the liquid-crystal panel W to the lamination unit 200, including a pair of laminating rollers adapted to be vertically moved toward and away from each other for laminating the liquid-crystal panel W with the normal polarizing sheet Xα and formed separated on the carrier film 13 of the continuous optical film laminate with predefined slit lines 10, will be given below.

Figure 1:
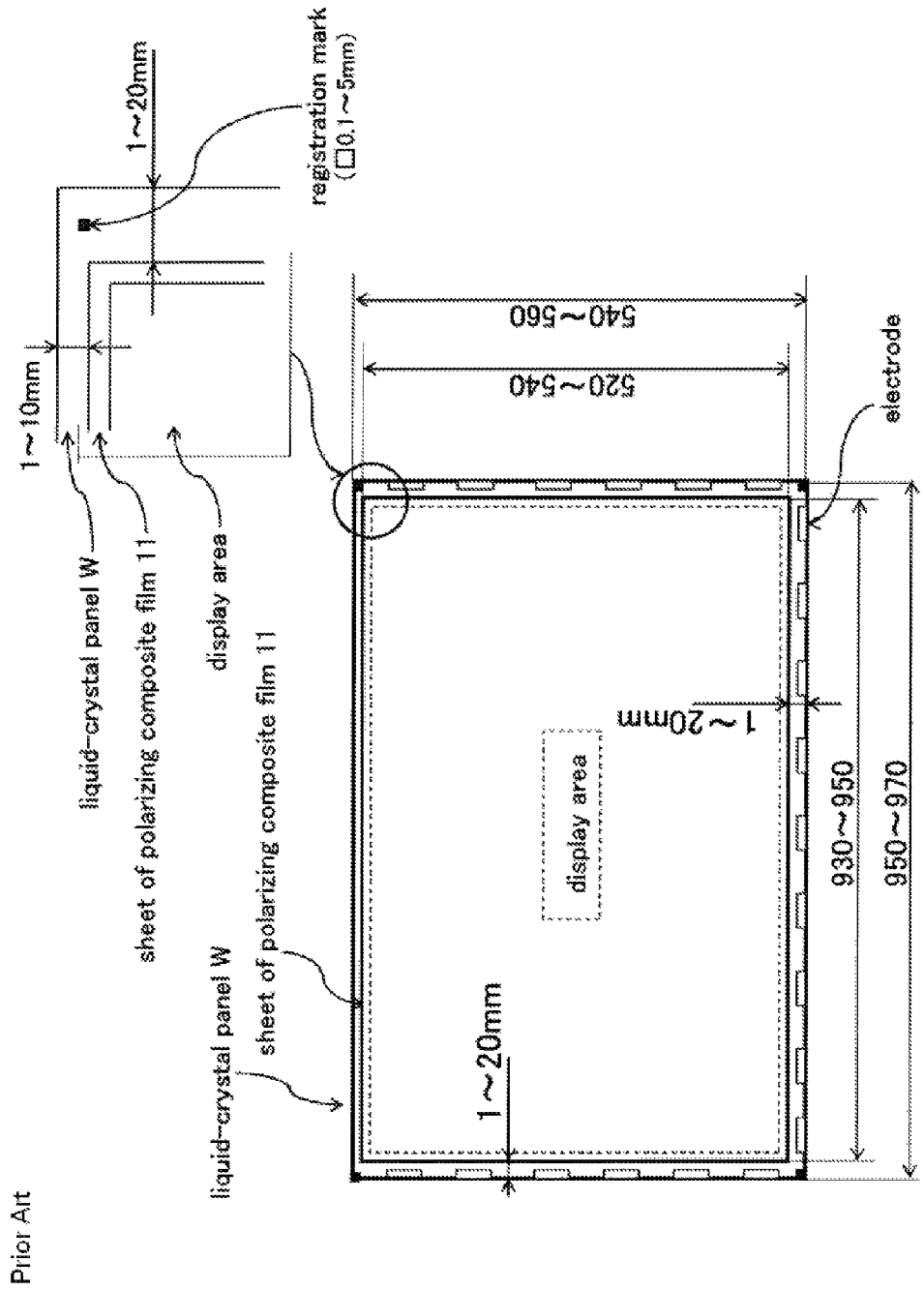
FIG. 1 illustrates a typical example of a liquid-crystal display element for a widescreen television having a diagonal screen size of 42 inches.
Figure 2:
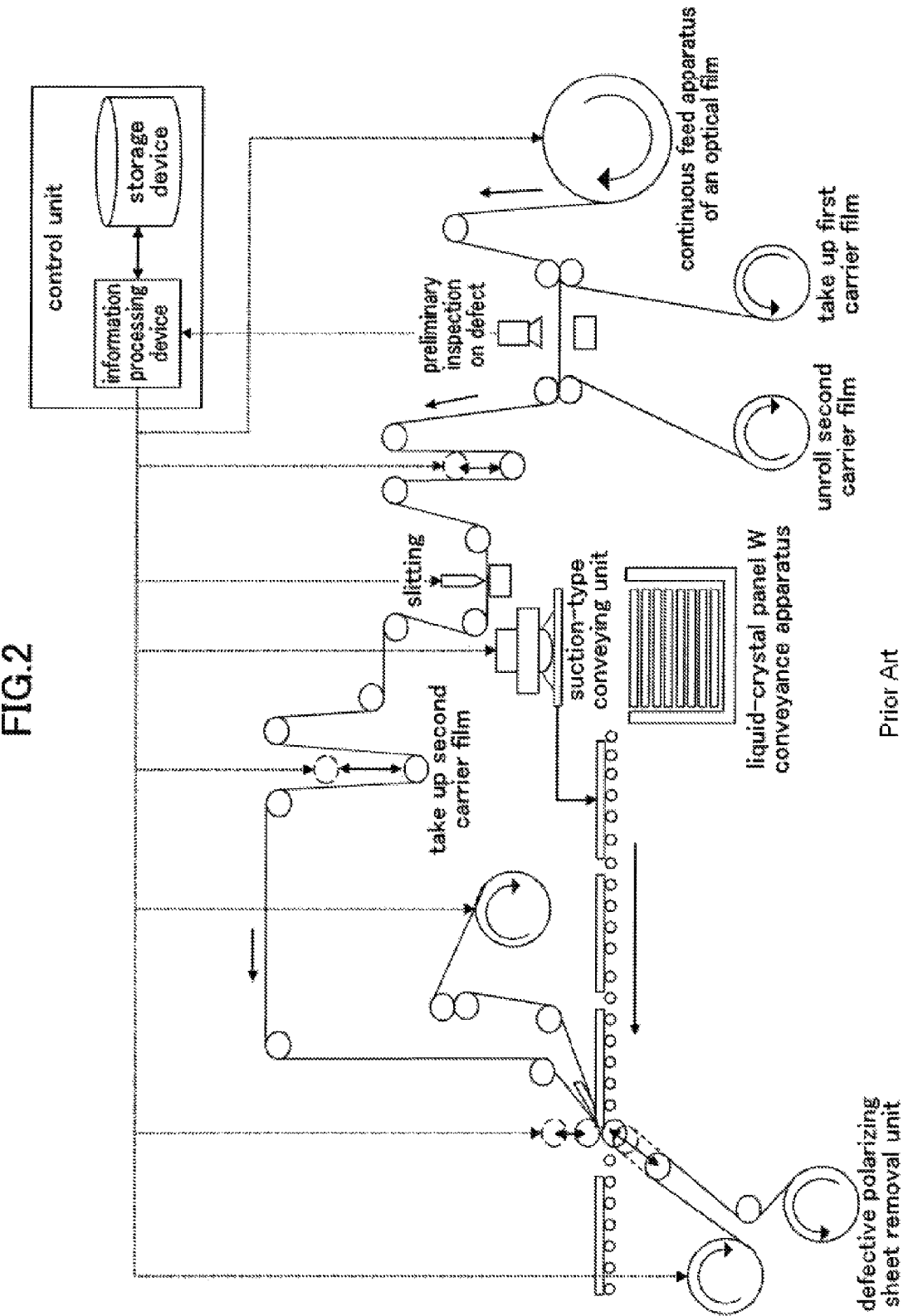
FIG. 2 is a conceptual diagram showing a liquid-crystal display element continuous manufacturing system wherein defect-free sheets of an optically functional film are laminated to liquid-crystal panels after preliminary inspection of defects in the optically functional film, while unrolling the continuous optical film laminate.

Taking a large size television having a diagonal screen dimension of 42 inches as an example, a rectangular-shaped liquid-crystal panel W has a size of about 540 to 560 mm in length and about 950 to 970 mm in width as shown in FIG. 1. During the manufacture process of liquid-crystal display elements, the liquid-crystal panel W is slightly trimmed along its peripheries during a wiring stage including mounting operations of electronic components. Alternatively, the liquid-crystal panel W may be transported or conveyed with peripheries already trimmed. The liquid-crystal panels W are taken out one-by-one from a magazine containing a large number of liquid-crystal panels, by means of a liquid-crystal-panel supply apparatus, and as shown by steps 11 to 16 in FIG. 5, conveyed through cleaning/polishing stage to the lamination unit 200 at the lamination station B for lamination with respective ones of the normal polarizing sheets Xα, by the conveyance unit 300, by being adjusted to equal intervals and a constant transportation speed. The normal polarizing sheet Xα is formed from the continuous optical film laminate with predefined slit lines 10 to have a size slightly less than that of the liquid-crystal panel W.

Figure 8:
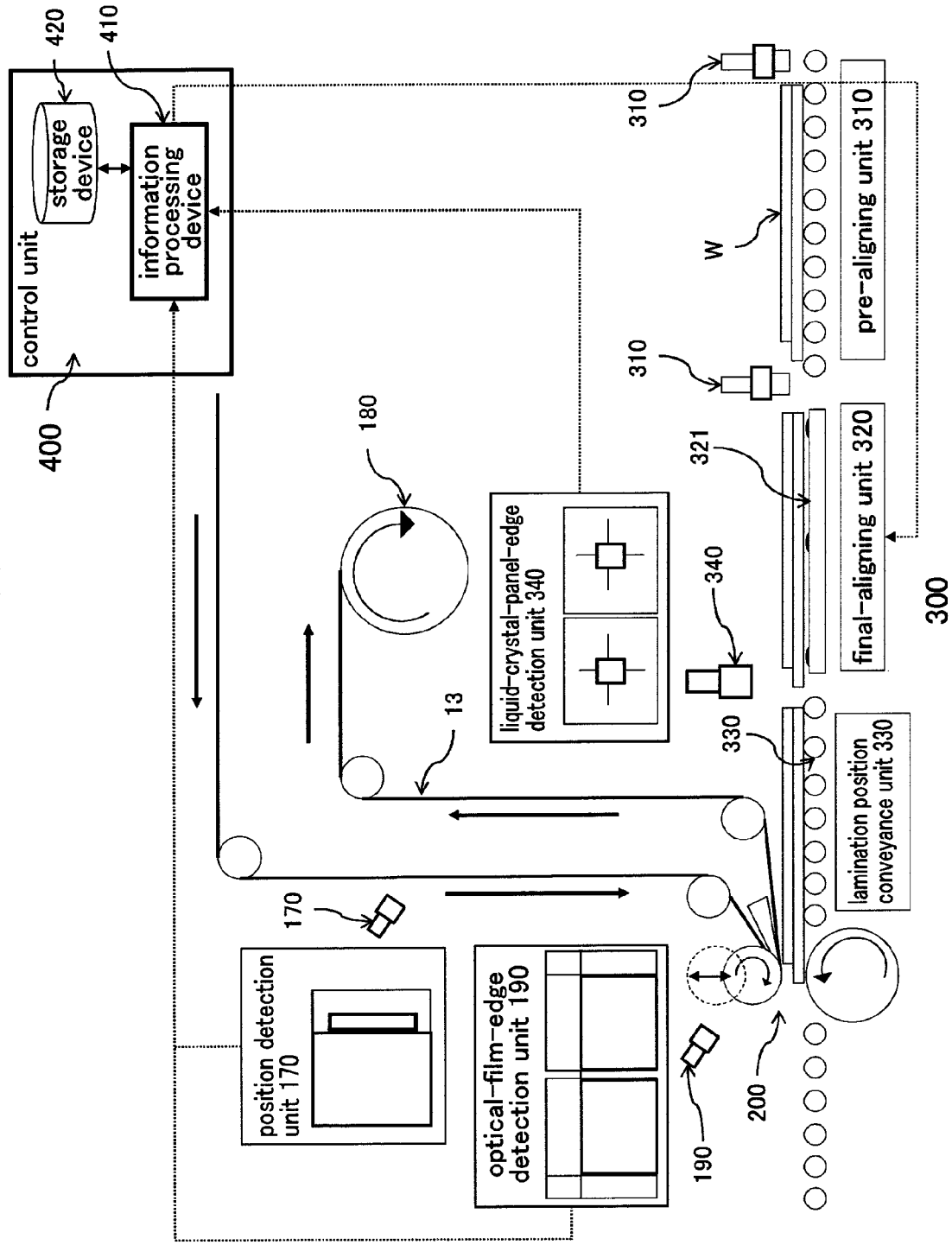
FIG. 8 is a schematic diagram showing the state when a pre-alignment unit, a alignment unit, a conveyance unit for conveying the panels to the lamination position and a panel-edge detection unit in the liquid-crystal panel conveyance apparatus are controlled, based on the information on the sheets determined by the determination unit to allow a liquid-crystal panel to be conveyed in a controlled posture, in the liquid-crystal display element continuous manufacturing system according to one embodiment of the present invention.

FIG. 8 is a schematic diagram showing, the conveyance of the liquid-crystal panel W in an aligned orientation, by means of the control unit 400 controlling the pre-alignment unit 310, the final-alignment unit 320, the conveyance unit 330 for conveying the panels to the lamination position and the panel-edge detection unit 340 which are provided in the liquid-crystal conveyance unit 300, based on the information on the sheet determined by the determination unit 130 as a normal polarizing sheet Xα during the manufacturing process of liquid-crystal display elements. The conveyance unit 300 includes a liquid-crystal panel posture control device comprising a pre-alignment unit 310, an alignment unit 320, a conveyance unit for conveying the panels to the lamination position 330, and a panel-edge-detection unit 340 for detecting the leading edge of the liquid-crystal panel W, for aligning the orientation of the liquid-crystal panel W in a final stage of the conveyance of the liquid-crystal panel W sequentially supplied to the lamination station B when the normal polarizing sheet Xα is transported to the lamination station B, in synchronization with the transportation of the normal polarizing sheet Xα.

(Lamination of Normal Sheet Xα to Liquid-Crystal Panel W)

As shown in FIG. 9, the leading edge of the normal polarizing sheet Xα is moved to the nip defined between the pair of lamination rollers of the lamination unit 200 when the rollers are in the vertically spaced apart relation to each other, and detected by the optical film laminate edge detection unit 190. Although the normal polarizing sheet Xα is fed in a state laminated on the carrier film 13, it is seldom that the normal polarizing sheet Xα is accurately fed so that the angle θ between the feed direction and the lengthwise direction of the carrier film 13 becomes zero. Therefore, deviations of the normal polarizing sheet Xα in the feed direction and the transverse direction are measured, for example, by taking images of the sheet using the CCD camera of the orientation detection unit 170 and subjecting the taken images to an image processing, whereby the measured deviations are calculated in terms of x, y and θ, and the calculated data is stored in the storage device 420 by the control unit 400.

The liquid-crystal panels W are sequentially positioned by the pre-alignment unit 310, so that they are aligned in lengthwise and transverse directions respectively with the feed direction and the direction transverse to the feed direction in the conveyance path. The positioned liquid-crystal panel W is conveyed to and placed on the final-alignment unit 320 which includes an alignment table adapted to be turned by a drive mechanism which is controlled by the control unit 400. The leading edge of the liquid-crystal panel W placed on the alignment table is detected by the panel-edge detection unit 340. The position of the detected leading edge of the liquid-crystal panel W is checked for match with the reference lamination position stored in the storage device 420, specifically, the calculation data in terms of x, y and θ to represent the orientation of the normal polarizing sheet Xα to be laminated to the liquid-crystal panel W. For example, the deviation between the leading edge of the liquid-crystal panel W and the reference lamination position is measured using an alignment mark of the liquid-crystal panel W illustrated in FIG. 1 to calculate the angular displacement θ, and the alignment table having the liquid-crystal panel W placed thereon is turned by the angular displacement θ. Then, the alignment table is connected to the conveyance unit 330 to the lamination unit 200 at the lamination station B. The liquid-crystal panel W is conveyed to the lamination position while keeping the same orientation, by the conveyance unit 330 to the lamination unit 200 at the lamination station B. The leading edge of the liquid-crystal panel W is registered with and laid on the leading edge of the normal polarizing sheet Xα at the lamination unit 200, as shown in FIG. 8. In the final stage, the normal polarizing sheet Xα and the liquid-crystal panel W which are in aligned relation with each other and are held between the pair of lamination rollers and pressed thereby to obtain a finished liquid-crystal display element.

The normal polarizing sheet Xα is fed to the lamination position for lamination with the liquid-crystal panel W together with the carrier film 13 within the continuous web of the optical film laminate with predefine slit lines 10 advanced under tension. The normal polarizing sheet Xα can be gradually peeled from the carrier film 13, so that there is least possibility that the periphery of the normal polarizing sheet Xα is bent or sagged as shown in FIG. 9. This makes it easy to have the orientation of the liquid-crystal panel W aligned with the normal polarizing sheet Xα. Such method and system makes the manufacturing speed of the liquid-crystal display element increased and the product accuracy improved which has been unachievable in the manufacturing process utilizing the individualized sheets. The process utilizing the individualized sheets to complete a liquid-crystal display element includes steps of, after peeling a separator from each of the individualized sheets to expose the adhesive layer and feeding under a vacuum suction each of the sheets to a lamination position, adjusting the position of the sheet with respect to the liquid-crystal panel W and laminating the sheet to the liquid-crystal panel W.

In addition, the polarizing composite film 11 constituting a continuous optical film laminate 15 used for a continuous optical film laminate with predefined slit lines 10 may be made of a polarizer including a substrate of a PVA based material having at least one surface laminated with a protective film, preferably of a transparent material, with an adhesive layer 12 provided on the other surface. A continuous carrier film 13 is releasably attached to the adhesive layer 12. In the conventional liquid-crystal display element manufacturing process using individualized sheets, generally, use is made of a sheet comprising a polarizer having two protective films laminated thereon at the opposite surfaces to impart stiffness as the polarizing composite film 11 as described before. However, in the liquid-crystal display element manufacturing process using the continuous optical film laminate with predefined slit lines 10 in accordance with the embodiments, the normal polarizing sheets Xα of the polarizing composite film 11 are formed on the carrier film 13 in series so that each continuous normal polarizing sheet Xα is peeled sequentially from the carrier film 13 and sequentially laminated to the liquid-crystal panel W at the lamination unit 200 in the lamination station B. During this process, the normal polarizing sheet Xα may be drawn into the lamination station gradually. It is understood that there is no need of peeling the separator from each of the sheets as in the manufacturing process using the individualized sheets. When the normal polarizing sheet Xα is peeled from the carrier film 13, the leading edge of the normal polarizing sheet Xα is continuously registered with the leading edge of a corresponding one of a plurality of liquid-crystal panels W being sequentially conveyed on a sheet-by-sheet basis toward the lamination position, and then, the normal polarizing sheet Xα and the corresponding liquid-crystal panel W are laminated together by being pressed against each other by a pair of lamination rollers of the lamination unit 200. In this process, there is no risk that the periphery of the normal polarizing sheet Xα is bowed or warped since the sheet is gradually peeled from the leading edge to the intermediate portion. Thus, differently from the individualized sheet, in the polarizing composite film 11 included in the continuous optical film laminate with predefined slit lines 10 in the embodiments, the protective film may be laminated to only one of the surfaces of the polarizer.

3. Method and System for Manufacturing Roll of Continuous Optical Film Laminate with Predefined Slit Lines Method and system for manufacturing a continuous optical film laminate with predefined slit lines for use in a system continuously manufacturing liquid-crystal display elements by laminating each of a plurality of optically functional film sheets to each of a plurality of liquid-crystal panels will be described below with reference to a mode which is considered to be the best at this moment taking reference to the related drawings. In the following description, an optical film laminate with predefined slit lines 10 will be referred as "optical film laminate with predefined slit lines 10" and an optically functional film will be referred as "polarizing composite film."

Figure 11:
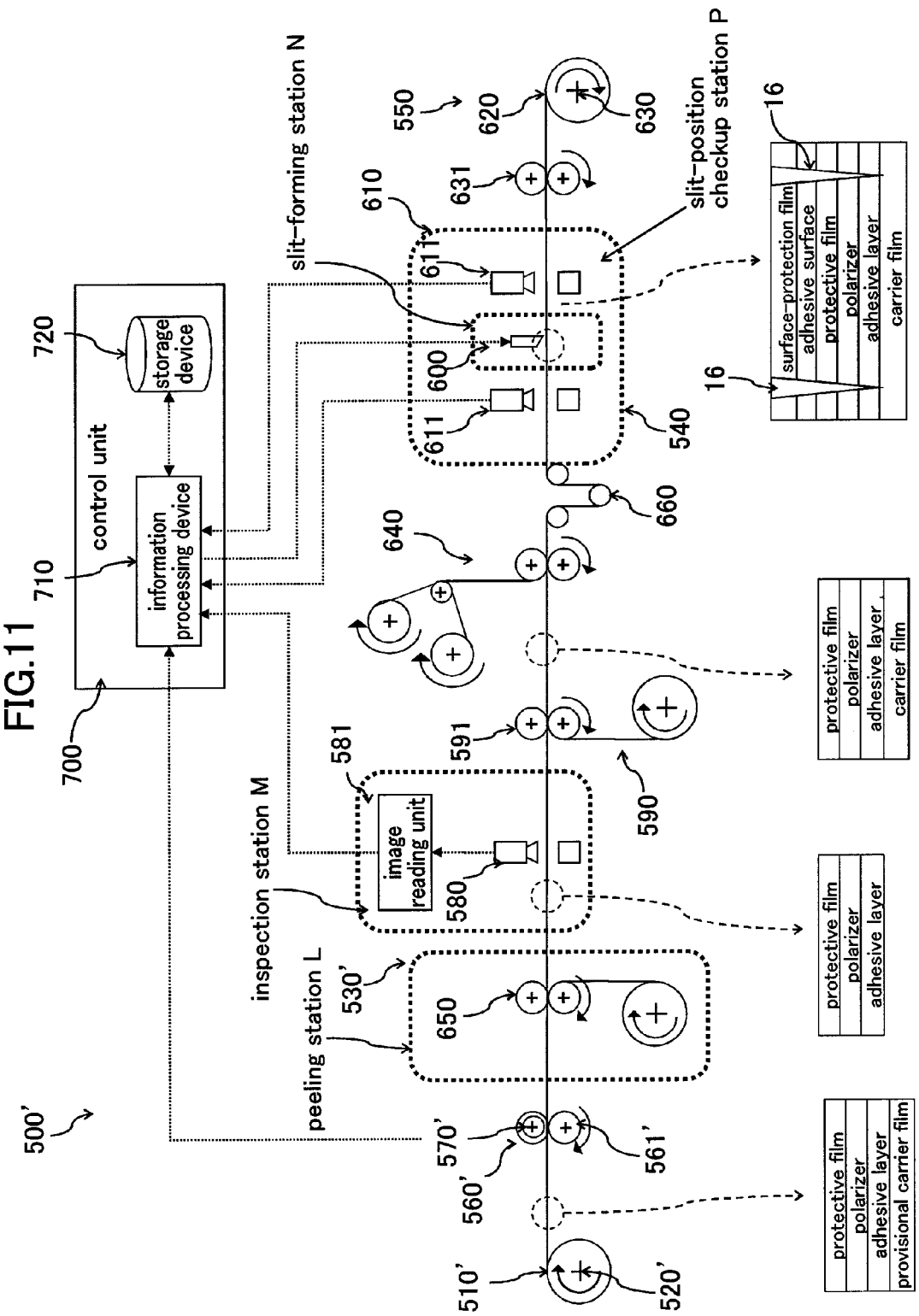
FIG. 11 is a schematic diagram showing a manufacturing method and system for a continuous optical film laminate with predefined slit lines, according to a second embodiment of the present invention.
Figure 13:
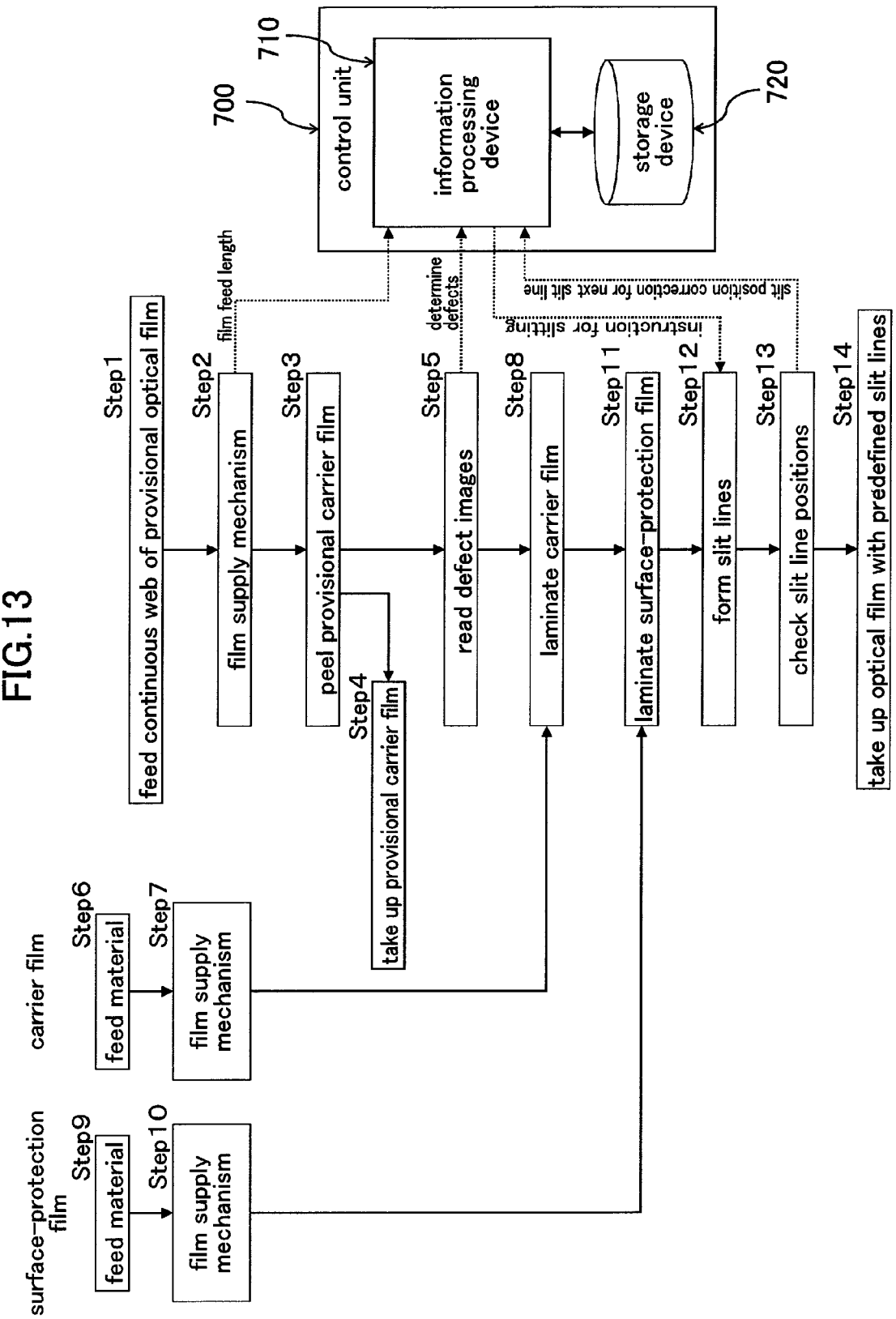
FIG. 13 is a flowchart showing manufacturing steps according to the second embodiment of the present invention.

FIGS. 10 and 11 are schematic diagrams respectively showing a first and a second embodiment of methods and systems for manufacturing a continuous optical film laminate with predefined slit lines 10, according to the present invention. FIGS. 12 to 13 are flowcharts showing respective manufacturing steps in the manufacturing methods and systems according to the first and second embodiments of the present invention.

Description will now be made on the method and system for manufacturing the continuous optical film laminate with predefined slit lines according to the first embodiment taking references to FIGS. 10 and 12, and, the method and system according to the second embodiment taking references to FIGS. 11 and 13.

The First Embodiment

FIG. 10 is a schematic diagram of the system 500 showing overall arrangements of manufacturing lines. In the bottom part of FIG. 10, there are schematically shown structures of laminate of a continuous optical film laminate with predefined slit lines. The system 500 comprises a polarizer manufacturing line 510 for continuously producing a polarizer (hereinafter referred to as "polarizer" as in the previous description) in a form of a web, a protective film manufacturing line 520 for producing a protective film to be laminated on the polarizer, and a polarizing composite film manufacturing line 530 for producing a continuous web of a polarizing composite film 11' consisting of the polarizer and the protective film laminated thereon (hereinafter referred as "polarizing composite film 11'" to distinguish it from the polarizing composite film 11 having an adhesive layer). The manufacturing line 530 further comprises an inspection station M for the polarizing composite film 11' where surfaces and inside of the polarizing composite film 11' are inspected to detect position or positions of a defect or defects existing in the polarizing composite film 11'.

The manufacturing system 500 further comprises a manufacturing line 540 for producing a continuous optical film laminate 15 by releasably laminating the carrier film 13 and the surface-protection film 14 on the inspected polarizing composite film 11'. The manufacturing line 540 further comprises a slit-forming station N where slits are sequentially formed in the optical film laminate 15 to extend in the transverse direction thereof each corresponding to a leading or trailing edge of the defect-free region (Xα) and the defective region (Xβ). The regions (Xα) and (Xβ) are defined to extend throughout the width of the optical film laminate 15. and the system 500 further includes a slit-position checkup station P where the positions of slit lines 16 formed on the continuous optical film laminate 15 are checked. The slit-position checkup station P is provide in the position of the slit-forming station N. The manufacturing system 500 may also comprise, as a final stage, a manufacturing line 550 for taking up the manufactured continuous optical film laminate with slit lines 10 into a roll.

FIG. 12 is a flowchart showing the manufacturing steps in the manufacturing system 500. In the manufacturing system 500, the manufacturing steps shown in FIG. 12 are carried out. Specifically, the manufacturing line 530 is provided for the step of laminating a surface-protection film to one of the surfaces of the polarizer to produce a polarizing composite film 11', and the manufacturing line 550 for the step of taking up the manufactured continuous optical film laminate with predefined slit lines 10 into a roll 620.

The polarizer manufacturing line 510 handles a roll of PVA-based film which is adapted to provide the substrate of the polarizer and is mounted in the line 510 in a rotatable manner. The line 510 includes a sub-line for subjecting the PVA-based film to processes of dyeing, cross-linking, stretching and then drying while the film is being unrolled from the roll and passed through the line 510 by means of a lamination drive mechanism 560 or other drive mechanism (not shown). The protective film manufacturing line 520 handles a rotatably mounted roll of a typically transparent TAC-based film providing the substrate of the protective film, and includes a sub-line for subjecting the transparent TAC-based film unrolled from the roll by means of a lamination drive mechanism 560 or other drive mechanism (not shown), to a saponifying treatment followed by drying. In case where two protective films are laminated on the opposite surfaces of the polarizer, the present manufacturing system 500 may include two protective film manufacturing lines 520, 520' (the protective film manufacturing line 520' is omitted in the drawing). Further, the protective film manufacturing line 520 may additionally include a treatment sub-line for, before a protective film is laminated to the polarizer, subjecting the surface of the protective film to a hard coat treatment and/or an anti-dazzling or anti-glare treatment.

The polarizing composite film 11' manufacturing line 530 includes a sub-line for applying an adhesive consisting primarily of a polyvinyl alcohol-based resin to an interface between the polarizer and the protective film, and drying the adhesive to bond them together through an adhesive layer having a thickness of only several μm. The manufacturing line 530 further includes the aforementioned lamination drive mechanism 560 including a pair of lamination rollers 561, one of the pair of lamination rollers 561 being provided with a length or distance measurement device 570 having an encoder incorporated therein for carrying out a measurement step for measuring a fed-length of the polarizing composite film 11' fed out from the lamination drive mechanism 560.

The manufacturing line 530 comprises the inspection station M which includes an inspection unit 580 for carrying out an inspecting step to detect defects in the polarizing composite film 11' by inspecting the surface and inside of the transported polarizing composite film 11'. The inspection unit 580 comprises an image reading unit 581 including a CCD camera for example. The inspection unit 580 is adapted to perform, for example, reflection inspection, transmission inspection, oblique transmission inspection or cross-Nichol transmission inspection, and transmits image data of defect obtained through the inspection to an information processing device 710 of a control unit 700.

The control unit 700 functions to operate the information processing device 710 and the storage device 720 to process the image data from the image reading device 581 in association with the feed-length measurement data based on the delivered length measured by the length or distance measurement device 570 as a length from the leading edge of the polarizing composite film 11', so as to produce position data representing locations or coordinate positions of a defect or defects in the polarizing composite film 11', the position data being then stored in the storage device 720. Then, the control unit 700 functions, based on the position data on the detected locations of a defect or defects, to define defect-free regions (Xα) and defective regions (Xβ) in the polarizing composite film 11. Further, the control unit 700 functions to produce a slit position information for sequentially forming the normal polarizing sheet Xα and defective polarizing sheet Xβ being separated from the normal polarizing sheet in the polarizing composite film 11 having an adhesive layer, each corresponding to the defect-free region (Xα) and the defective region (Xβ) in the defined polarizing composite film 11', on the carrier film 13 of the continuous optical film laminate 15 to be manufactured in the later process, at the slit-forming station N, using the slitting unit 600. The slit-position information is provided for indicating positions at which respective ones of the slit lines 16 are to be formed in the continuous optical film laminate 15 and is also stored in the storage device 720.

The normal polarizing sheets Xα of the polarizing composite film 11 having the adhesive layer 12, which has a width corresponding to the dimension of the liquid-crystal panel W, and formed by separating along two slit lines, one on the upstream side and one on the downstream side, extending in the direction transverse to the longitudinal direction, has a predefined length Xα that matches with that of the liquid-crystal panel W. On the contrary, the defective polarizing sheets Xβ has a length Xβ being defined across a defect or defects. More specifically, the upstream one of the two slit lines 16 for the normal polarizing sheet Xα located just upstream of the defective polarizing sheet Xβ in a feed direction can be the downstream one of the two slit lines 16 for the defective polarizing sheet Xβ, so that the defective polarizing sheet Xβ has a length Xβ that is determined by the downstream slit line 16 for the defective polarizing sheet Xβ and the upstream slit line 16 for the defective polarizing sheet Xβ (this can in turn be the slit line corresponding to the downstream slit line 16 of the next normal polarizing sheet Xα). Since the length in the feed direction between the downstream slit line of the defective polarizing sheet Xβ and the nearest location of a defect may not be the same, the length Xβ of the defective polarizing sheet varies. Preferably, a calculation algorithm for producing the slit-position information indicating the positions for forming the slit lines is configured such that the length Xβ of the defective polarizing sheet is different from the length Xα of the normal polarizing sheet Xα, i.e., to have a relation Xβ≠Xα, in any case, as described later in detail. The details of information processing are common in the first and the second embodiments, so that it will be described later in connection with reference to FIG. 15.

The manufacturing line 540 for manufacturing a continuous optical film laminate 15 is designed for carrying out a process including a carrier film lamination step in which the carrier film 13 is releasably laminated to the inspected polarizing composite film 11' by the carrier film lamination unit 590 and a surface-protection film lamination step in which, when desired, the surface-protection film 14 is releasably laminated to the surface of the polarizing composite film 11' opposite to the surface on which the carrier film 13 is laminated, by the lamination unit 640.

More specifically, referring to the flow chart of the FIG. 12, in step 1, the lamination drive mechanism 560 is operated to laminate the protective film to one surface of the polarizer to thereby produce the polarizing composite film 11' while the protective film and the polarizer are being fed. In step 2, the manufactured polarizing composite film 11' is transported to the inspection station M for detecting defects existing in the polarizing composite film 11' by the inspection unit 580. In step 3, the roll of the carrier film 13 is rotatably mounted on the support rack 591. In step 4, a releasable-film take up drive mechanism 592 and an optical film take up drive mechanism 630 are operated to unroll the carrier film 13 from the roll with the transferable adhesive layer 12 in exposed state. In step 5, the carrier film 13 is releasably laminated on the polarizing composite film 11' through the adhesive layer 12 by the carrier-film lamination unit 590, to form the polarizing composite film 11 having the adhesive layer 12.

Although the descriptions have been made herein with respect to a process wherein the step of forming the adhesive layer 12 on the polarizing composite film 11', simultaneously with the step of laminating the carrier film 13 on the adhesive layer 12, it is to be understood that the adhesive layer 12 may be preliminarily provided on the polarizing composite film 11'. Further, the adhesive surface of the surface-protection film 14 may be additionally laminated on the surface of the polarizing composite film 11' opposite to the surface on which the carrier film 13 is laminated by means of the lamination unit 640, irrespective of whether the protective film is subjected to the hard coating treatment or the anti-dazzling or anti-glare treatment, before the protective film is laminated to the polarizer. In this case, the manufactured continuous optical film laminate 15 has a structure having the carrier film 13 and the surface-protection film 14 laminated on respective ones of the opposite surfaces of the polarizing composite film 11.

The manufacturing line 540 includes a slit-forming station N which is adapted to perform a step of sequentially forming slit lines 16, in accordance with the slit position information, in a continuous optical film laminate 15 after information processing at the inspection station M. The slit lines 16 are formed by the slitting unit 600 provided on the slit-forming station N, which forms slits at a side opposite to the carrier film 13 to a depth reaching the surface of the carrier film adjacent to the adhesive layer of the continuous optical film laminate 15. The slit lines 16 are thus formed sequentially. The slit lines 16 therefore form the normal polarizing sheet Xα and defective polarizing sheet Xβ on the carrier film 13, each corresponding to the defect-free region (Xα) and the defective region (Xβ) of the polarizing composite film 11'.

The manufacturing line 540 further includes a slit-line checkup station P wherein steps of checking deviation between the position of the actually formed slit line 16 and the slitting position at which the slit line 16 is to be formed (the reference position) on the continuous optical film laminate 15 by a slitting position checkup unit 610 that includes two image-reading devices 611, one on upstream of and one on downstream of the slitting unit 600, and correcting the slitting position or the angle of the slitting unit 600 in case there is a deviation. Details are described with reference to FIG. 14.

Figure 14:
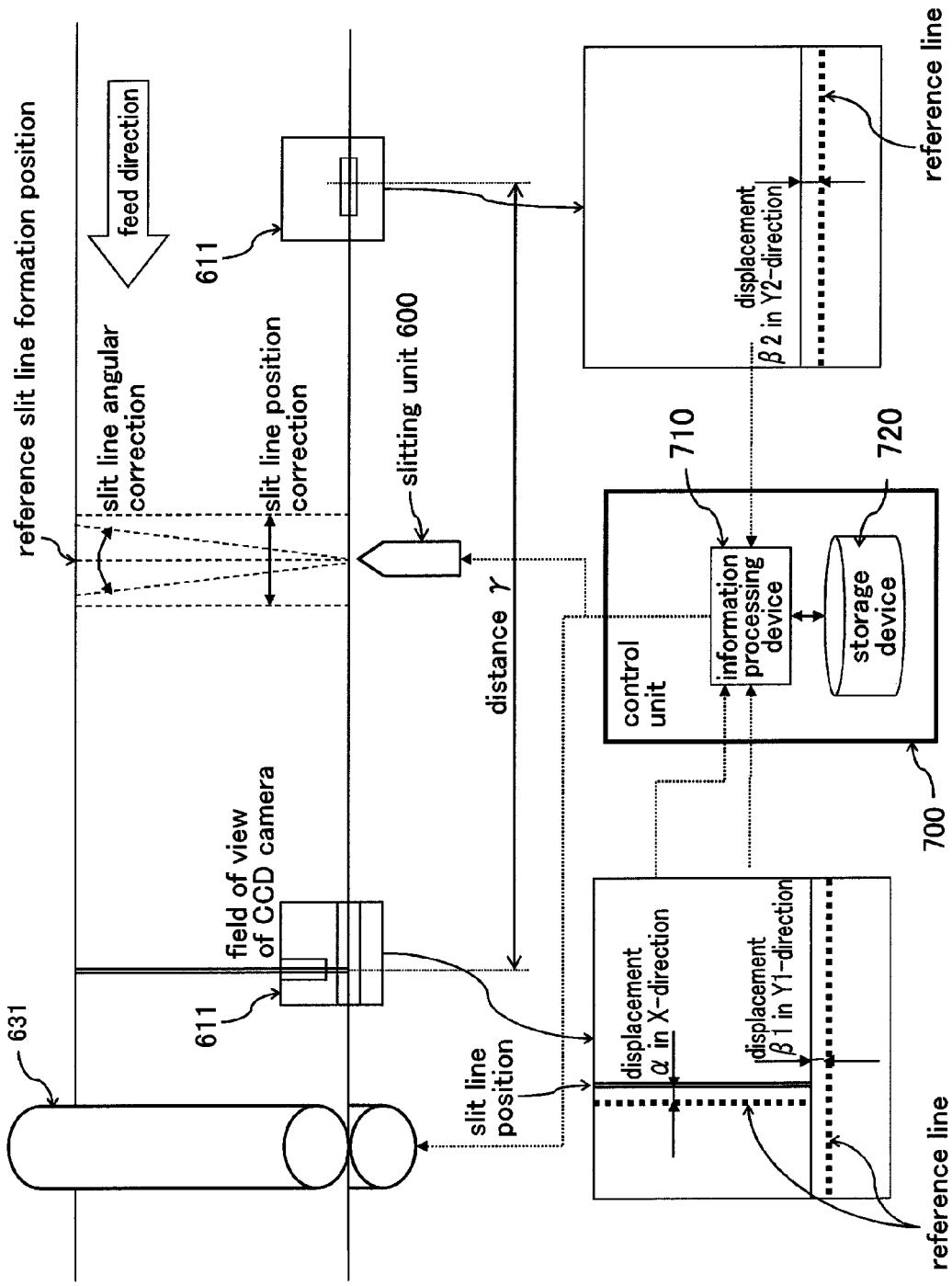
FIG. 14 is a schematic diagram showing the operation of a slitting position checkup unit, together with the inspection method for checking a difference between the position of the slit line actually formed in a direction transverse to a feeding direction and a position at which the slit line is to be formed (position of the reference slit line) on the continuous optical film laminate, the slit line is calculated based on the feed-length measurement data of the fed-out length of the optical film laminate according to one embodiment of the present invention.

FIG. 14 is a schematic diagram showing the operation of the slitting position checkup unit 610 together with the inspection method for checking the deviation between the position of the actually formed slit line 16 in a direction transverse to the feeding direction and the position at which the slit line is to be formed (position of the reference slit line) on the continuous optical film laminate 15, the slit line being calculated based on the feed-length measurement data obtained by the length measurement device 570 in terms of the fed-out length of the optical film laminate 15.

In the slitting position checkup unit 610, there are provided two image reading devices 611, one on upstream of and one downstream of the slitting unit 600 as seen in the feed direction of the optical film laminate. The take-up drive mechanism 630 includes a pair of feed rollers 631 disposed at the downstream side of the downstream image reading device 611, and a speed adjustment unit 660 including a dancing roller is provided at the upstream side of the upstream image reading device 611. By operating the above units in an interrelated manner, the continuous optical film laminate 15 is constantly fed under tension even if it is temporarily stopped at the slitting position.

Coincidence of the position of the actually formed slit line 16 in the direction transverse to the feed direction of the continuous optical film laminate 15 with the position at which the slit line 16 is to be formed (position of the reference slit line) on the continuous optical film laminate 15 can be affirmed by determining the accurate positions in the feed direction (X direction) and the transverse direction (Y direction) of the optical film laminate 15. One preferable way is to carry out measurements, at two locations, one on upstream of and one on downstream of the slitting position (the position of the slitting unit 600) where the slit line 16 is to be formed in the optical film laminate 15, for the deviation in X and Y directions on the position where the slit line is actually formed, the position of the edge (the side end) of the optical film laminate 15 and the position where the slit line is to be formed with respect to respective reference lines. For example, the image reading device 611 may be provided with a CCD camera to take images of the position of the actually formed slit lines in the optical film laminate 15 and the position of the edge of the optical film laminate 15 and produce picturized images. The reference lines corresponding to the actually formed slit lines and the position of the edge of the optical film laminate are preliminarily provided in the image-talking regions, and those positions can be determined in terms of differences in contrasts in the taken images. Then, a calculation is made to determine the distance (deviation) between the predetermined reference lines and the positions of the actually formed slit-line and the edge of the optical film laminate, and the location and the angular position of the slitting unit 600 is corrected forwardly or backwardly with respect to the feed direction of the continuous web of the optical film laminate 15, based on the calculated distance (deviation).

More specifically, as shown in FIG. 12, steps 5 and 9 are performed to feed the continuous optical film laminate 15 under tension, and in step 9, a slit line 16 is formed in the continuous optical film laminate 15. Then, a further step is carried out by the two image reading device 611 to read the position of the actually formed slit line 16 in the continuous optical film laminate 15, and to determine whether there is any deviation between the position of the read slit-line 16 of the optical film laminate and the position where the slit-line 16 is to be formed based on the slit-position information, and in case where there is any deviation, steps 10 and 11 are carried out, and the deviation is corrected, for example, in the following manner.

The manner of the inspection for determining the deviation between the position of the actually formed slit-line 16 on the continuous optical film laminate 15 and the position where the slit-line 16 is to be formed is carried out for example in accordance with the following procedures.

(1) Images of the position (X) of the actually formed slit line 16 of the continuous optical film laminate 15 and two positions (Y1, Y2) of the edge of the continuous optical film laminate 15 are taken by the image reading device 611, and the images are picturized for measurement of the position of the actually formed slit-line 16 (X) of the continuous optical film laminate 15 and the positions of the edges (Y1,Y2) of the continuous optical film laminate 15 in terms of the differences in contrast.

(2) There is a slit line reference position in the form of a line extending in Y direction at a position intermediate a reference line extending in Y direction at an upstream position as seen in X direction in the imaging area of one of the image reading devices 611 and another reference line extending in Y direction at a downstream position as seen in X direction in the imaging area of the other of the image reading devices 611, and data γ representing the distance between the upstream and downstream reference lines is preliminarily stored in the storage device 720 via the information processing device 710. Furthermore, there are upstream and downstream reference lines extending in the X direction in respective ones of the image-taking regions of the image reading devices 611.

(3) A correction value α for correcting in X direction the position of the slit line 16 to be formed in accordance with the slit position information, and a correction value δ for angularly correcting in Y direction the position of the slit line 16 are calculated based on the measured positions of the actually formed slit line 16 (X) and the edge (Y1,Y2) of the continuous optical film laminate 15 and the reference lines. The correction value α corresponds to the measured deviation α, or the deviation α between the actual slit-line 16 position (X) and the downstream side reference line extending in the Y direction. The correction value δ can be calculated according to the following equation, based on the deviations in Y direction of the edge of the continuous optical film laminate 15 at two positions, or the deviations (β1, β2) of the edge of the continuous optical film laminate with respect to respective ones of the upstream and downstream reference lines extending in the X direction, and the distance data γ between the two reference lines.

$$\delta = \cos^{-1}\left\{\frac{\gamma}{\sqrt{\gamma^2 + (\beta_1 - \beta_2)^2}}\right\}$$ [Equation 1]

(4) The storage device 720 is used to store correction values (α, δ) for applying an instruction to the slitting unit 600 to perform an angular position correction by a value δ and a positional correction by value α in the X direction based on the measured and calculated data so as to make the slit line conform to the reference line of the position where the slit line 16 is to be formed extending in the Y direction.

(5) The slitting unit 600 receives instruction from the control unit 700 for the next operation of forming a slit line 16 in the continuous optical film laminate 15 to perform a positional correction in the feed direction and an angular position correction in a transverse direction with respect to the feed direction, based on the stored correction values (α, δ) so as to conform to the reference line of the position where the slit line 16 is to be formed in the continuous optical film laminate 15.

(6) Thereafter, the slitting unit 600 operates to form a next slit line in the continuous optical film laminate 15.

The manufacturing line 550 includes a take-up drive mechanism 630 including a pair of feed rollers 631 that takes up a continuous optical film laminate with predefined slit lines 10 into a roll 620.

In the embodiment, the polarizing composite film 11 having the adhesive layer 12 may also be manufactured by directly applying a solvent containing an adhesive to the surface of the inspected polarizing composite film 11' which is to be laminated to the liquid-crystal panel W, then drying the polarizing composite film. However, generally, the polarizing composite film 11 having the adhesive layer 12 is manufactured as follows. In a manufacturing process of the carrier film 13, one surface of the carrier film 13 to be laminated to the surface of the polarizing composite film 11' that is to be laminated to the liquid-crystal panel W is subjected to a releasing treatment, and then a solvent containing an adhesive is applied to the treated surface and dried to form a carrier film 13 having the adhesive layer 12. In the carrier film lamination process in the manufacturing line 540, the carrier film 13 having the preliminarily formed adhesive layer 12 is laminated to the inspected polarizing composite film 11' by the lamination unit 590 so that the adhesive layer 12 formed on the carrier film 13 can be transferred to the inspected polarizing composite film 11' to produce a polarizing film 11 having the adhesive layer 12. It will be understood that the manufacturing line 540 may include a surface-protection film lamination process in which the surface-protection film 14 is laminated to the surface of the inspected polarizing composite film 11' opposite to the surface on which the carrier film 13 is laminated by the lamination unit 640.

The Second Embodiment

According to the second embodiment, the manufacturing system 500' is characterized in that it uses a preliminarily manufactured continuous provisional optical film laminate 15'. Thus, the manufacturing system 500' does not include manufacturing lines for producing the polarizer and the surface-protection film. Also, unlike the manufacturing process 530 in the first embodiment, it is not necessary to include a step of applying an adhesive agent to the interface between the polarizer and the protective film, and drying the adhesive to bond those together by the pair of lamination rollers 561 comprised in the lamination drive mechanism 560. An equivalent line to the manufacturing line 530 is the supply line 530' of the continuous provisional optical film laminate 15' as shown in FIG. 11. The line is to perform a process which is the same as the step 1 shown in FIG. 13. The manufacturing line 530' comprises a film supply mechanism 560' that includes a pair of feed rollers 561' for feeding the provisional optical film laminate 15' from a roll 510' of the film laminate 15' mounted on the support rack 520'.

FIG. 11 is a schematic diagram showing the manufacturing system 500' that comprises the following manufacturing lines. The units and devices in the manufacturing system 500' shown in FIG. 11 corresponding to those of the manufacturing line 500 shown in FIG. 10 are given the same numbers.

FIG. 13 is a flowchart showing manufacturing steps carried out in the manufacturing system 500'.

As shown in FIG. 11, the supply line 530' of the provisional optical film laminate 15' feeds a continuous provisional optical film laminate 15' including a provisional carrier film 13' (schematically shown at the bottom of FIG. 11) to the peeling station L, where a process is carried out for peeling the polarizing composite film 11 having the adhesive layer 12 which is a component of the provisional optical film laminate 15' from the provisional carrier film 13' which also is a component of the polarizing composite film 11. Thus, the supply line 530' is equivalent to the manufacturing line of the polarizing composite film 11 having the adhesive layer 12, and, hereinafter, this line is called the manufacturing line 530'.

The manufacturing line 530' comprises the film supply mechanism 560' including a pair of feed rollers 561' and a distance measurement device 570' having an encoder incorporated in one of the feed rollers, and performs a measurement step to measure a fed-length of the continuous provisional optical film laminate 15' from the film supply mechanism 560'. The manufacturing line 530' further comprises an inspection station M. The manufactured polarizing composite film 11 having the adhesive layer 12 is fed to the inspection station M, and an inspection is performed for detecting any defects existing in the polarizing composite film 11 having the adhesive layer 12. The manufacturing of the continuous optical film laminate with predefined slit lines 10 in the second embodiment is commenced by the manufacturing line 530'.

It is preferable that a provisional carrier film 13' having a transferable adhesive layer is used in the manufacturing process of the preliminarily prepared continuous provisional optical film laminate 15'. It is because when the provisional carrier film 13' is peeled from the continuous provisional optical film laminate 15' in the manufacturing system 500', the adhesive layer of the provisional carrier film 13' is transferred to the polarizing composite film 11 to produce the polarizing composite film 11 having the adhesive layer 12.

The manufacturing system 500' shown in FIG. 11 comprises the manufacturing line 530' for manufacturing the continuous polarizing composite film 11 having the adhesive layer 12. The manufacturing line 530' includes an inspection station M that is similar to the inspection station M included in the manufacturing system 500 in the first embodiment, and the inspection station M in the manufacturing line 530' is different from the one in the manufacturing system 500 in that the inspection target is the polarizing composite film 11 having the adhesive layer 12. The manufacturing system 500' further comprises the manufacturing line 540 and the manufacturing line 550, as the manufacturing system 500 in the first embodiment does. Therefore, the manufacturing system 500' comprises the following units and devices that are common in the manufacturing system 500 in the first embodiment: an inspection unit 580 that includes an image reading device 581, a carrier film lamination unit 590 that includes a support rack 591 to which a roll of the carrier film 13 is provided, a slit position checkup unit 610 at a slit-position checkup station P which includes a slitting unit 600 at a slit-forming station N and two image reading devices 611 one on upstream of and one downstream of the slitting unit 600, a take-up drive mechanism 630 that includes a pair of feed rollers which takes up the manufactured continuous optical film laminate with predefined slit lines 10, and a control unit 700 that includes a continuous information processing device 710 and a storage device 720, and also a lamination unit 640 of a surface-protection film when necessary. The unit included in the manufacturing system 500' but not in the manufacturing system 500 in the first embodiment is a provisional carrier film take-up drive mechanism 650 that includes the provisional carrier film peeling unit 651 provided in the peeling station L.

The manufacturing system 500' comprises the processes or process steps as shown in FIG. 13. In step 1, a roll 510' of a provisional optical film laminate 15', as an example, is mounted on a support rack 520'. For the provisional optical film laminate 15', a polarizing composite film 11 including a polarizer having a protective film laminated to one or each of opposite surfaces of the polarizer, and a provisional carrier film 13' formed with a transferable adhesive layer 12 and laminated to the polarizing composite film 11 is used as an example. In step 2, the continuous optical film laminate 15' is fed to the manufacturing line 530' for manufacturing the polarizing composite film 11 having an adhesive layer 12 by the film supply mechanism 560' that includes a pair of feed rollers 561'. In steps 3 and 4, the provisional carrier film 13' is peeled and removed from the provisional optical film laminate 15' by the provisional-carrier-film peeling unit 651 in the provisional carrier film take-up drive mechanism 650, and the polarizing composite film 11 having the adhesive layer 12 transferred thereto is manufactured. In step 5, the inspection unit 580 inspects surfaces and the inside of the polarizing composite film 11 having the exposed adhesive layer 12, to detect any defect existing in the polarizing composite film 11 in the same manner as in the first embodiment.

The inspection unit 580 is adapted to perform, for example, reflection inspection, transmission inspection, or cross-Nichol transmission inspection to detect defects in the polarizing composite film 11 having the exposed adhesive layer by inspecting the surface and inside of the transported polarizing composite film 11 at the peeling station M, as described later. The information processing device 710 calculates the defect-free region (Xα) having a predetermined length in a longitudinal direction and the defective region (Xβ) including at least one defect and defined as a region having a predefined length which is different from the length of the defect-free region, the length of the defective region being defined across the position of the defect. The defect-free region (Xα) and the defective region (Xβ) are defined to extend throughout the width of the polarizing composite film 11 and the longitudinal lengths are determined based on the position or coordinate of a defect or defects existing in the polarizing composite film 11. The defects are detected through a preliminary inspection and the positional data for such defects is stored in the storage device 720. The data is used, as already described, to produce slit-position information for sequentially forming slit lines 16 in the transverse direction on a continuous optical film laminate 15 by means of the slitting unit 600 provided in the slit-forming station N, the slit lines corresponding to the defect-free region (Xα) and defective region (Xβ) stored in the storage device 720. The control unit 700 operates to produce polarizing sheets in sequence on the carrier film 13 based on the slit-position information to manufacture the continuous optical film laminate with predefined slit lines 10.

Specifically, the control unit 700 functions to operate the information processing device 710 and the storage device 720 to process the image data from the image reading device 581 in association with the feed-length measurement data based on the delivered length measured by the length or distance measurement device 570 as a length from the leading edge of the polarizing composite film 11, so as to produce position data representing locations or coordinate positions of a defect or defects in the polarizing composite film 11, and the position data being then stored in the storage device 720. Then, the control unit 700 functions, based on the position data on the detected locations of a defect or defects, to define defect-free regions (Xα) and defective regions (Xβ) in the polarizing composite film 11. The control unit 700 further functions to produce slit position information for sequentially forming normal polarizing sheet Xα and defective polarizing sheet Xβ in the polarizing composite film 11, each corresponding to the defect-free region (Xα) and the defective region (Xβ) in the defined polarizing composite film 11, on the carrier film 13 of the continuous optical film laminate 15 to be manufactured in the later process, at the slit-forming station N, using the slitting unit 600. The slit-position information is provided for indicating positions at which respective ones of the slit lines 16 are to be formed in the continuous optical film laminate 15 and is also stored in the storage device 720. In any case, the above information processing step is the same as the one in the manufacturing system 500 in the first embodiment.

The manufacturing line 540 for manufacturing the continuous optical film laminate 15 is designed to perform a manufacturing process comprising the following steps. Specifically, the manufacturing process includes a carrier film lamination step in which the carrier film 13 is releasably laminated to the inspected polarizing composite film 11 having the adhesive layer by the carrier film lamination unit 590 and a surface-protection film lamination step in which, when desired, the surface-protection film 14 is releasably laminated to the surface of the polarizing composite film 11 opposite to the surface on which the carrier film 13 is laminated, by the lamination unit 640. More specifically, the manufacturing steps are carried out as in the following steps. Referring to the flow chart of FIG. 13, in steps 6 to 8, the carrier film 13 which has been subjected to a releasing treatment is releasably laminated on the polarizing composite film 11 having the adhesive layer 12 by the carrier-film lamination unit 590, to form the continuous optical film laminate 15. The manufactured continuous optical film laminate 15 has the same structure as that manufactured in the manufacturing system 500 in the first embodiment.

It may be possible to releasably laminate a surface-protection film 14 having an adhesive surface on the surface of the polarizing composite film 11 opposite to the surface on which the carrier film 13 is laminated by means of a lamination unit 640, before the protective film is laminated to the polarizer, irrespective of whether the protective film is subjected to a hard coat treatment or an anti-dazzling or anti-glare treatment on one surface. In this case, the resulting continuous optical film laminate 15 has a structure where the carrier film 13 and the surface-protection film 14 are releasably laminated to respective ones of the opposite surfaces of the polarizing composite film 11 having the adhesive layer 12.

The manufacturing line 540, as in the manufacturing line in the first embodiment, includes the slit-forming station N, for performing a process comprising the step of, in accordance with the instruction information, sequentially forming slit lines 16 in the continuous optical film laminate 15 transferred from the inspection station M, by means of the slitting unit 600 provided on the slit-forming station N. The slit lines 16 are produced at the side of the optical film laminate 15 opposite to the carrier film 13 to a depth reaching the surface of the carrier film adjacent to the adhesive layer of the continuous optical film laminate 15, so that the normal polarizing sheet Xα and defective polarizing sheet Xβ of the polarizing composite film 11, each corresponding to the defect-free region (Xα) and the defective region (Xβ) of the polarizing composite film 11 is sequentially formed on the carrier film 13. The manner of forming the normal polarizing sheet Xα and the defective polarizing sheet Xβ is the same as that in the first embodiment, so that the description will not be repeated.

The manufacturing line 540 further includes a slit line checkup station P, for performing steps of checking any deviation between the position of the actually formed slit line 16 and the slitting position at which the slit line 16 is to be formed (the reference position) on the continuous optical film laminate 15 by the slit position checkup unit 610 that includes two image-reading devices 611, one on upstream of and one on downstream of the slitting unit 600, and correcting the slitting position or the angle of the slitting unit 600 in case there is any deviation.

More specifically, as shown in FIG. 13, steps 8 and 12 are performed to feed the continuous optical film laminate 15 under tension, and in step 12, a slit line 16 is formed in the continuous optical film laminate 15. Then, a further step is carried out by the downstream image reading device 611 to read the position of the actually formed slit line 16 in the continuous web of the optical film laminate 15, and to determine whether there is any deviation between the position of the read slit-line 16 of the optical film laminate and the position where the slit-line 16 is to be formed based on the slit-position information, and in case where there is any deviation, steps 13 and 14 are carried out. The inspection method for checking any deviation between the position of the slit line 16 actually formed and a position at which the slit line 16 is to be formed on the continuous optical film laminate 15 is omitted here as the method is the same as that of the process at the slit-line checkup station P in the first embodiment with reference to FIG. 14.

The manufacturing line 550 is similar to the one in the manufacturing system in the first embodiment and it includes a take-up drive mechanism 630 having a pair of feed rollers 631 to take up a continuous optical film laminate with predefined slit lines 10 into a roll 620. The difference between the manufacturing system in the first embodiment and that in the second embodiment is understood from the film section diagram shown in the bottom part of FIGS. 10 and 11.

(Formation of Slit Position Information)

At the inspection station M, both in the first and the second embodiment, the information processing device 710 of the control unit 700, connected with the inspection unit 580, calculates the defect-free region (Xα) having a predetermined length in a longitudinal direction and the defective region (Xβ) including at least one defect and defined as a region having a predefined length which is different from the length of the defect-free region, the length of the defective region being defined across the position of the defect. The defect-free region (Xα) and the defective region (Xβ) are defined to extend throughout the width of the polarizing composite film 11 and the longitudinal positions are determined based on the position or coordinate of a defect or defects existing in and detected through a preliminary inspection. The positional data for the defect is stored in the storage device 720, and when a continuous optical film laminate 15 is manufactured, information processing is carried out to produce slit-position information for sequentially forming slit lines 16 in the transverse direction on a continuous optical film laminate 15. The slit lines correspond to the defect-free region (Xα) and defective region (Xβ) stored in the storage device 720 and are produced using the slitting unit 600 provided in the slit-forming station N. The control unit 700 operates to produce polarizing sheets in sequence on the carrier film 13 composing the continuous web of the optical film laminate 15 based on the slit-position information generated by the information processing to manufacture the continuous web of the optical film laminate with predefined slit lines 10.

The steps to form slit line position information that determines positions of defect-free region (Xα) and defective region (Xβ) is described below with reference to the schematic diagram in FIG. 15 and flowcharts in FIGS. 16 to 18. It is understood that this embodiment is only an example.

Figure 15:
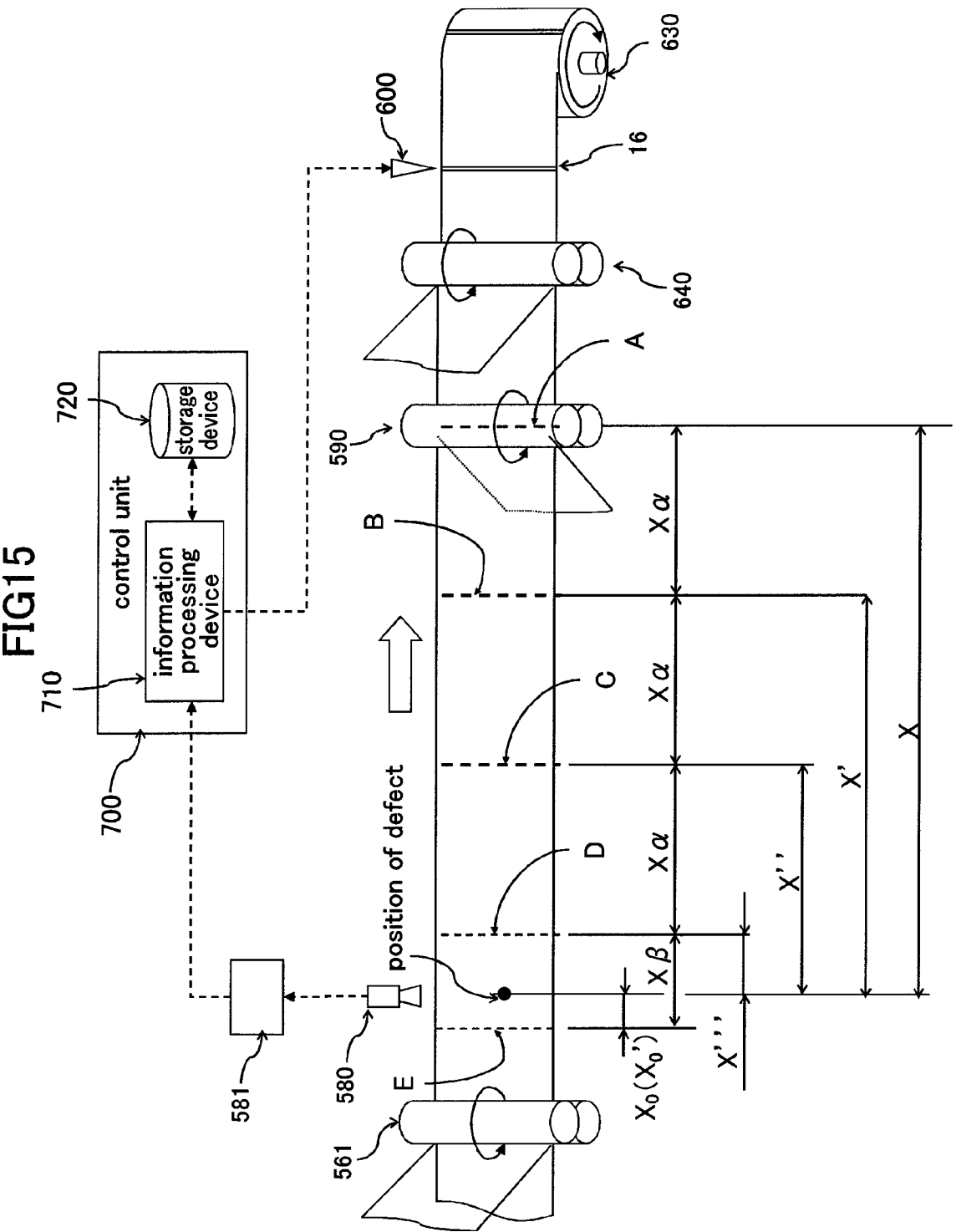
FIG. 15 is a schematic diagram showing a technique of calculating a position for forming a slit line in a continuous optical film laminate to segment a region of an optically functional film into a defective region and a defect-free region according to one embodiment of the present invention.

FIG. 15 is a schematic diagram showing the feed of the polarizing composite film 11' to which a surface-protection film is laminated on its polarizer or the polarizing composite film 11 having the adhesive layer 12 (hereinafter, both are called polarizing composite film 11) transported continuously in the right direction by means of the lamination drive mechanism 560 or the film supply mechanism 560' and the pair of feed rollers 631 included in take-up drive mechanism 630, via the feed roller of the carrier film lamination unit 590 and the speed adjustment device 650 that includes a dancer roller.

Figure 16:
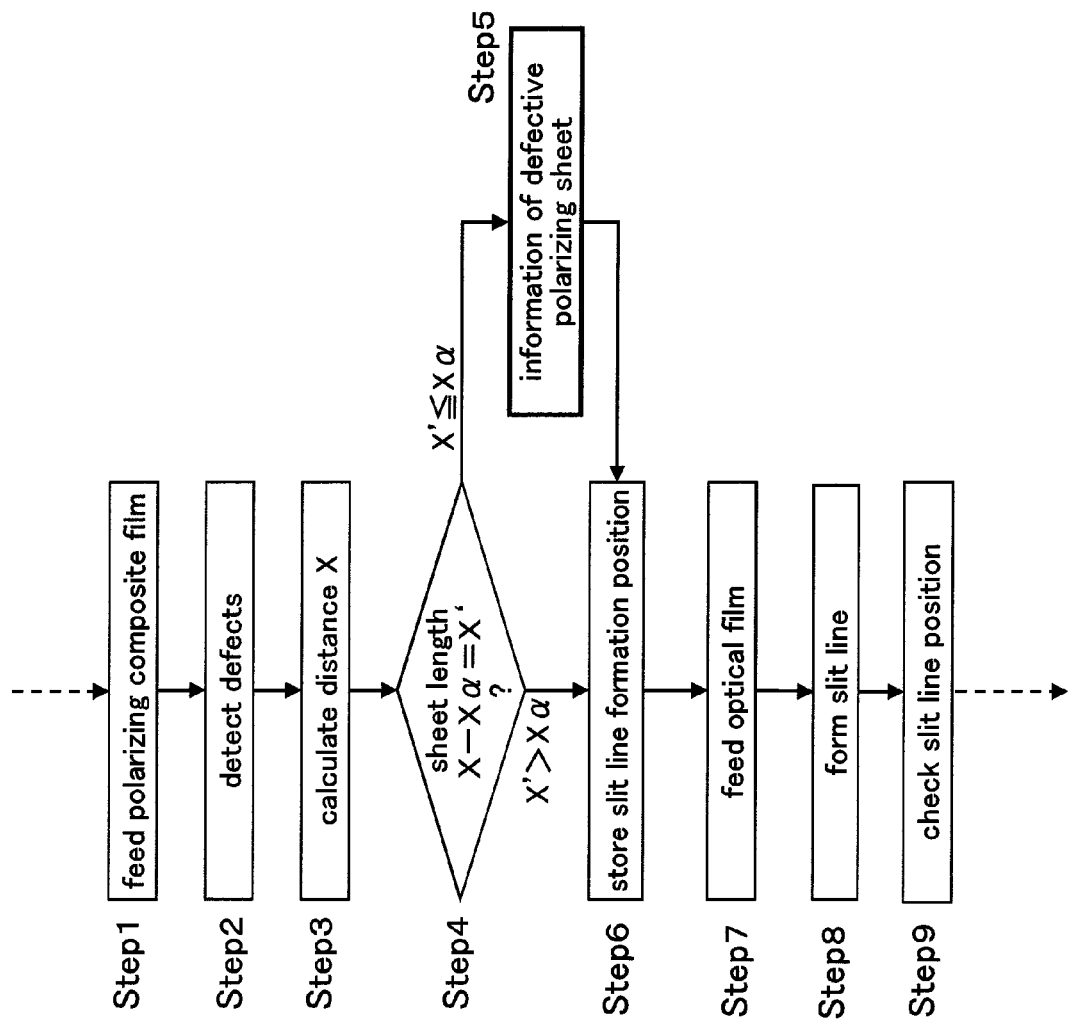
FIG. 16 is a diagram showing a step to form slit line in a technique of storing defect identification information Xγ according to one embodiment of the present invention.
Figure 17:
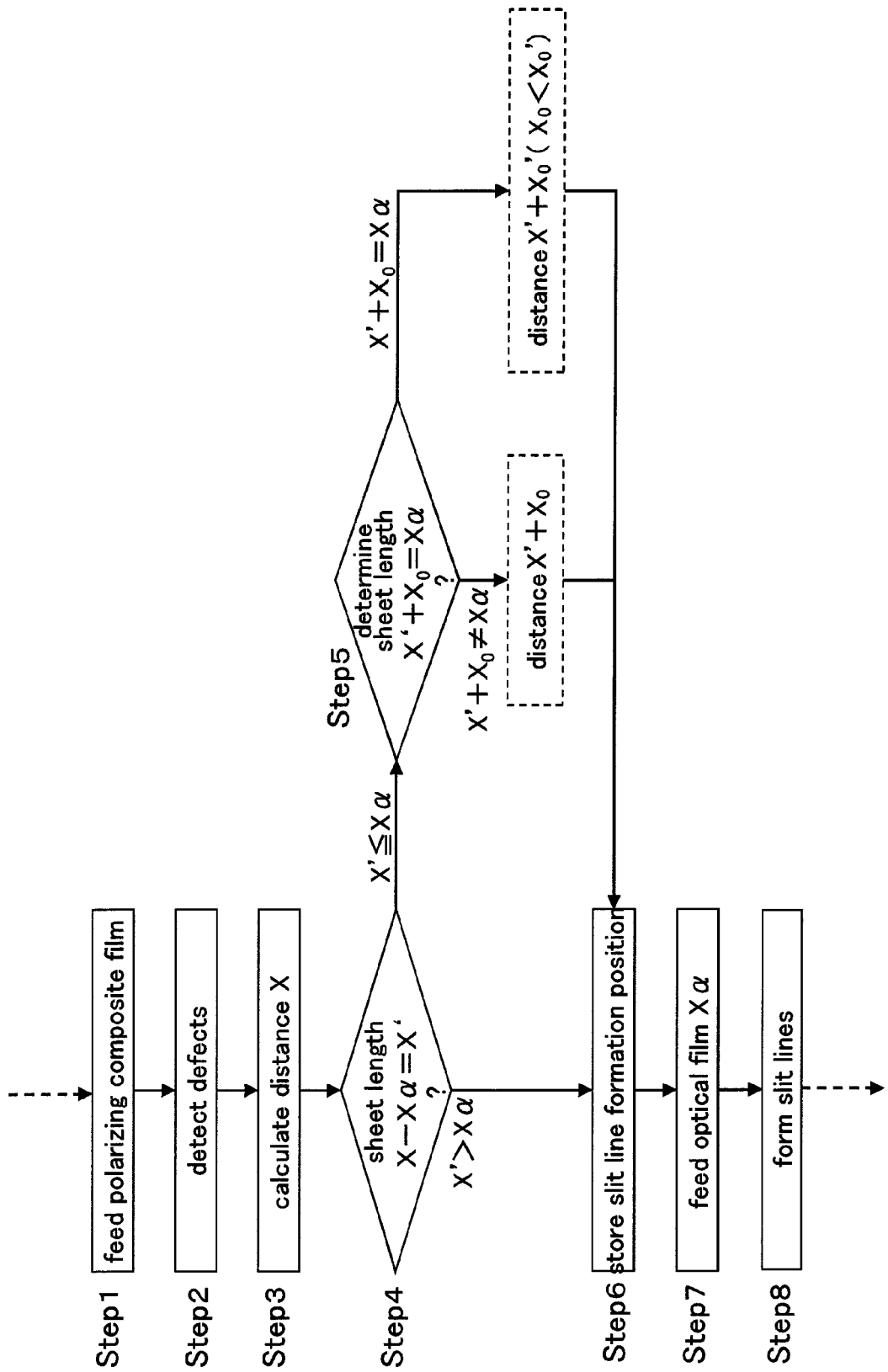
FIG. 17 is a diagram showing a step to form a slit line in a technique of modifying a length to a next-slit-line formation position to (X'+X0') wherein X0'>X0, according to one embodiment of the present invention.
Figure 18:
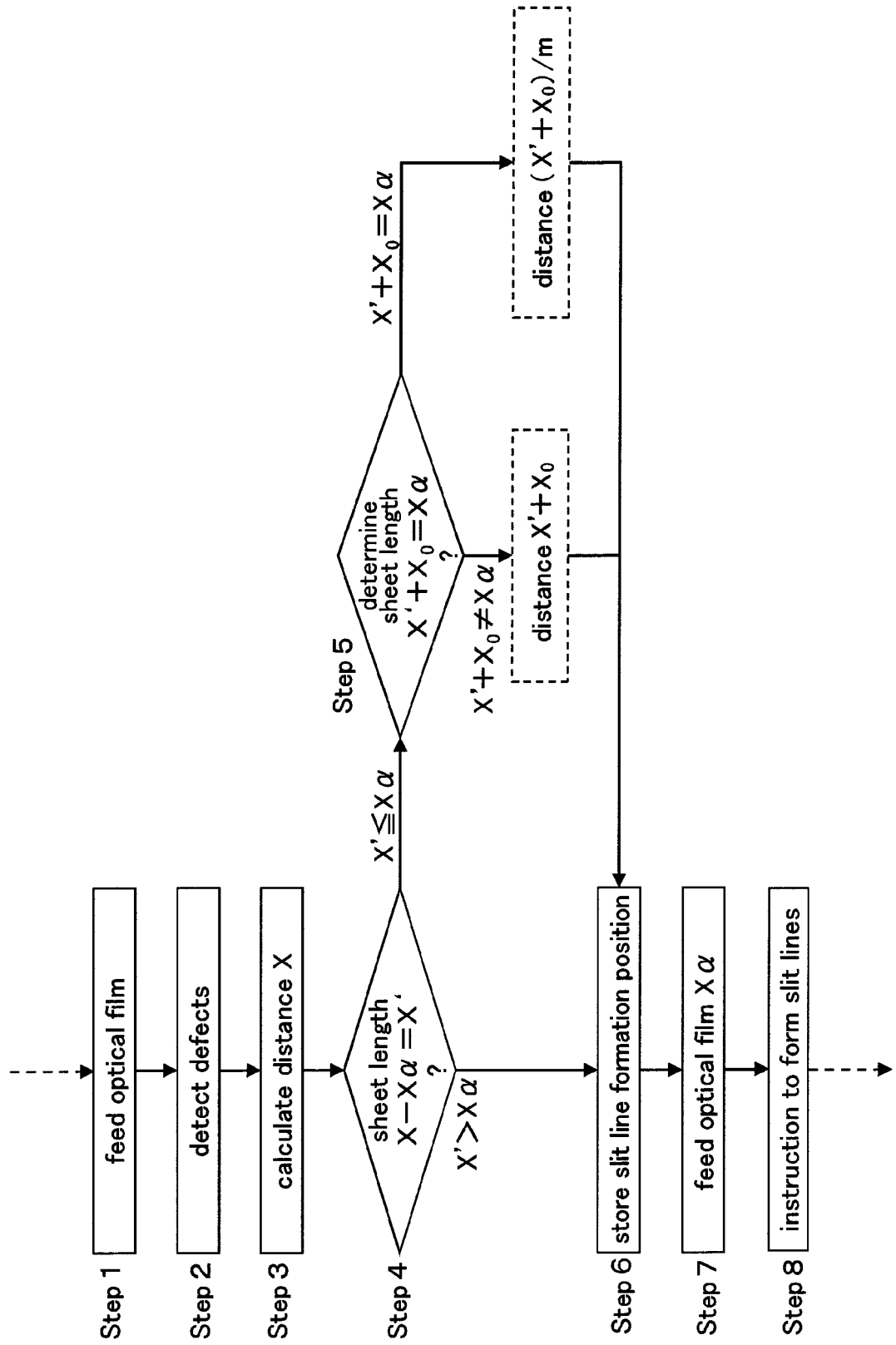
FIG. 18 is a diagram showing a step to form slit line in a technique of modifying a length to a next-slit-line formation position to [(X'+X0)/m] wherein m=2 or more, according to one embodiment of the present invention.

FIGS. 16 to 18 are flowcharts showing different manners of calculating the positions at which respective ones of the slit lines 16 are to be formed in the continuous optical film laminate 15 being transported.

In either case, in step 1, the control unit 700 operates to instruct the lamination drive mechanism 560 and the pair of feed rollers included in the take-up drive mechanism 630 to feed the polarizing composite film 11. In step 2, the control unit 700 operates to instruct the information processing device 710 and the storage device 720 to associate the image data from the image reading device 581 and the feed-length measurement data measured from the leading edge of the polarizing composite film 11 by the length measurement device 570 and perform information processing on them, so as to produce position data of positions or coordinates of defects in the polarizing composite film 11, and store the data in the storage device 720. In steps 3 and 4, the control unit 700 defines the polarizing composite film 11 into defect-free region (Xα) and defective region (Xβ) based on the position information on the detected locations of a defect or defects. Further, the control unit 700 produces a slit position information for sequentially forming the normal polarizing sheet (Xα) and defective polarizing sheet (Xβ) in the polarizing composite film 11 having an adhesive layer, each corresponding to the defect-free region (Xα) and the defective region (Xβ) in the defined polarizing composite film 11, on the carrier film 13 of the manufactured continuous optical film laminate 15 at the slit-forming station N using the slitting unit 600. The slit-position information is provided for indicating positions at which respective ones of the slit lines 16 are to be formed in the continuous optical film laminate and is also stored in the storage device 720.

In step 3, the control unit 600 functions to operate the information processing device 710 to calculate the distance or length X between the location of the defect in the polarizing composite film 11 being fed and the reference position, and store the calculated length X in the storage device 720. As shown in FIG. 15, the length X may be a distance for example between the position of the inspection unit 580 (the position of the defect) and the position of the carrier film lamination unit 590 (e.g., the reference position A, which is a position of the first slit line).

In step 4, the control unit 700 further functions to operate the information processing device 710 to subtract the length (Xα) which is the length of the defect-free region from the length X to obtain a length (X−Xα)=X', and then store the length X' in the storage device 720. The length Xα or the length of the defective-free region of the polarizing composite film is determined by a system manager based on the size of the liquid-crystal panel and pre-stored in the storage device 720. Then, the control unit 700 functions to operate the information processing device 710 to determine whether the calculated length X' is greater or less than the length Xα corresponding to that of the defect-free region of the polarizing composite film 11. Specifically, if a relation X' (or X")>Xα is established in FIG. 15, it is understood that the defect-free region Xα of the polarizing composite film 11 can be ensured. Then, the control unit 700 determines that a position B that is on upstream of the reference position A (the position of the first slit line) by a length Xα as the next slit line forming position for forming the normal polarizing sheet Xα corresponding to a normal region, and instructs the lamination drive mechanism 560 or the film supply mechanism 560' and the pair of feed rollers 631 included in the take-up drive mechanism 630 to have the polarizing composite film 11 delivered under tension by the length Xα of the defect-free region. The value of the length Xα in this instance is the slit-position information for forming a normal polarizing sheet Xα corresponding to the defect-free region (Xα) in the polarizing composite film 11. In a similar manner, following the second slit line forming position (the position B), a third slit line forming position (position C) is determined, then, a fourth slit line forming position (position D) is determined, and thus, the polarizing composite film 11 in tension is fed for the length of defect-free regions Xα.

To the contrary, if a relation X' (or X")≦Xα, i.e., X''' in FIG. 15≦Xα is established, it is understood that a defect-free region (Xα) cannot be obtained from this part of the polarizing composite film 11. In this instance, the region of the polarizing composite film 11 having the length Xβ provides the defective region (Xβ), so that the control unit 700 functions to operate the information processing device 710 to calculate the length (X'+$x_0$)=Xβ corresponding to the defective region (Xβ) by adding a constant value X0 to X' (X''' in FIG. 15). This means that a position E that is on upstream of the position D by a length Xβ is the next slit line forming position for the defective polarizing sheet Xα corresponding to a defective region. Then, the control unit instructs the lamination drive mechanism 560 or the film supply mechanism 560', and the pair of feed rollers 631 included in the take-up drive mechanism 630 to have the polarizing composite film delivered under tension by the length Xβ of the defective region. The value Xβ in this instance is the slit-position information for forming a defective polarizing sheet Xβ corresponding to the defective region (Xβ) of the polarizing composite film 11.

The control unit 700 operates to perform calculations of the following (a) and (b) to create slit-position information indicative of the positions at which respective ones of the slit lines 16 are to be formed in the continuous optical film laminate 15 to be manufactured next to form normal polarizing sheets xα and defective polarizing sheets xβ of a polarizing composite film 11, and then store the slit-position information in the storage device 720:

(a) a length Xα to the position for forming a next slit line, if X'>Xα; and (b) a length (X'+X0=Xβ) to the position for forming a next slit line, if X'≦Xα.

By the way, if the length (X'+X0=Xβ) corresponding to that of the defective region (Xβ) becomes equal to the length Xα corresponding to that of the defect-free region (Xα), i.e., if (X'+X0)=(Xα), the control unit 700 cannot identify or discriminate the defect-free region (Xα) from the defective region (Xβ). This means that the defective region (Xβ) may not be correctly recognized, so that, for example, the defect-free region (Xα) and the defective region (Xβ) cannot be discriminated from each other based on feed-length measurement data on the feed length of the polarizing composite film 11. Thus, it may happen that the information created based on the feed-length measurement data (X'+X0) inevitably becomes imperfect. It is assumed that such situation occurs when the position of a defect in the polarizing composite film 11 is infinitely close to the position for forming a next slit line 16 in the polarizing composite film 11, or when a plurality of defects are distributed over a length Xα corresponding to that of the defect-free region.

In step 5, if (X'+X0)=Xα becomes equal to Xα, the control unit 700 functions to operate the information processing device 710 to perform a calculation based on at least one of the following methods to create information for identifying or discriminating the defect-free region (Xα) over the defective region (Xβ).

In step 5 in FIG. 16, even if, as the result of calculation conducted by the information processing device 710, the length (X'+X0) to the position for forming a next slit line 16 becomes equal to the length Xα corresponding to that of the defect-free region, the region in said length may not essentially be the defect-free region (Xα). In order to make it possible to distinguish the difference, defect-including information Xγ or defective polarizing sheet Xβ identification information Xγ is produced and stored in the storage device 720, wherein for example, a numerical suffix "0" may be associated with the slit-position information indicative of the position for forming a slit line 16 corresponding to the defect-free region (Xα), and a numerical suffix "1" with the slit-position information indicating the position for forming a slit line 16 corresponding to the defective region.

In step 5 illustrated in FIG. 17, if, as a result of calculation of the information processing device 710, the length (X'+X0) to the position where a next slit line is to be formed becomes equal to the length Xα corresponding to that of the defect-free region (Xα), an information processing is conducted so that the length to the next slit line position satisfies the relation (X'+X0'), wherein X0'>X0, and store the length (X'+X0') in the storage device 720. This information processing makes it possible by calculating the length (X'+X0') different from Xα, to allow the region having the length (X'+X0') to be identified or discriminated over the defect-free region Xα.

Further, in step 5 in FIG. 18, if, as the result of calculation conducted by the information processing device 710, the length (X'+X0) to the next slit line position becomes equal to the length Xα corresponding to that of the defect-free region (Xα), an information processing is carried out to allow the length to the position where the next-slit-line 16 is to be formed to become [(X'+X0)/m], wherein m=2 or more, preferably 2 or 3, and store the length [(X'+X0)/m] in the storage device 720. As in the case of FIG. 17, this information processing is also configured to calculate the [(X'+X0)/m] different from Xα to allow the region having the length [(X'+X0)/m] to be identified or discriminated over the defect-free region (Xα).

Summarizing the above, in the process for creating information for identifying or discriminating the defect-free region (Xα) and defective region (Xβ), either of the following methods may be adopted:

(1) A method of creating defect-including information Xγ as information for identifying or discriminating the defective region Xβ having a length (X'+X0) calculated by the information processing device 710 over the defect-free region Xα;

(2) A method of creating a length to the next slit line position which is calculated by the information processing device 710, as a length (X'+X0') (wherein X0'>X0) which is different from the length Xα; and (3) A method of creating a length to the next slit line position which is calculated by the information processing device 710, as a length [(X'+X0)/m] (wherein m=2 or more) which is different from the length Xα.

Particularly, in cases where the method (2) or (3) is carried out, (X'+X0)=(Xα) is changed to (X'+X0')≠Xα or [(X'+X0)/m] Xα. Thus, the next slit line position can be used as information indicating the defective region (Xβ) identified or discriminated over the defect-free region (Xα).

In either case, in step 6, the control unit 700 functions to operate the information processing device 710 to determine the length between the reference position (the position of the carrier film lamination unit 590 in FIG. 15) and the next slit line position, based on the calculation result in steps 4 and 5. Then, in the methods (2) or (3), in step 7, the control unit 700 operates to cause the information processing device 610 to store the length to the next slit line position as determined in step 6, in the storage device 720. However, in case of the method (1), the control unit 700 functions to operate the information processing device 710 to store the length to the position of forming a next-slit-line in association with the defect-including information Xγ.

In either case, in step 8, the control unit 700 functions to operate the slitting unit 600 provided on the slit-forming station N to form a slit at a slit forming position on the polarizing composite film 11 at the side opposite to the carrier film 13 to a depth reaching the surface of the carrier film adjacent to the adhesive layer, and when the polarizing composite film 11 is advanced to bring the next slit forming position on the polarizing composite film 11 to the slit-forming station, a further slit is produced to form either the normal polarizing sheet Xα or the defective polarizing sheet Xβ. Thus, the normal polarizing sheets Xα and the defective polarizing sheets Xβ are appropriately formed in the polarizing composite film 11 to produce the continuous optical film laminate 15. Such process steps are carried out based on the position for forming a next slit line stored in step 7.

In step 9, the slit position checkup unit 610 provided in the slit-position checkup station P performs the checkup step to check if there is any deviation between the position of the actually formed slit line 16 and the stored slitting position at which the slit line 16 is to be formed. As described earlier, the deviation between the slitting position at which the slit line 16 is to be formed (the reference position) on the continuous optical film laminate 15 and the position of the actually formed slit line 16 is checked, and is used to correct the slitting position or the angle of the slitting unit 600 in case there is any deviation, before forming the next slit line 16.

(Details of Defect Inspection Unit)

Figure 19:
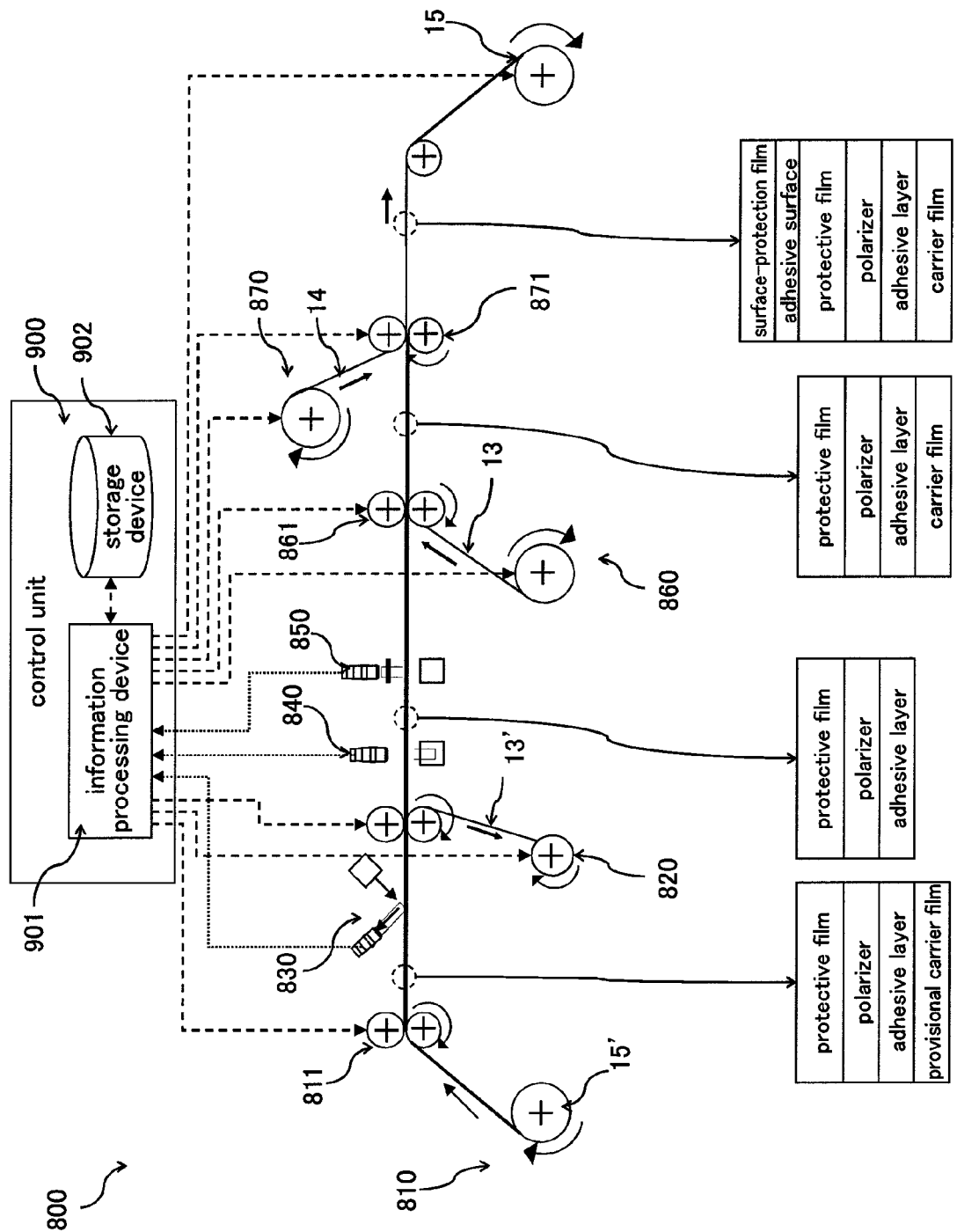
FIG. 19 is a schematic diagram showing a manufacturing system for a continuous optical film laminate with predefined slit lines having three inspection units, according to the third embodiment of the present invention.

FIG. 19 shows one example of a preferable embodiment for detecting defects in a polarizing composite film having an adhesive layer according to the second embodiment of the present invention. In this embodiment, a continuous provisional optical film laminate 15' is transported to the peeling station L, and a provisional carrier film 13' which is a part of the continuous provisional optical film laminate 15' is peeled from the laminate to produce the polarizing composite film 11 having the adhesive layer 12, wherein the manufactured polarizing composite film 11 having the adhesive layer 12 is inspected at the inspection station M comprising three inspection units to inspect the position of a defect or defects. It is needless to mention that the inspection units are not limited to those shown in the drawing and are also applicable to the inspection unit M according to the first embodiment of the present invention. FIG. 19 further shows a manufacturing system 800 for manufacturing a roll of a continuous optical film laminate 15 including a carrier film 13 releasably laminated on the polarizing composite film 11 having the adhesive layer 12 and when desired, a surface-protection film releasably laminated on the surface of the polarizing composite film 11 opposite to the surface on which the carrier film 13 is laminated to form the roll of the optical film laminate 15. The manufacturing line for manufacturing the continuous optical film laminate 15 is described in detail in the description of the manufacturing line 500 and 500' with respect to the first and the second embodiment, so that the description is omitted here.

The manufacturing system 800 comprises a film feed apparatus 810 including a feed roller 811 for feeding the provisional optical film laminate 15', and a take-up drive mechanism 820 for taking up the provisional carrier film 13'. The manufacturing system 800 further comprises a first inspection unit 830, a second inspection unit 840, and a third inspection unit 850, the inspection units being controlled by a control unit 900 that includes an information processing device 910 and a storage device 920. There are provided a carrier film feed apparatus 860 including a lamination unit 861 and an optionally provided protective film feed apparatus 870 including a lamination unit 871, which operate to releasably laminate the carrier film 13 to the exposed surface of the adhesive layer 12 of the inspected polarizing composite film 11, and releasably laminate the optionally provided surface protection film to the surface of the polarizing composite film opposite to the surface on which the carrier film 13 is laminated. Thus, the continuous optical film laminate 15 is manufactured.

As shown in FIG. 19, the inspection units are disposed at respective three positions in the manufacturing system 800. The first inspection unit 840 is located between the feed roller 811 of the film feed apparatus 810 and the take-up drive mechanism 820 for taking up the provisional carrier film 13', and adapted to inspect the continuous provisional optical film laminate 15' to which the provisional carrier film 13' is laminated. The first inspection unit 840 inspects the surface of the polarizing composite film 11 by means of reflection. Defects that can be inspected are defects such as surface irregularities, flaw and/or undulation on the surface which are detectable by CCD camera, as shown in FIG. 20.

The second inspection unit 840 is a transmission inspection unit that is designed such that light from a light source is projected to the polarizing composite film 11 having the adhesive layer 12 perpendicular thereto, and to receive the light by an optical detection unit to detect one or more defects existing in the polarizing composite film 11 in the form of shades. Defects that can be inspected are defects such as internal foreign substances or internal pores in the film.

The third inspection unit 850 is a defect inspection unit based on a cross-Nichol condition. Along with the application of such defect inspection unit, the accuracy of the defect inspection of polarizing composite films is dramatically improved. Generally, manufacturers tend to adopt in their products only those polarizing composite films which have been determined acceptable through defect inspections based on the cross-Nichol condition for large-size liquid-crystal display elements. In the inspection according to this method, a polarizing composite film 11 to be inspected is placed with respect to a polarizing filter such that their absorption axes to be oriented at a right angle. A light source is provided to inject light to the polarizing composite film 11 and the polarizing filter to examine the light transmitted therethrough. Thus, if there is any defect in the polarizing composite film 11 having the adhesive layer 12, such defect is detected as one or more bright spots. The third inspection unit 850 is designed such that a light emitted from the light source is projected to the polarizing composite film having the adhesive layer perpendicularly or obliquely thereto and, with a polarization filter being disposed immediately before an optical detection unit so as to make the absorption axis thereof being oriented at a right angle with respect to the absorption axis of the polarizing composite film 11, the light which has passed through the polarizing composite film 11 is received by the optical detection unit to thereby detect any defect existing in the polarizing composite film 11 as one or more bright spots. As shown in FIG. 20, all defects, except surface irregularities, are detected by the third inspection unit 850.

Although each of the first, second and third inspection units uses the polarizing composite film 11 which has an adhesive layer 12 provided thereon as the object to be inspected, it is needless to say that the polarizing composite film 11' without the adhesive layer or other polarizing composite film can be inspected in the same way.

Although the present invention has been described in connection with preferred embodiments, it will be understood that various changes and modifications may be made by those skilled in the art without departing from the spirit and scope of the invention, defined in the following claims, and legal equivalents of the following claims may be substituted for elements thereof. Accordingly, the present invention is not limited to the specific embodiments disclosed as the best mode for carrying out the invention, but intended to cover all embodiments included within the scope thereof.

The invention claimed is:

1. A method for continuously manufacturing liquid-crystal display elements, using a continuous optical film laminate which comprises at least an optically functional film having an adhesive layer provided thereon and a carrier film releasably laminated on said adhesive layer, the optically functional film including at least one defect-free region and at least one defect-containing region, the defect-free and defective regions being defined along the longitudinal direction in accordance with position of a defect existing in the optically functional film and detected through a preliminary inspection, said defect-free region having a predefined length corresponding to a dimension of a liquid-crystal panel to which said optically functional film is to be laminated, said defect-containing region including at least one defect and defined as a region having a predefined length which is different from the length of said defect-free region, the length of the defect-containing region being defined across said position of the defect, slit lines being sequentially formed in a transverse direction of said optical film laminate at a side opposite to said carrier film to a depth reaching a surface of said carrier film adjacent to said adhesive layer, longitudinally adjacent two of said slit lines forming one sheet of said optically functional film having a definite length on said carrier film, said sheet is a normal optically functional sheet corresponding to said defect-free region having said predefined length if it does not contain any defect, and said sheet is a defect-containing optically functional sheet corresponding to said defect-containing region, the continuous optical film laminate being wound into a roll, the method comprising steps of;
continuously unrolling a continuous optical film laminate with predefined slit lines from the roll to a lamination station for lamination with the liquid-crystal panel,
measuring a feed length between sequential ones of the predefined slit lines of the continuous optical film laminate with predefined slit lines and calculating the length of the sheet of the optically functional film separated by respective ones of predefined slit lines on the continuous optical film laminate, based on the feed length,
comparing the length of the sheet of the optically functional film to said predefined length and determining whether the sheet is a normal optically functional film sheet or a defect-containing optically functional film sheet, peeling the sheet from the continuous optical film laminate if the sheet of the optically functional film is determined to be a normal polarizing sheet, and
conveying liquid-crystal panel in synchronization with transportation of the normal optically functional film sheet to the lamination station and laminating the normal optically functional film sheet to said liquid-crystal panel.

2. The method as defined in claim 1, wherein the method further comprises a step of removing a sheet determined to be a defect-containing optically functional film sheet so as to prevent the defect-containing optically functional film sheet from being laminated to the liquid-crystal panel.

3. The method as defined in claim 1, wherein the step of laminating the normal optically functional film sheet to the liquid-crystal panel at the lamination station further comprises steps of detecting position of the normal polarizing sheet transported to the lamination station in synchronization with delivery of the liquid-crystal panel, by using a pair of laminating rollers adapted to be vertically moved toward and away from each other disposed at the lamination station, and adjusting a lamination position between the normal polarizing sheet and the liquid-crystal panel at the lamination station,
wherein the leading edge of the normal polarizing sheet transported to a nip between the lamination rollers is adjusted in position with respect to the leading edge of the liquid-crystal panel while the rollers are in spaced-apart relation, so that they match and then the lamination rollers are linked again whereby the normal polarizing sheet is laminated to the liquid-crystal panel.

4. The method as defined in claim 2, wherein the step of removing a sheet determined to be a defect-containing optically functional film sheet includes providing a dummy film feed path for transporting a dummy film and a movable roller which is movable between an operative position and a retracted position, whereby, when a defect-containing optically functional sheet reaches a removal station, the movable roller is moved to the operative position wherein the movable roller functions to bring the defect-containing sheet into contact with the dummy film in the dummy film feed path to have the defect-containing sheet laminated with the dummy film, so that the defective polarizing sheet is peeled from the continuous optical film laminate.

5. The method as defined in claim 2, wherein the step of removing a sheet determined to be a defect-containing optically functional film sheet includes providing a dummy film feed path for transporting a dummy film and a movable roller which is movable between an operative position and a retracted position, the movable roller being adapted to be located in said operative position in the place of one of the lamination rollers so that the movable roller and the other lamination roller are operated in an inter-related manner, whereby, when a defect-containing sheet reaches a nip between the lamination rollers, the movable roller is moved to said operative position while the lamination rollers are in spaced-apart relation to cooperate with said other lamination roller to peel the defect-containing sheet from the continuous optical film laminate and laminate it to the dummy film in said dummy film feed path.

6. The method as defined in claim 1, wherein the method further comprises steps of pre-storing a plurality of liquid-crystal panels in a magazine, taking out the liquid-crystal panels one-by-one from the magazine, and controlling a posture of the taken out liquid-crystal panel delivered to the lamination station in synchronization with transportation of the normal optically functional film sheet when the normal polarizing sheet is transported to the lamination station.

7. The method as defined in claim 6, wherein the step of controlling the posture of the taken out liquid-crystal panel controls the posture of the taken out liquid-crystal panel based on position information of leading edges of a normal optically functional film sheet and the taken out liquid-crystal obtained by detecting the leading edge of a normal polarizing sheet extending in transverse direction with respect to the feed direction of the continuous optical film laminate and the leading edge of the taken out liquid-crystal panel extending in transverse direction with respect to the feed direction of the taken out liquid-crystal panel.

8. A system for continuously manufacturing liquid-crystal display elements using a continuous optical film laminate which comprises at least an optically functional film having an adhesive layer provided thereon and a carrier film releasably laminated on said adhesive layer, the optically functional film including at least one defect-free region and at least one defect-containing region, the defect-free and defect-containing regions being defined along the longitudinal direction in accordance with position of a defect existing in the optically functional film and detected through a preliminary inspection, said defect-free region having a predefined length corresponding to a dimension of a liquid-crystal panel to which said optically functional film is to be laminated, said defect-containing region including at least one defect and defined as a region having a predefined length which is different from the length of said defect-free region, the length of the defect-containing region being defined across said position of the defect, slit lines being sequentially formed in a transverse direction of said optical film laminate at a side opposite to said carrier film to a depth reaching a surface of said carrier film adjacent to said adhesive layer, longitudinally adjacent two of said slit lines forming one sheet of said optically functional film having a definite length on said carrier film, said sheet is a normal optically functional sheet corresponding to said defect-free region having said predefined length if it does not contain any defect, and said sheet is a defect-containing optically functional sheet corresponding to said defect-containing region, the continuous optical film laminate being wound into a roll, the system comprising;
a support rack for rotatably mounting the roll of the continuous optical film laminate,
a feed device for continuously unrolling and feeding a continuous optical film laminate from the roll to a lamination station for lamination with the liquid-crystal panel,
a measuring unit for measuring a feed length between sequential ones of the predefined slit lines of the continuous optical film laminate with predefined slit lines and calculating a length of a sheet of the optically functional film separated by respective ones of the predefined slit lines on the continuous optical film laminate based on the feed length,
a control unit for comparing the length of the sheet of the optically functional film to a predefined length and thereby determining whether the sheet is a normal one or a defect-containing one,
a peeling unit for peeling the normal optically functional film sheet from the continuous optical film laminate with predefined slit lines if the sheet of the optically functional film is determined to be a normal polarizing sheet, and
a lamination unit for conveying liquid-crystal panel in synchronization with the transportation of the normal optically functional film sheet to the lamination station and laminating the normal optically functional film sheet to the liquid-crystal panel.

9. The system as defined in claim 8, wherein the system further comprises a defect-containing sheet removal unit for removing the sheet determined to be a defect-containing optically functional film sheet so as to prevent the sheet from being laminated to the liquid-crystal panel.

10. The system as defined in claim 8, wherein the lamination unit further comprises a pair of laminating rollers disposed at the lamination station and adapted to be vertically moved toward and away from each other, and an adjusting unit for adjusting a lamination position between the normal optically functional film sheet and the liquid-crystal panel at the lamination station by detecting position of the normal optically functional film sheet transported to the lamination station in synchronization with conveyance of the liquid-crystal panel, wherein the adjusting unit adjusts the position of the leading edge of the normal optically functional film sheet transported to a nip between the lamination rollers and the leading edge of the liquid-crystal panel so that they match while the lamination rollers are in spaced-apart relation, and then the lamination rollers are linked again and thereby the normal polarizing sheet is laminated to the liquid-crystal panel.

11. The system as defined in claim 9, wherein the defect-containing sheet removal unit comprises a dummy film feed path including a movable roller and for passing a dummy film, a moving unit for moving the continuous optical film laminate to the dummy film feed path, and a dummy film drive mechanism for conveying a defect-containing optically functional film sheet, wherein, when a defective optically functional film sheet in the continuous optical film laminate reaches a removal station, said movable roller functions to move the continuous optical film laminate to the dummy film feed path thereby the defect-containing polarizing sheet is peeled from the continuous optical film laminate and laminated to the dummy film in the dummy film feed path.

12. The system as defined in claim 9, wherein the defective polarizing sheet removal unit comprises a dummy film feed path including a movable roller and for passing a dummy film, a moving unit for moving the continuous optical film laminate to the dummy film feed path, and a dummy film drive mechanism for conveying a defect-containing optically functional film sheet, wherein, when a defect-containing optically functional film sheet reaches a nip between the lamination rollers while the rollers are in spaced-apart relation at the lamination station, the movable roller is moved to a position to replace one of the lamination rollers so that the movable roller and the other lamination roller are operated in an inter-related manner to peel the defective polarizing sheet from the continuous optical film laminate and laminate it to the dummy film feed path.

13. The system as defined in claim 8, wherein the system further comprises a liquid-crystal panel conveyance apparatus including a magazine for storing a plurality of liquid-crystal panels, a conveyance apparatus for taking out the liquid-crystal panels one-by-one from the magazine, and, a liquid-crystal panel posture control device for controlling a posture of the liquid-crystal panel delivered to the lamination station in synchronization with transportation of the normal optically functional film sheet when the normal optically functional film sheet is transported to the lamination station.

14. The system as defined in claim 13, wherein the liquid-crystal panel posture control device comprises a normal optically functional film sheet leading edge detection unit for detecting the leading edge of the normal optically functional film sheet extending in transverse direction with respect to the feed direction of the continuous optical film laminate, a liquid-crystal panel leading edge detection unit for detecting the leading edge of the liquid-crystal panel extending in transverse direction with respect to the feed direction of the liquid-crystal panel, and a posture control device for controlling a posture of the liquid-crystal panel, based on position information of the leading edges of the normal optically functional film sheet and a liquid-crystal panel obtained by respective said detection units.

* * * * *